June 27, 1967  A. BROTHMAN ET AL  3,328,758
DATA RECEIVER
Filed Dec. 5, 1962  22 Sheets-Sheet 15
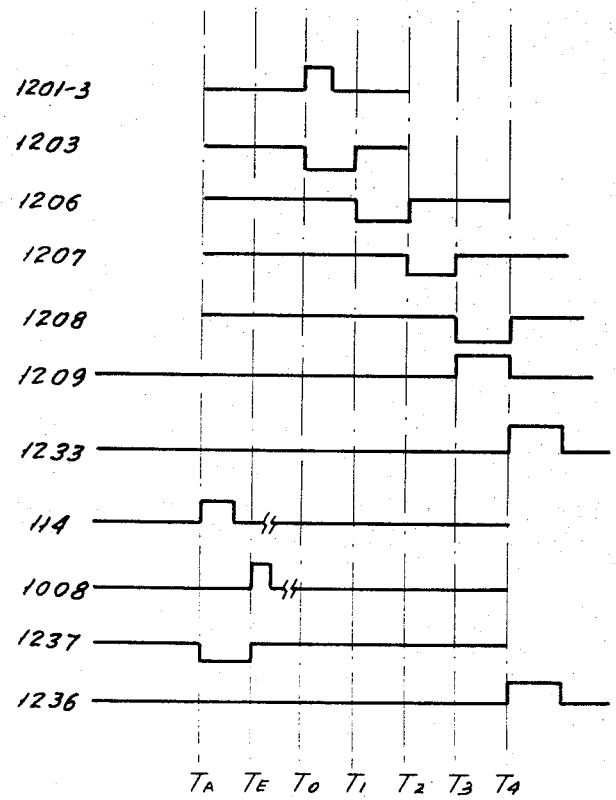
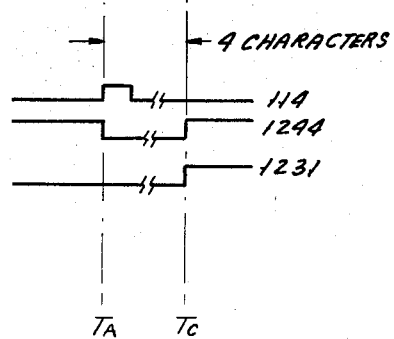
INVENTORS
ABRAHAM BROTHMAN
STEPHEN J. HALPERN
BY RICHARD D. REISER
ALLEN H. MILLER
BRUCE A. CUDDEBACK
OSTROLENK, FABER, GERB & SOFFEN
ATTORNEYS

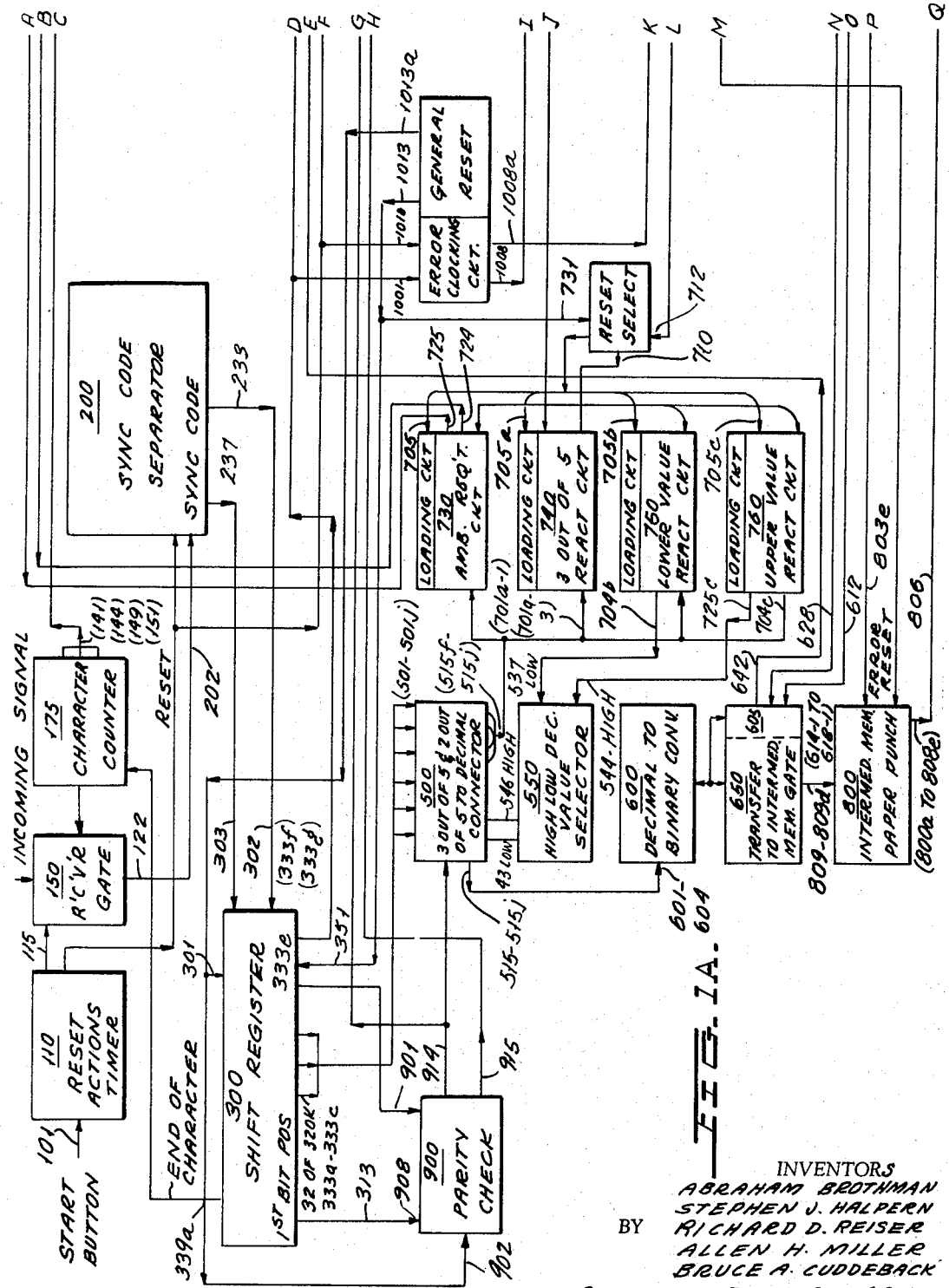

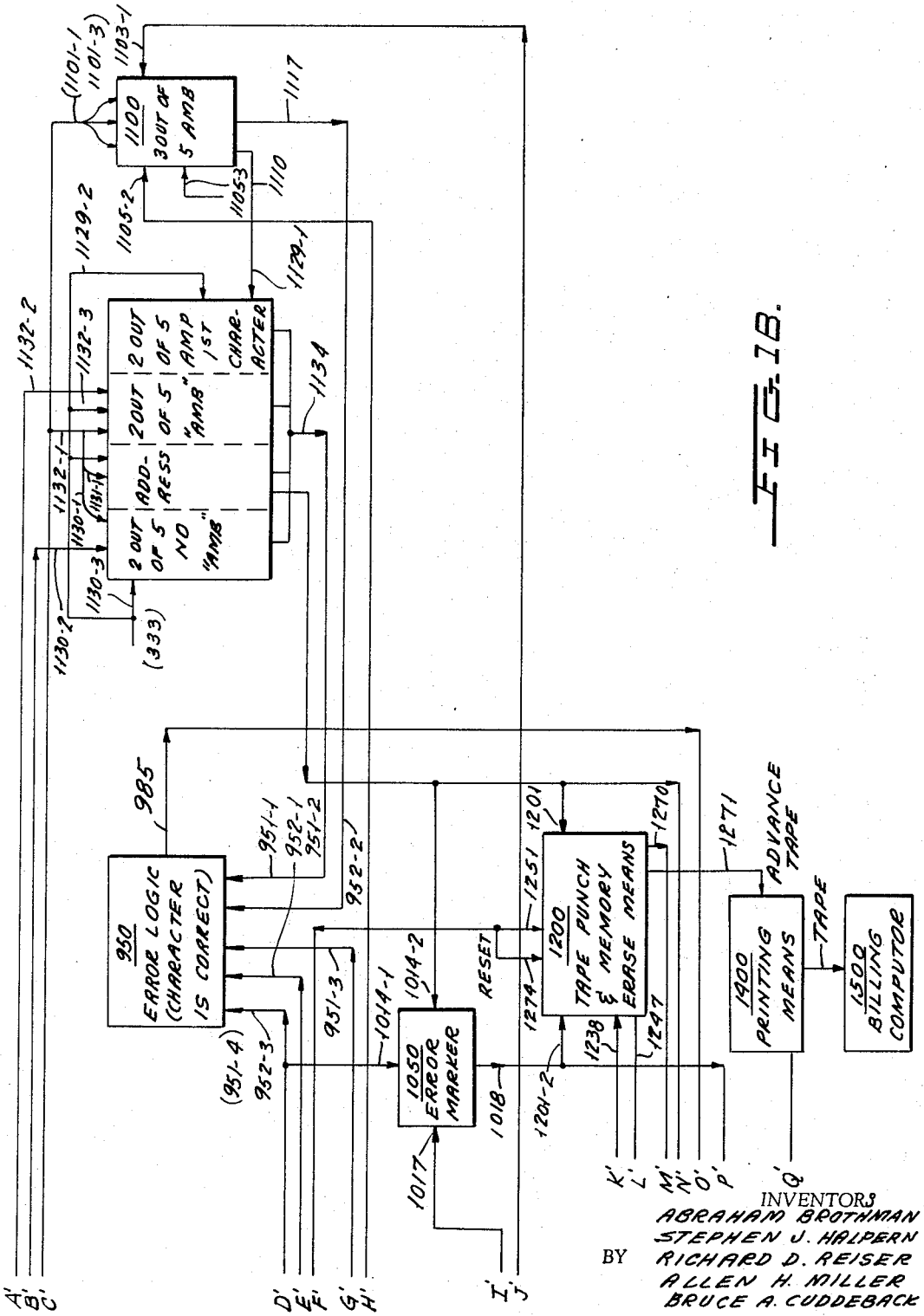

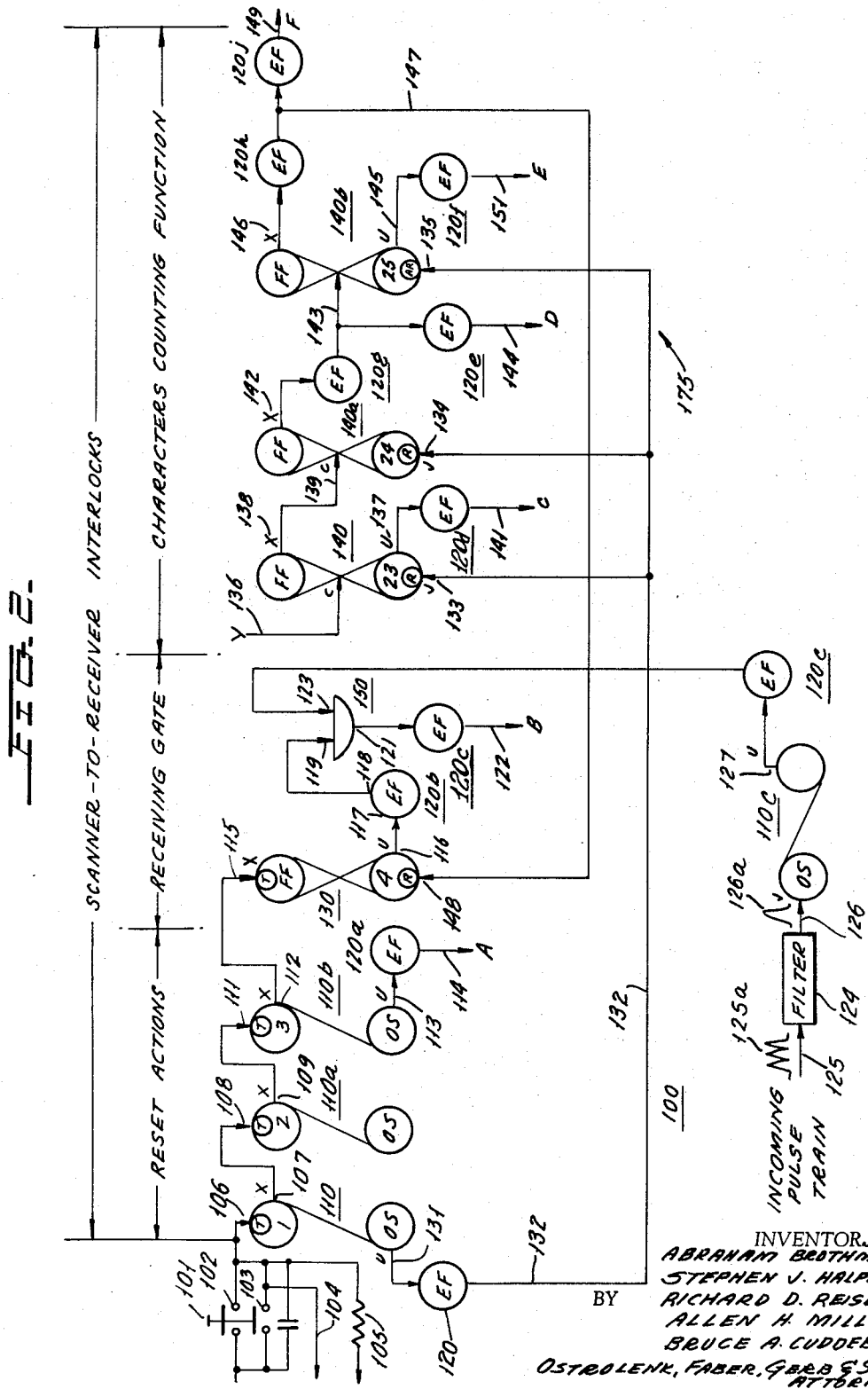

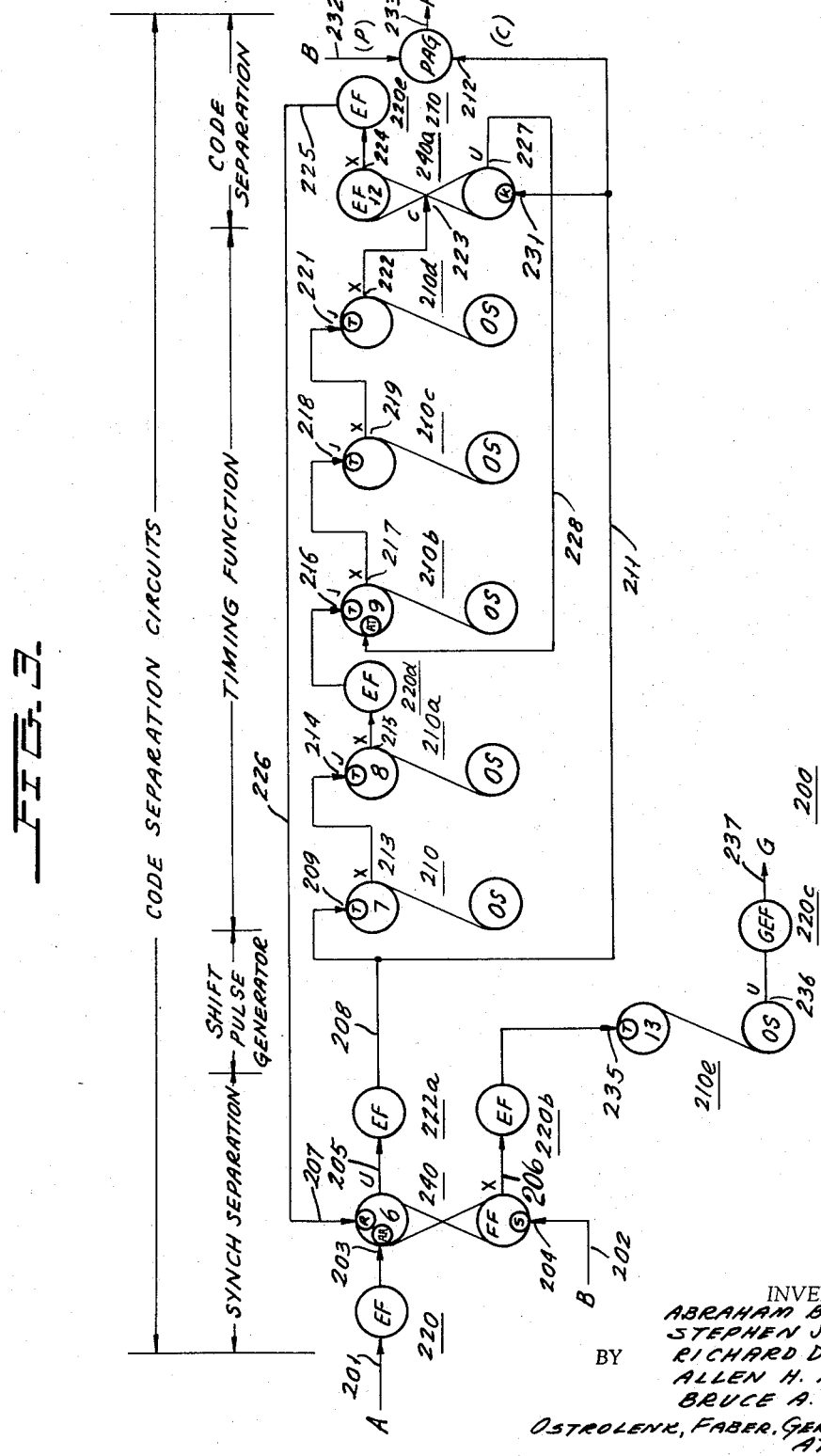

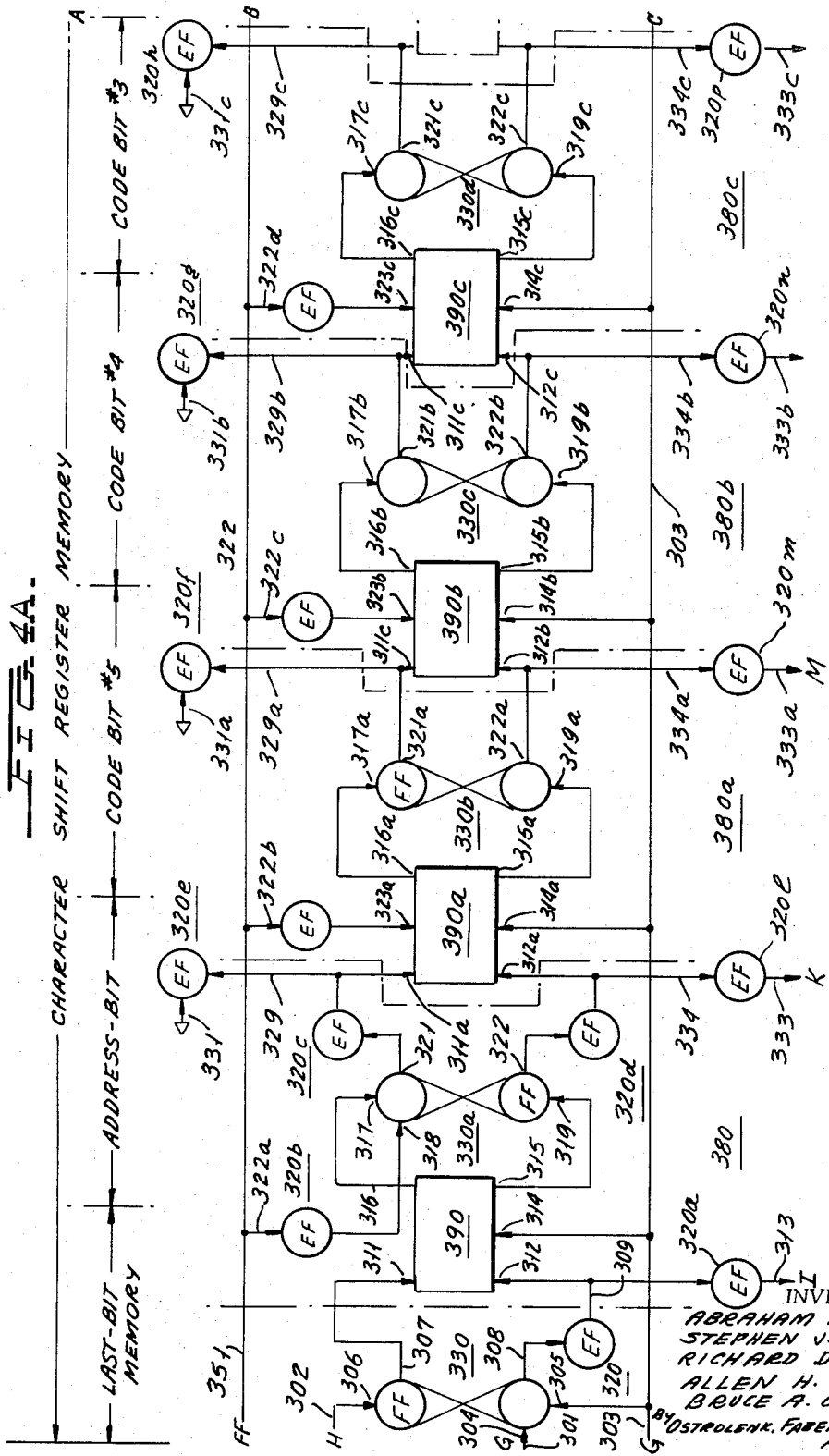

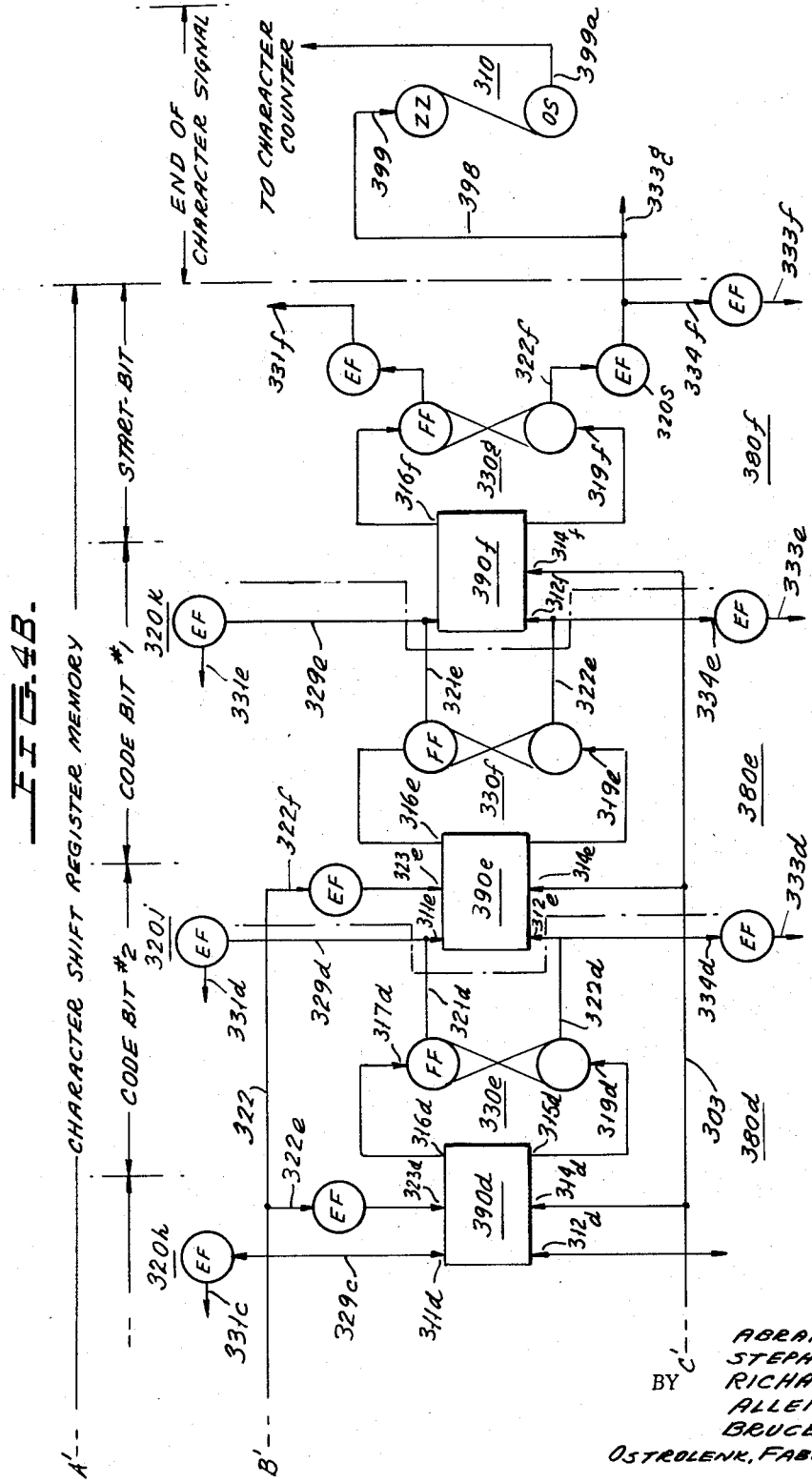

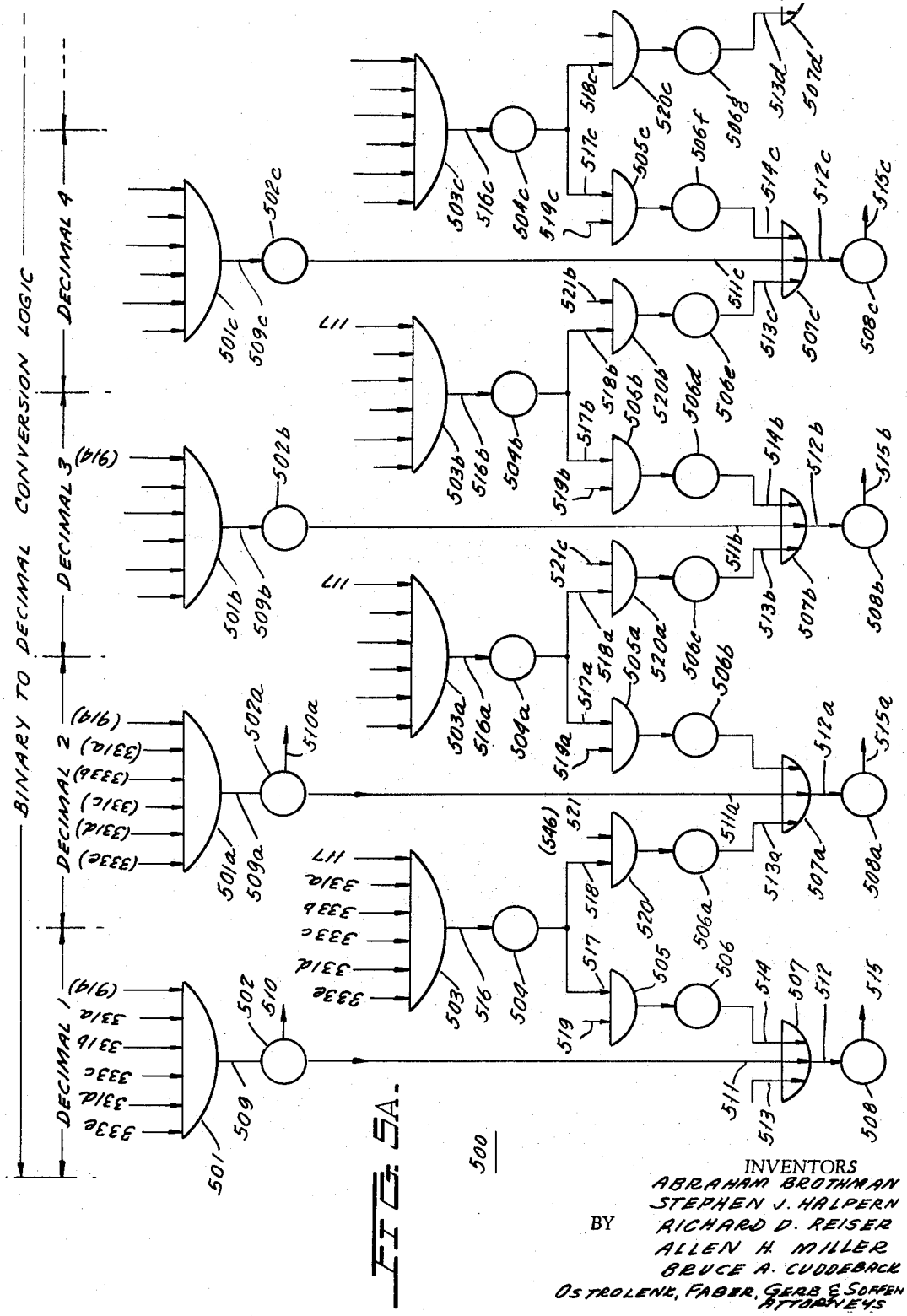

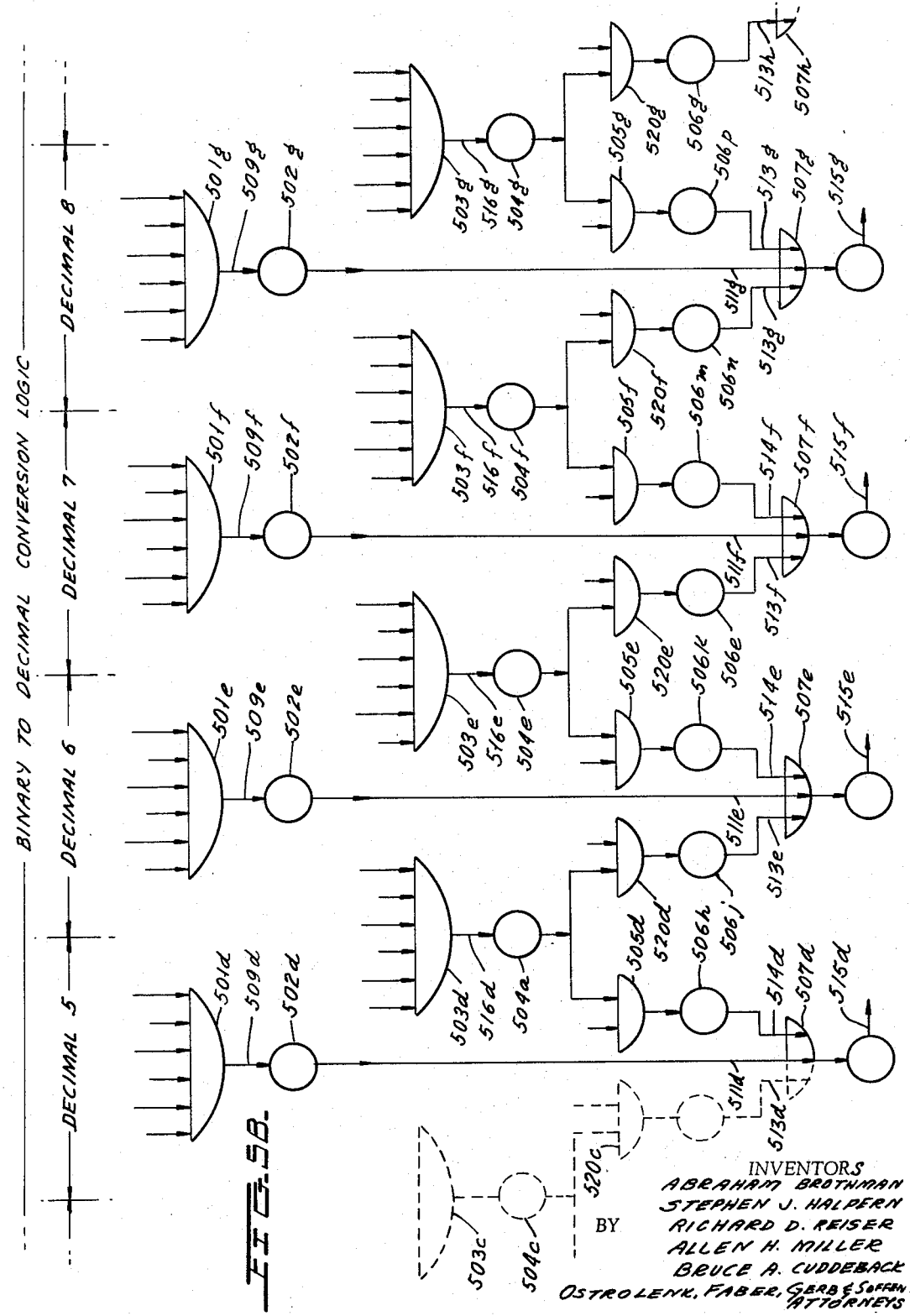

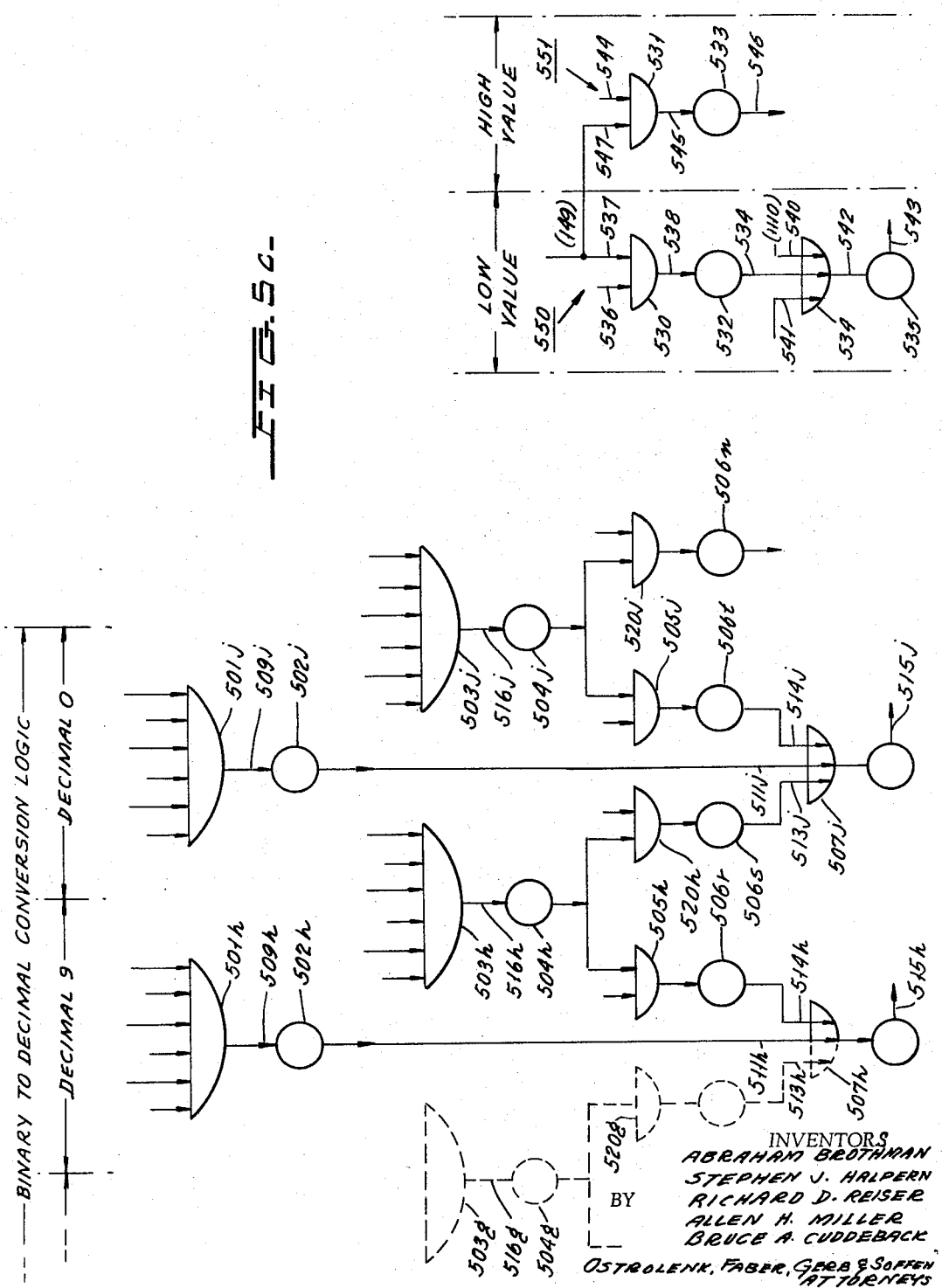

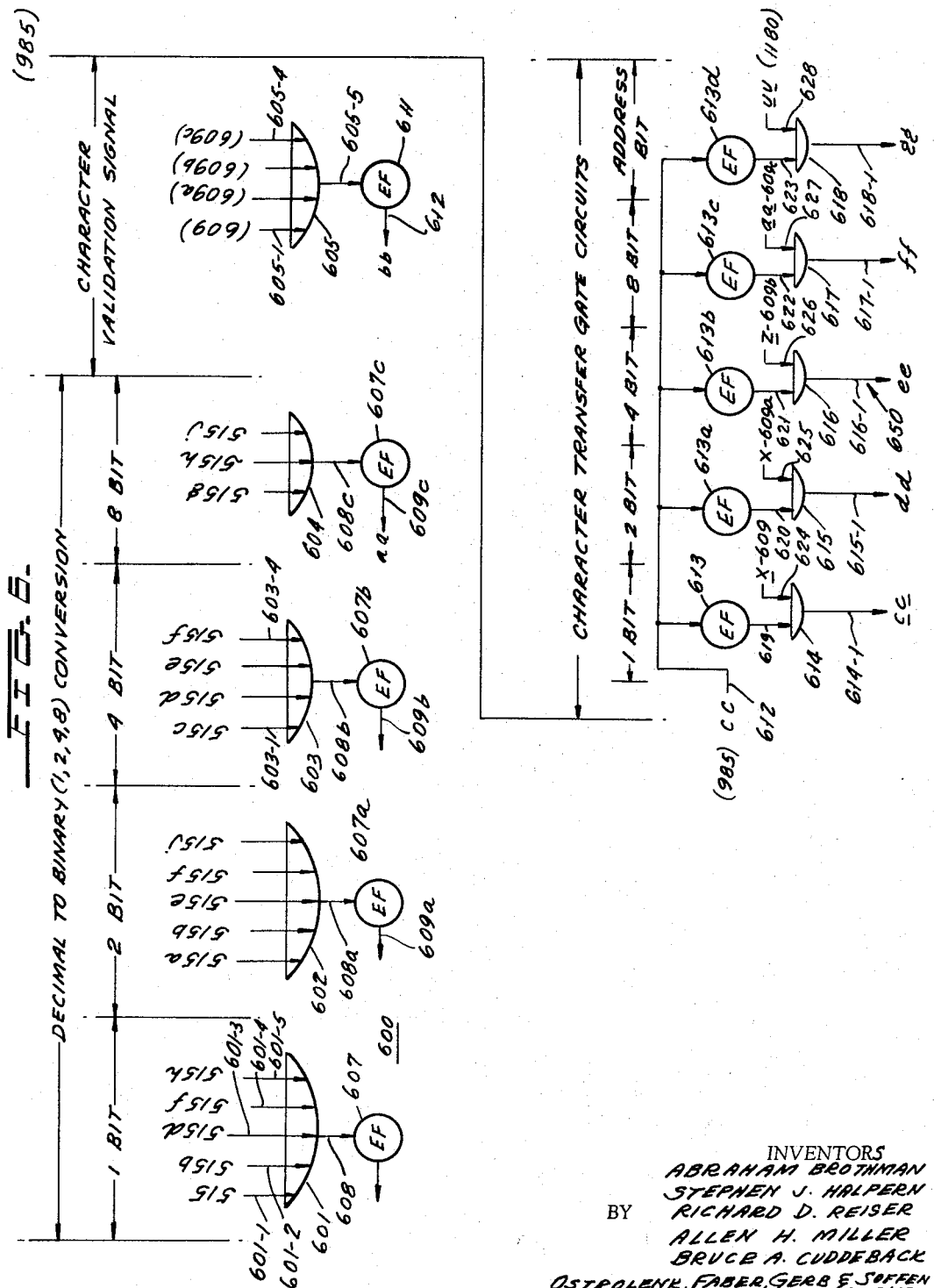

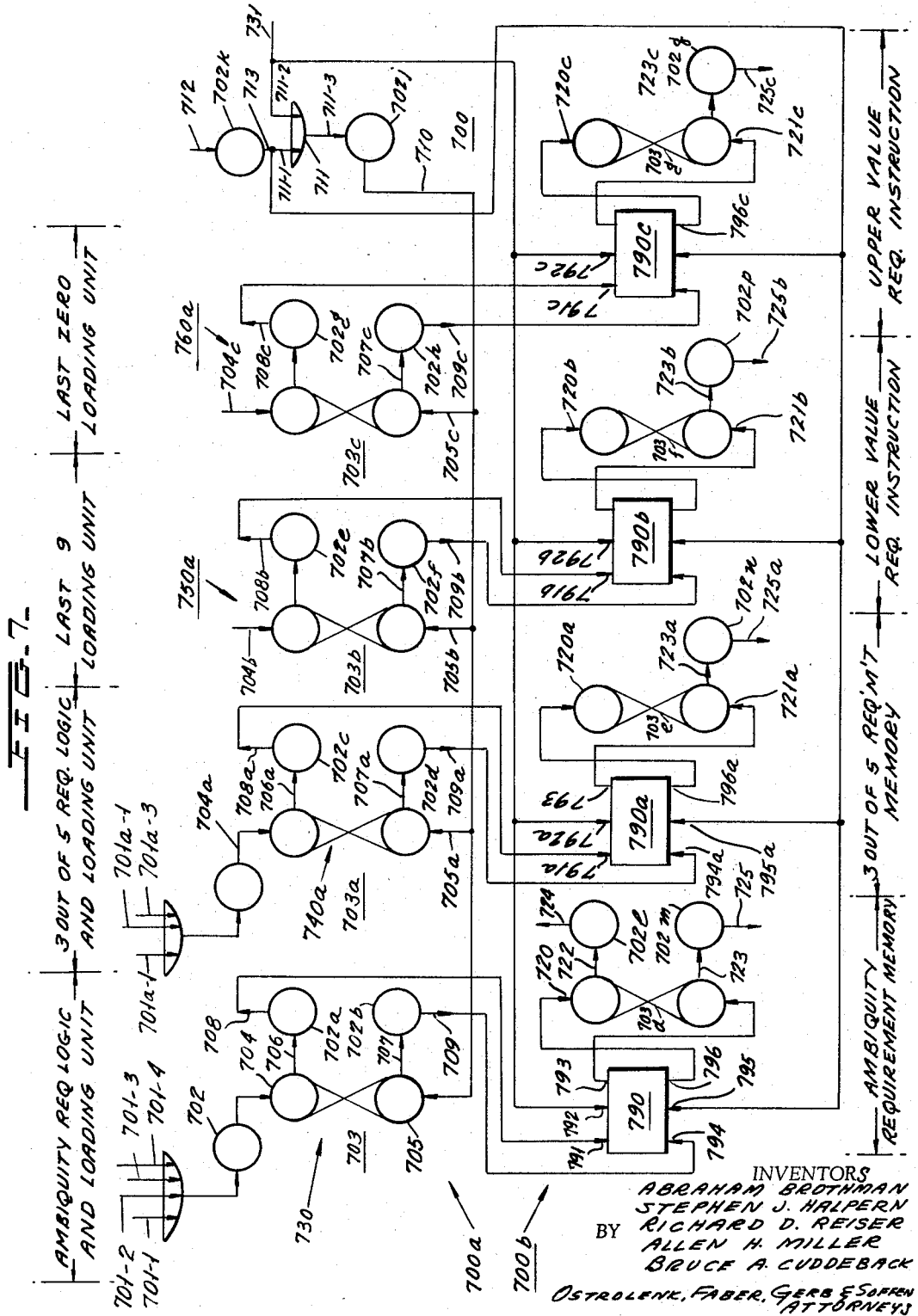

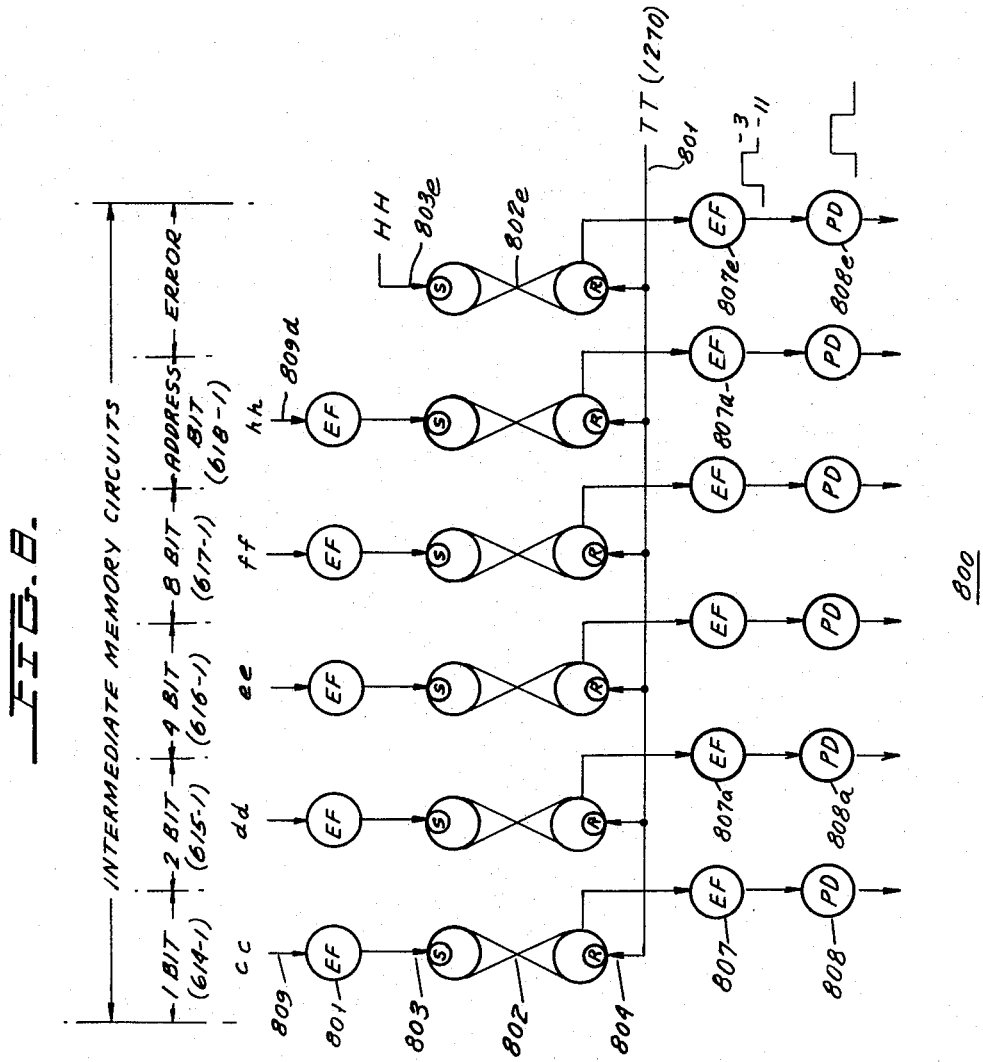

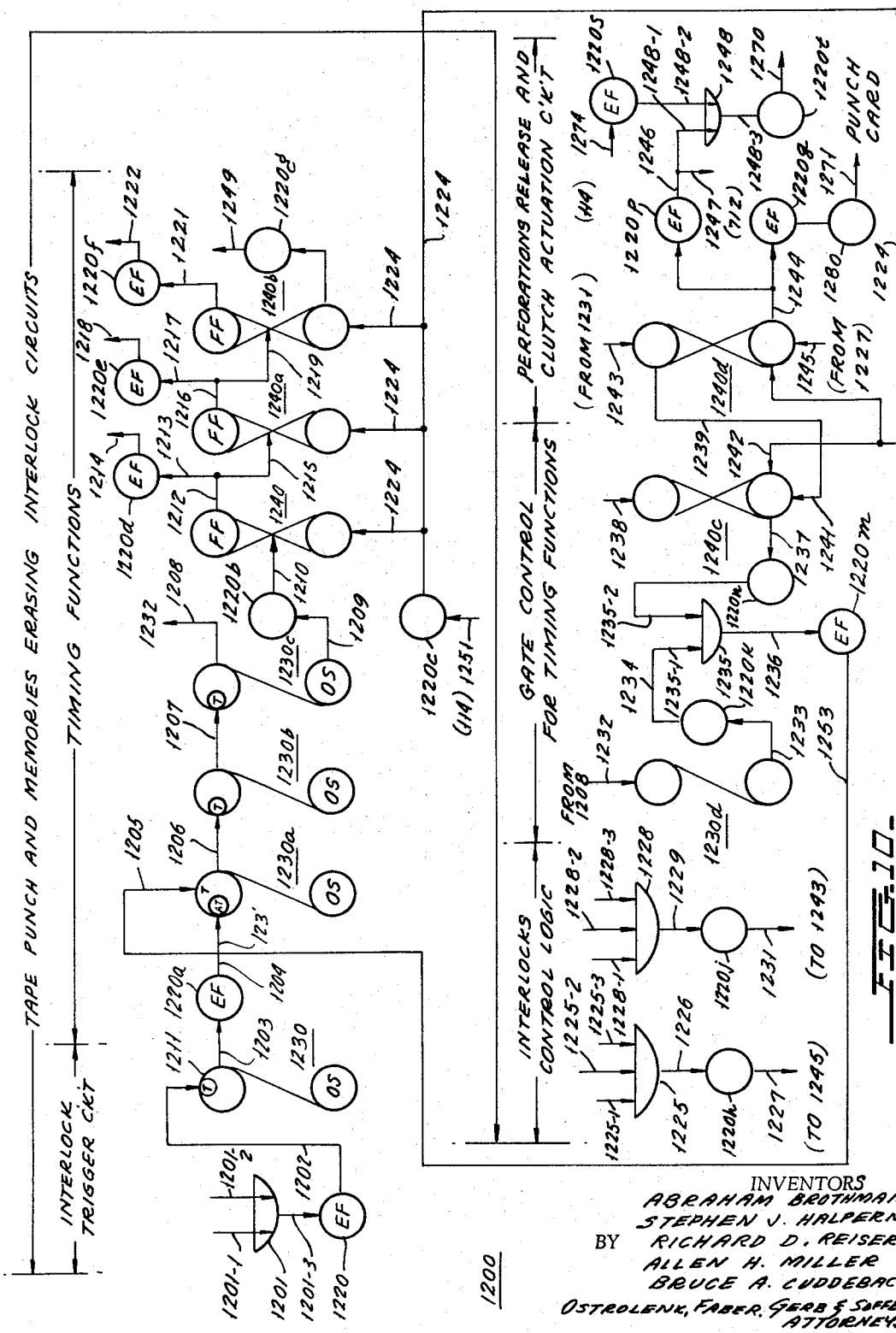

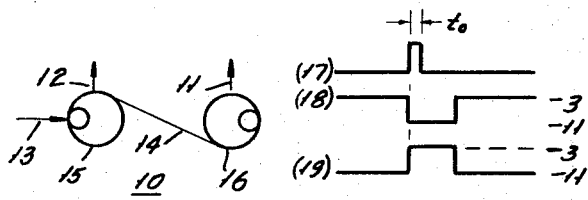
FIG. 11a.
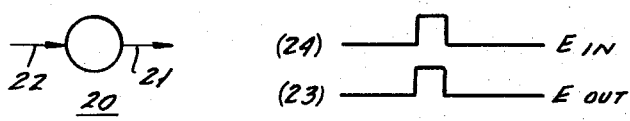
FIG. 11b.
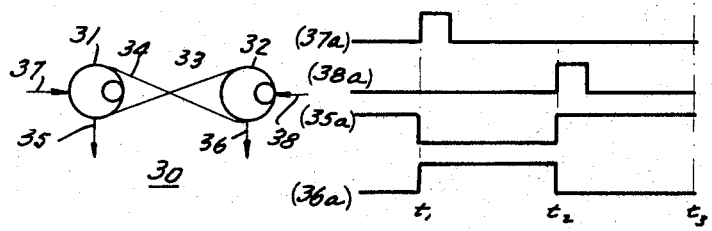
FIG. 11c.
FIG. 11d.
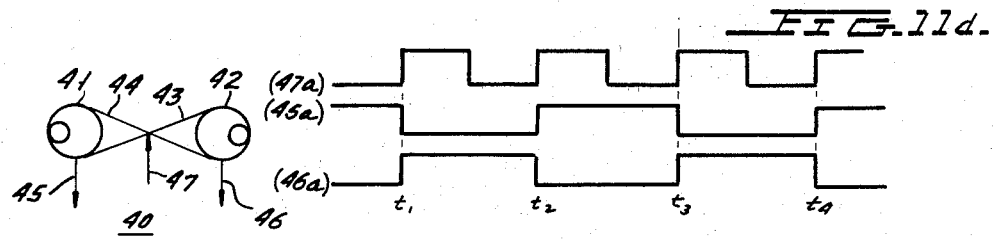
FIG. 11e.
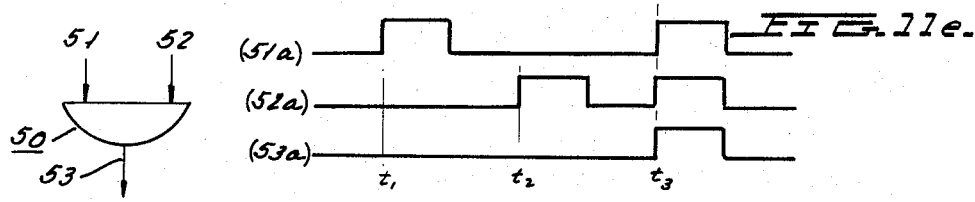
FIG. 11f.
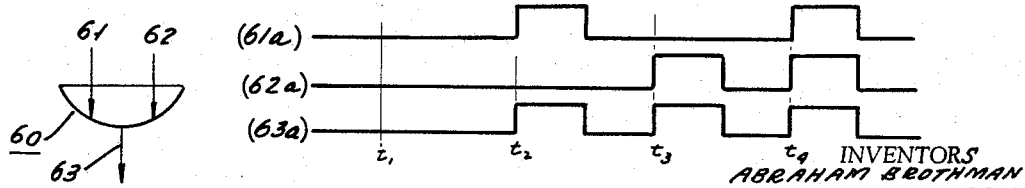

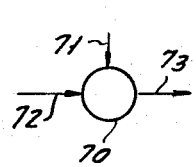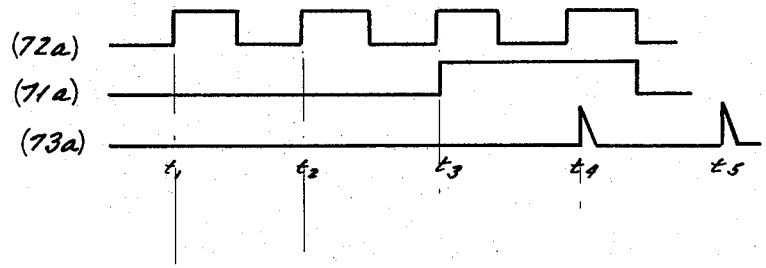
FIG.11g.
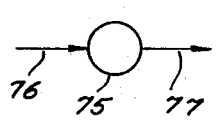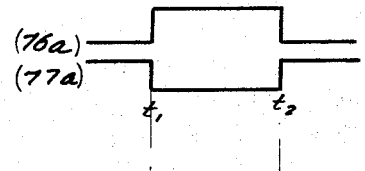
FIG.11h.
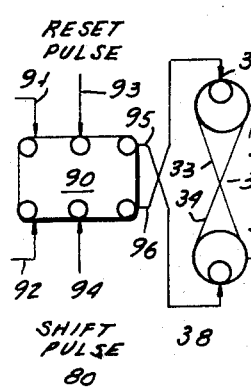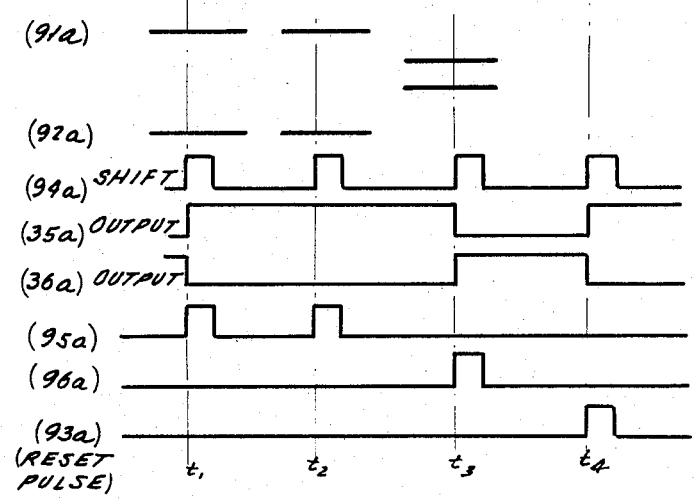
FIG.11K.

INVENTORS
ABRAHAM BROTHMAN
STEPHEN J. HALPERN
RICHARD D. REISER
ALLEN H. MILLER
BRUCE A. CUDDEBACK
BY OSTROLENK, FABER, GERB & SOFFEN
ATTORNEYS

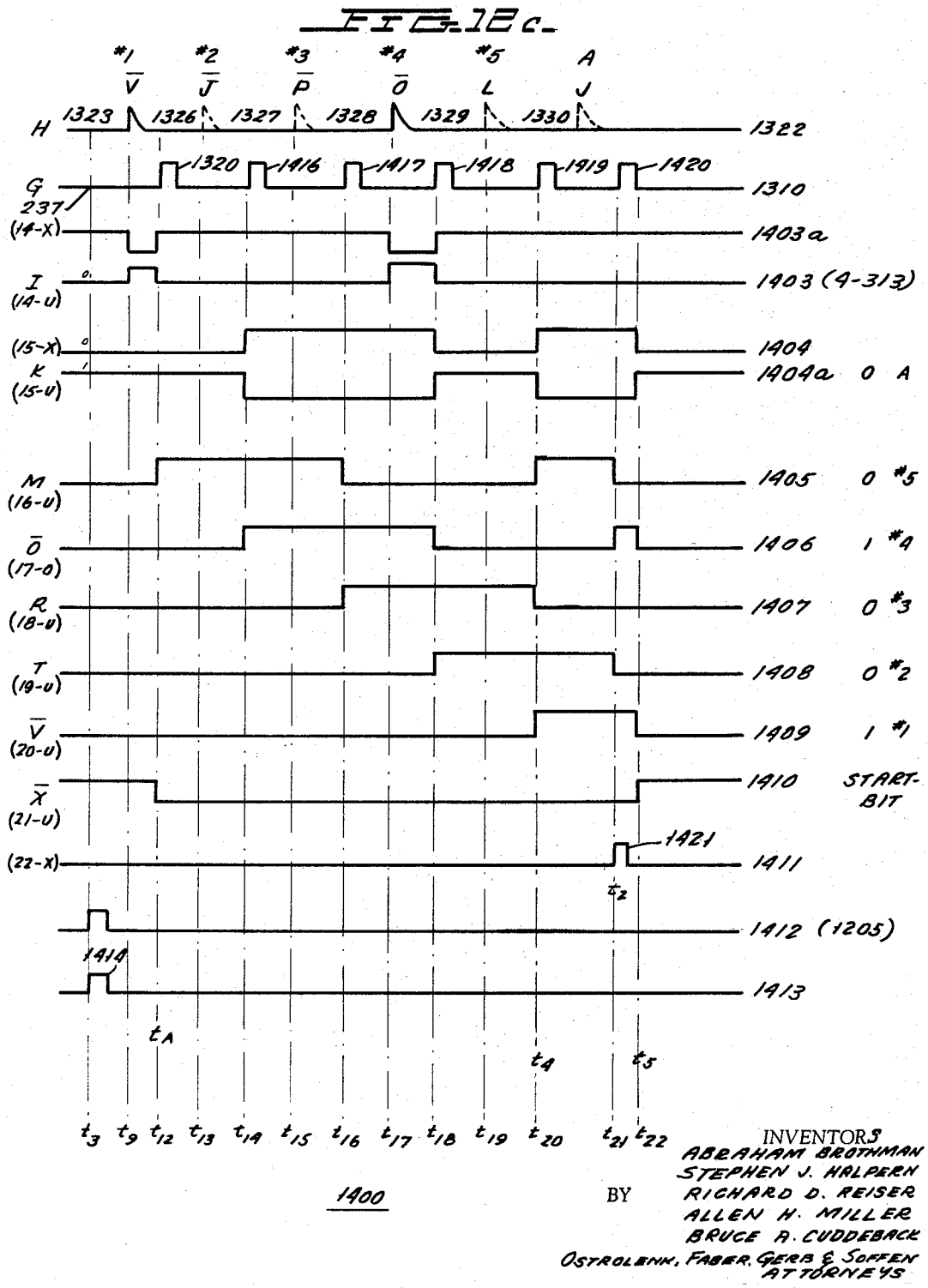

INVENTORS
ABRAHAM BROTHMAN
STEPHEN J. HALPERN
RICHARD D. REISER
ALLEN H. MILLER
BRUCE A. CUDDEBACK
OSTROLENK, FABER, GERB & SOFFEN
ATTORNEYS

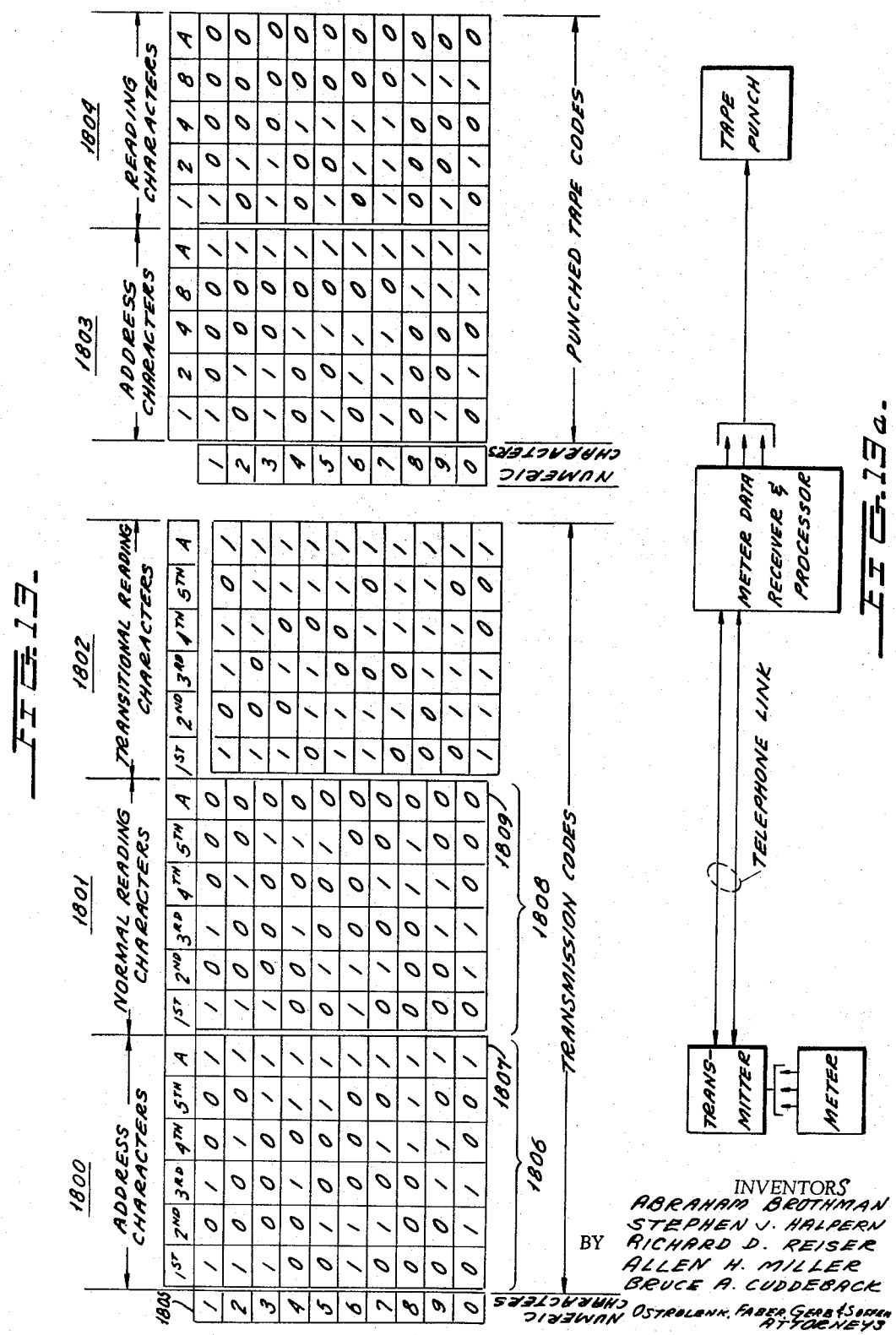

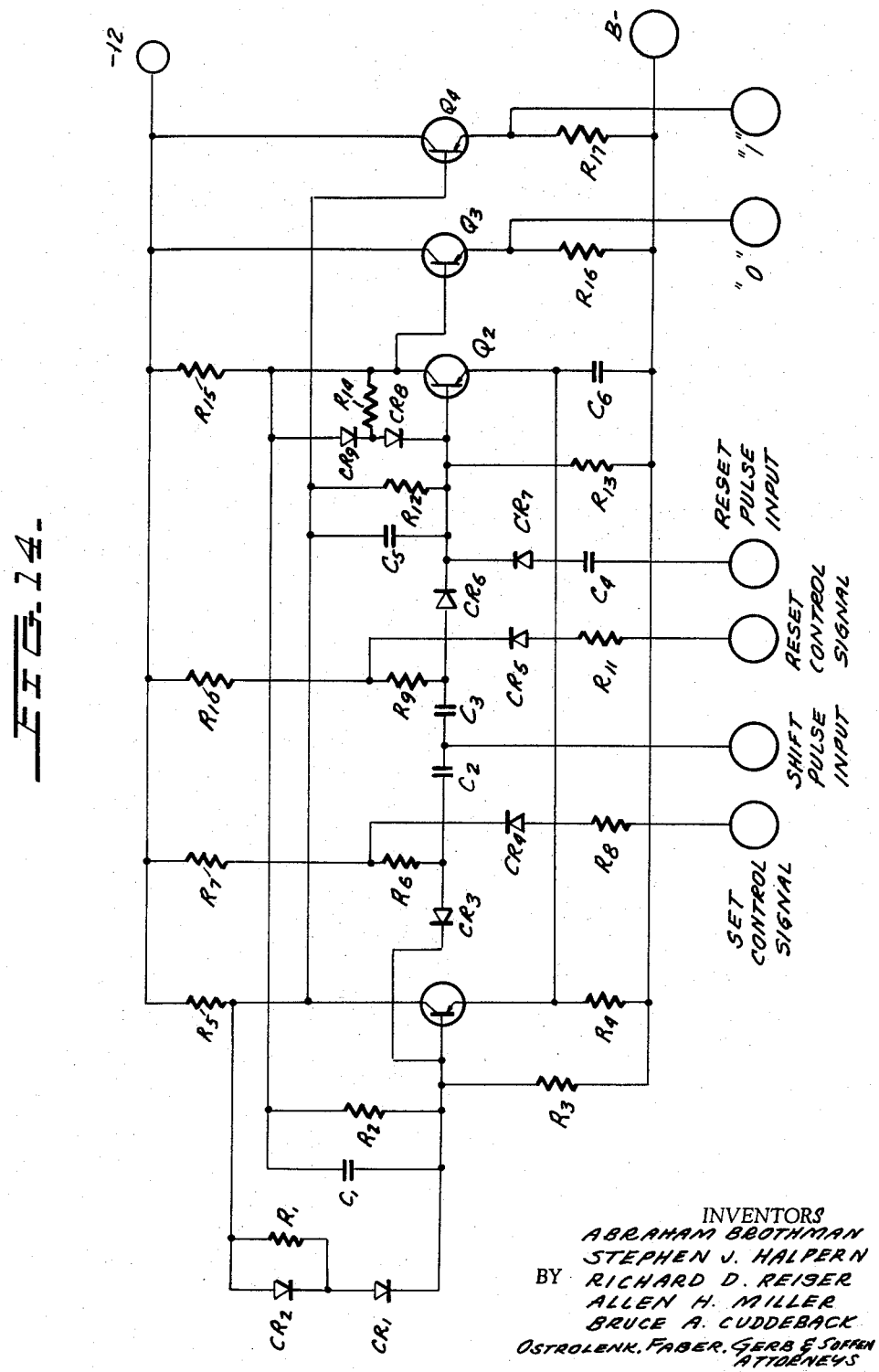

3,328,758
DATA RECEIVER
Abraham Brothman, Dumont, N.J., Stephen J. Halpern, New York, N.Y., Richard D. Reiser, Midland Park, N.J., Allen H. Miller, Laurelton, N.Y., and Bruce A. Cuddeback, Passaic, N.J., assignors, by mesne assignments, to Sangamo Electric Company, Springfield, Ill., a corporation of Delaware
Filed Dec. 3, 1962, Ser. No. 241,917
17 Claims. (Cl. 340—146.1)

This invention relates to communications systems and more particularly to a data receiver for communications system which is so designed as to automatically receive the data impressed thereon to form a plurality of security checks and convert the data to a more useful form when initiated by the receipt of the start pulse from the sending location.

Communications systems, in addition to being employed in systems for the transfer of audio intelligence, find widespread use in transferring alphanumeric data which may be employed for scientific, accounting or control purposes.

One typical system is comprised of a central location having computing facilities for handling large amounts of data, which location is coupled with a plurality of remote locations or branches which are linked with the central location by means of a high speed communications network. Such a system enables the employment of a single, large scale computer arrangement which may be utilized by all of the branch locations associated therewith as an alternative to either (1) a placement of a large scale computer arrangement at each remote location which would be quite prohibitive in cost or (2) a placement of a smaller scale computer arrangement at each branch location wherein each smaller scale computer arrangement has limited flexibility as to the problems which it can handle.

Another typical system arrangement is comprised of a central location having a large scale data processing system for the processing of customer's bills for a particular service or utility such as electricity which is supplied to each subscriber in the network. The central location is coupled to each subscriber or branch location by means of a high speed automatic communications system in which the central location or billing office calls each branch location requesting that that specific location transmit data to the central or billing location which data takes the form of a first group of characters which serves to identify the particular subscriber which is transmitting and a second group of characters which represents the numerical reading of the electric company utility meter. The first and second data groups are received by the central or billing location and processed by the data processing system so as to maintain an up-to-date accounting of the status of each subscriber who is receiving service from the utility company.

In order that such a system may be realized, it is necessary to provide a communications arrangement which may operate at high speeds so as to permit the central location to collect data from all subscribers within a reasonably short period of time. Secondly the system must be highly reliable so as to enable the data processing system to prepare bills for the subscribers which accurately reflect the exact amount of electrical power which has been used by the subscribers to the system.

A meter reading system fitting this general description is set forth in U.S. application Ser. No. 91,043, now Patent No. 3,142,726, which sets forth in detail an entire meter reading system which is comprised of transmitting equipment at each subscriber location which equipment monitors the carrier medium for a transmit request signal from the central location at which time it transmits encoded data to the central location at which point the data is then decoded and fed through a large scale data processing system for the preparation of bills which are then sent to each subscriber.

Since systems of this nature are employed to handle encoded data from subscribers numbering in the tens of thousands, it is extremely important that adequate synchronizing means be provided between the central location and the remote or branch locations so as to permit receipt of data in a uniform sequential fashion. It is also necessary to synchronize the operation of the central location data receiving equipment with the remote location transmission equipments of each remote location so that all of the data transmitted from the remote locations will be received at the receiver end and will not be cut off at the beginning or end of transmission from each individual remote location.

The novel synchronizing arrangement employed in the meter reading system of the aforementioned U.S. application Ser. No. 91,043, now Patent No. 3,142,726, entitled "Automated Meter Reading System" is more fully set forth in U.S. application Ser. No. 126,278, wherein the encoded data transmitted by remote location is interspersed with synchronizing pulses which are utilized by the receiving equipment in order to insure synchronized operation between the central location and each remote location at the time that it is in the transmitting state.

The data receiver of this invention is so designed as to receive the signals transmitted from the remote location and to separate the data pulses from the synchronizing pulses and to further employ the synchronizing pulses so as to convert the combined signals as received from the transmitter location into parallel bit groups where each group represents an alphernumeric character which has been transmitted.

In order to insure that the data has been transmitted to the central location correctly, error checking circuits are normally employed to apprise the system operators of the occurrence of any errors in transmission and/or reception. In systems of the type described it becomes necessary to provide a sophisticated error checking arrangement in order to reduce the probability of failure to note an error measurably. For example, in data transmission systems where the data is encoded in a binary arrangement it is well known to employ a parity check system, wherein the count of the number of binary ones in each character is generated by a character count circuit at the central location, which character count be it odd or even is compared against a parity check bit which accompanies each character transmitted from the remote location to the central location so as to enable a comparison to be made at the central location between the parity check bit accompanying each binary coded character which has been transmitted from the central location with the parity check bit located at the central location. An arrangement of this nature is not guaranteeing the accuracy of the data transmitted since the number of binary ones occurring in a binary coded character, does not insure that the binary ones have been transmitted in their proper weighted position. For example, the binary coded representation for the decimal number 3 which is 0011 contains the same number of binary ones as the binary representation for the decimal number 6 which is 00110. Thus it can be seen that the parity check operation, does not guarantee that that character transmitted is correct since favorable comparison with respect to the total count does not insure that the binary ones have been transmitted in their proper sequential order. The receiver system of this invention is so arranged as to perform a plurality of levels of security checks upon the data being received at the central location by providing a memory circuit which is employed to note the condition of the last received character so that the condition of this character may be compared with the next character received in order to check the presently received character for validity. This plural level security check arrangement is especially adapted for use with the encoding arrangement set forth in the U.S. application Ser. No. 125,247, now Patent No. 3,165,733 which sets forth a unique coding arrangement wherein each decimal number in the coding system is unique from the binary representation for every other decimal number in the system. A first group of binary coded characters in the coding system represent the decimal numbers 0 through 9. A second group of binary coded characters in the system represent the combination of the coding for adjacent decimal characters. By that is meant, that the binary representation for the decimal number 2 is combined by an "OR" operation with the binary coded representation which belongs to the second group of coded characters to thereby represent a "smear" reading between the two coded characters. Likewise, the binary representation for the decimal number 2 is combined with the binary representation for decimal number 1 to form a second coded character belonging to the second character code group. The coded characters of the first code group form a unique 2 out of 5 non-ambiguity code where each coded decimal character is unique from every other decimal character. The second character groups consists of ten unique binary coded characetrs in 3 out of 5 code wherein the representation number is unique from every other decimal number. The 3 out of 5 coded characters are further identified by an accompanying bit containing a binary one so as to make the 2 out of 5 code readily distinguishable from the three out of five group.

This coding arrangement is especially adaptable for transmitting data from counting meters, such as the meters employed for the recording of services rendered by a public utility such as the gas, electric or water companies. Meters of this type are provided with a plurality of dials and accompanying rotating pointers associated with each dial which are:

Assuming, the employment of a meter having four such dial face arrangements with a numeric reading (reading from left to right) of 3, 7, 9, 0. It should be noted as is set forth in great detail in the aforementioned U.S. application Ser. No. 125,247, now Patent No. 3,165,733 that the dial hands associated with each dial do not point exactly to the numbers 3, 7, 9, and 0 respectively, but the hand of the lefthandmost dial will be approximately 79% of the distance between the number designations 3 and 4 on its associated dial. Likewise the hand associated with the next most significant dial will have its hand almost to the number 8 designation on the dial face. Since these shaft positions or analog readings as they are known are encoded into binary form for transmission purposes the unique code set forth in the aforementioned U.S. application Ser. No. 125,247, now Patent No. 3,165,733 has been developed in order not only to identify the decimal number of the associated dial but also to identify what the value of the next most significant decimal number will be even before the transmission of the next most significant number by the remote location.

For example, with the reading of the two most significant digits 37 (of the number 3790) the visual observance of these dial faces will show the hand of the most significant decimal digit occupying a position closer to the number 4 designation than the number 3 designation to indicate therefore, so that the observance of the next most significant dial will show the associated hand of that dial pointing to a decimal number which is greater than the decimal number 5. Thus, by coding this information into the binary coded representation for the decimal number 3 it is possible to compare the next most significant digit (7) with the information received with the preceding coded character (3) in order to insure the reliability of that character.

This unique coding arrangement is even more reliable than a reading made by a human observer since it permanently memorizes the position of the dial hand of the most significant bit and takes its position into consideration when receiving the reading of the next most significant digit, whereas human observation is not absolutely predicated on such a (memory) arrangement and is therefore a less reliable system.

The data receiver of this invention is provided with a memory circuit which recognizes the different coded characters of the multiple code groups transmitted by the remote location. In order to compare this information with the next subsequent character transmitted, in order to insure its reliability and correctness, the comparison circuitry finds a favorable comparison operation and transfers the binary coded character examined by the circuit to a permanent storage means such as a punched paper tape, for example. If the comparison is unfavorable, the comparison circuit causes the storage means (i.e. the tape punch) to note the error in that particular character by impressing an error punch that is part of the punch tape code for that particular character.

The data receiver of this invention further includes a novel shift register arrangement having a character counting means. The character counting means is especially adapted for use in systems of the type in the aforementioned U.S. applications Ser. No. 91,043 (now Patent No. 3,142,726); Ser. No. 125,247 (now Patent No. 3,165,733); Ser. No. 126, 278 (now Patent No. 3,219,758) and Ser. No. 162,337 (now Patent No. 3,196,213) wherein the remote location transmits data to the central location, wherein the first group of characters of the data transmitted constitutes the remote location identification number and the second group of characters constitutes the encoded reading, while the meter at the remote location, the characters comprising the identification number, are set forth in greater detail in U.S. application Ser. No. 126,278, now Patent No. 3,219,758 is permanently programmed into the remote location transmitter. The characters' counter circuit by counting the characters received, is able to distinguish address characters from the encoded meter reading characters. The characters' counter is connected to the error monitoring circuitry for the purpose of enabling the error monitoring circuitry to distinguish between address and meter reading characters.

The electronic interlock circuitry, is provided for synchronizing operation of the permanent and intermediate memories of the data receiver with the serial to parallel conversion and error monitoring operations. The interlock circuitry is designed to reset the intermediate memory which transfers data left to the error monitoring operating to the permanent or punch tape memory. The reset operation is performed prior to the error monitoring operation of the next coded character simultaneously therewith, the paper tape is advanced in readiness for the next punching operation.

The interlock circuitry includes a counting arrangement which advances the paper tape one step between the end of the address portion and the beginning of the meter reading portion of the characters transmitted from each remote location so that they are easily identified. The counting arrangement is further adapted to advance the tape one step between the last character of transmission from one remote location and the beginning or first character of transmission from the next remote location transmitting, thus enabling the transmission from each remote location to be readily identifiable and likewise, to easily distinguish the address portion from the meter reading portion of the characters transmitted from each remote location.

The binary to decimal to binary conversion arrangement provided in the data receiver of this invention further includes circuitry for selection of either high or low value of a combined binary coded decimal character transmitted from the remote location. The high-low selection circuit is designed to sense the condition of the coded character presently being received by the data receiver and comparing this coded character received by the data receiver with the last received coded character, in order to ascertain whether the high or low value is to be selected for transfer to the permanent or punch tape storage means.

It is therefore one object in this invention to provide a data receiver for a communication system having a novel code separation circuit which is designed to separate code pulses from synchronizing pulses of the incoming pulse train.

Another object of this invention is to provide a data receiver for a communication system having a novel code separation circuit and serial to parallel conversion circuit which is operated under control of the code separation circuit so that the separated sync pulses are employed for shifting code puses through the shift register circuitry.

Another object of our invention is to provide a data receiver for a communication system having error-monitoring circuitry which is so designed as to compare each character being transmitted with the last preceding character in order to ascertain the accuracy of the character presently being received.

Still another object of this invention is to provide a data receiver for a communication system which comprises errormonitoring circuitry for selecting the upper or lower value of an ambiquous signal which has been received.

Still another object of this invention is to provide a data receiver for a communications network comprising errormonitoring circuitry having a character counting facility for distinguishing between address characters and data characters during the error checking operation.

Still another object of this invention is to provide a data receiver for a communication system comprising interlock circuitry for synchronizing the operation of the data receiving, converting and errormonitoring operations with the operation of the permanent storage means.

These and other objects will become apparent after reading the following description of the accompanying drawings in which:

FIGURE 1 (which compirses FIGURES 1A and 1B) is a block diagram of the data receiver of this invention.

FIGURE 2 is a logical diagram showing the reset circuit, receiver gate and character counter of FIGURE 1 in greater detail.

FIGURE 3 is a logical diagram of the code separation circuitry of FIGURE 1.

Figure 12A:
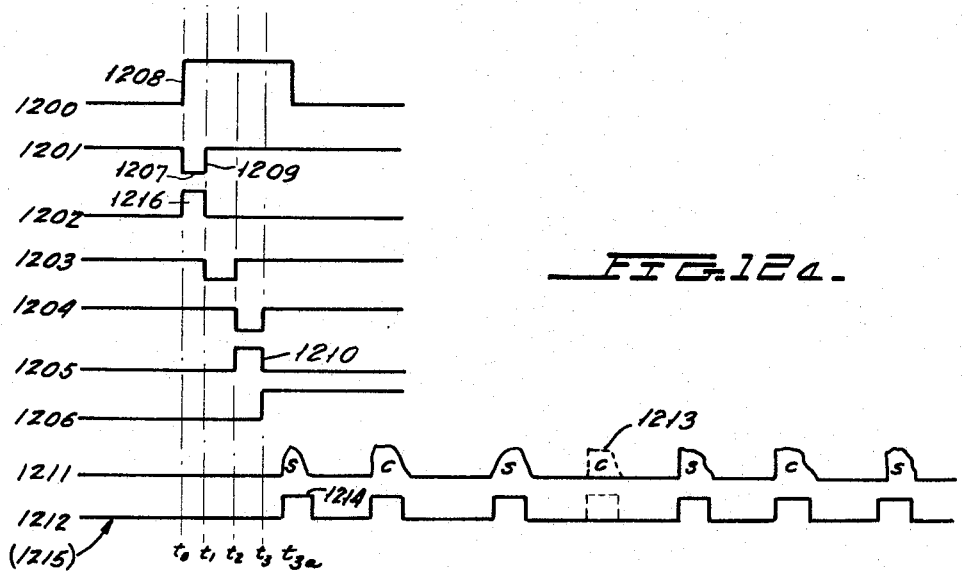

FIGURE 4 (which comprises FIGURES 4A and 4B) is a logical diagram of the shift register shown in the data receiver of FIGURE 1.

FIGURE 5 (which comprises FIGURES 5A, 5B and 5C) is a logical diagram of the binary to decimal to binary conversion circuit and the high-low value selection circuit of the data receiver of FIGURE 1.

FIGURE 6 is a symbolic diagram of the decimal to binary conversion circuit, character validation circuit and character transfer gate circuit shown in the data receiver of FIGURE 1.

FIGURE 7 is a symbolic diagram of the error loading and memory circuits shown in FIGURE 1.

FIGURE 8 is a logical diagram of the intermediate memory circuit of FIGURE 1.

FIGURE 9 (FIGURES 9A–9F) shows the error monitoring circuits of FIGURE 1 in logical form.

FIGURE 10 and FIGURES 10a–10c is a logical diagram of the interlock circuit employed for synchronizing all of the operations of the data receiver automatically.

FIGURES 11a through 11h set forth the logical elements employed in FIGURES 2 through 10 together with their associated waveforms.

FIGURE 11k sets forth the symbolic diagram for a stage of the shift registers shown in FIGURES 1 and 4.

FIGURES 12a through 12f set forth various waveforms employed in describing the operation of various circuits.

FIGURES 13 and 13a sets forth the coding arrangements which may be utilized in a communications system employing the data receiver of this invention.

FIGURE 14 is a schematic diagram of the shift register stage of FIGURE 11k showing the shift register stage in greater detail.

Referring now to the drawings:

*Basic circuitry*

FIGURE 11a shows the logical symbol 10 which represents a "single shot," multivibrator or "monostable" flip-flop circuit. The circuit is arranged so as to remain in a condition of stable equilibrium in only one of its two possible states. In the absence of any external signals the voltage level at the output terminal 11 of the right-hand half sixteen of multivibrator 10 is at the binary zero voltage level, since the right-hand half 16 of the multivibrator 10 is in the cut-off state. The binary zero level in the particular embodiment herein is minus eleven volts, for example. The cut-off state of the right-hand side 16 of "one-shot" multivibrator 10 is due to the state of the left-hand side 15 of the multivibrator 10 which is adjusted by the appropriate parameters (not shown) which place the left-hand side 15 of multivibrator 10 in the conductive state so that the output terminal 12 of one-shot multivibrator 10 is in the binary one state which is a DC level of minus-three volts, for example.

The transition of the multivibrator from the stable state to the unstable state is induced by the application of a positive trigger such as the waveform 17, which is applied at the control or input terminal 13 of the left-hand state 15. It should be noted that the triggering is unsymmertical; that is, that the trigger is applied only to the left-hand state at the control terminal 13, and not to both stages 15 and 16 simultaneously. The left-hand stage 15, which is triggered into the cut-off state causes the voltage level at the output terminal 12 to drop from the binary one to the binary zero level. This voltage level at the output terminal 12 is coupled to the control terminal (not shown) of the right-hand stage 16, which connection is represented by the diagonal line 14. This connection, coupling the voltage level on output terminal 12 to the control terminal of right-hand stage 16 drives the right-hand stage into conduction, causing the voltage level at the output terminal 11 to rise to the binary one level, as shown by the waveform 19. The cross-coupling between left-hand 15 and right-hand 16 causes the right-hand stage 16 to be driven abruptly into cut-off due to the trigger pulse 17 impressed at the input terminal 13. This is due to the circuit elements (not shown) included in the cross-coupling 14 which cannot change their voltage drops instantaneously.

After a predetermined time period, however, these circuit elements (not shown) discharge the voltages which they instantaneously had stored causing the right-hand stage 16 to return to its cut-off state, as shown by waveform 19, while the left-hand stage 15 returns to its conductive state, thus generating the waveforms 19 and 18 respectively. It should be noted that the circuit parameters employed in the one-shot multivibrator 10 may be adjusted to vary the pulse width T–1 of the pulses generated by one-shot multivibrator 10. It should also further be noted that the pulse width $T_1$ of waveforms 18 and 19 bear no relationship whatsoever to the pulse width $T_0$ of the trigger waveform 17.

FIGURE 11b sets forth the symbol employed for representing an emitter follower circuit which is employed for impedance matching and isolation purposes. The emitter follower 20 operates so as to generate a waveform 23 at its output terminal 21 which is substantially identical in pulse width and pulse height to the input waveform 24 impressed upon the emitter follower input terminal 22.

FIGURE 11c shows the symbol 30 employed to represent a dual input flip-flop for bi-stable flip-flops. The flip-flop circuit 30 is comprised of left- and right-hand amplifier stages 31 and 32, having cross-coupled connections 33 and 34, such that the output terminal 36 of the right-hand stage 32 is connected to the control terminal (not shown) of the left-hand stage 31 and the output terminal 35 of the left-hand stage 31 is connected to the control terminal (not shown) of the right-hand stage 32. The left- and right-hand stages 31 and 32 are cross-coupled in what is known as the DC coupling arrangement so as to provide bi-stable action; that is, to provide stability in both states to which the flip-flop can assume.

The operation is such that the circuit parameters (not shown) of the flip-flop 30 are designed to place the right-hand stage 32 initially in the cut-off state. This places the output terminal 36 at the binary zero level as shown by waveform 36a. This binary zero voltage level at output terminal 36 is coupled to the control terminal of the left-hand stage 131, driving this stage into conduction. The voltage at the output terminal therefore is at the binary 1 level as is shown by the waveform 35a.

At the instant that a trigger pulse 37a is impressed upon the input terminal 37 at time $t_1$ the positive voltage on the control terminal of left-hand stage 31 drives left-hand stage 31 into the cut-off state, causing the voltage level at output terminal 35 to drop to the binary zero level at $T_1$ as shown by wavefrom 35a. The binary zero level at output terminal 35 is cross-coupled to the right-hand stage 26, driving it to the conductivity state, causing the voltage level at output terminal 36 to rise to the binary one level, as shown by waveform 36a. This regenerative cross-coupling retains left-hand and right-hand stages 31 and 32 in the cut-off and conductive state respectively for an indefinite period of time.

Upon the occurrence of a reset trigger 38a which is impressed upon the input terminal 38 of right-hand stage 32 at time $t_2$, amplifier stage 32, which was in the conductive state is driven to the cut-off state by trigger pulse 38a driving the output level at terminal 36 to the binary zero voltage level as shown by waveform 36a. Output terminal 36 is cross-coupled to the control terminal of left-hand stage 31, driving left-hand stage 31 into the conductive state, causing the voltage level at output terminal 35 to rise to the binary one value. Flip-flop 30 will likewise remain in this state indefinitely in the absence of any external pulse. It should be noted that two positive trigger pulses impressed in succession on one of the input terminals 37 and 38 will not act to both set and reset flip-flop 30, but only the first pulse will cause flip-flop 30 to make a transition from one state to the other.

FIGURE 11d portrays the logical symbol which represents the binary flip-flop which although capable of stabilizing itself in either one of two stable states for an indefinite period of time, differs from the dual input flip-flop 30, shown in FIGURE 11c; in that, one common input terminal 47 is provided and that a train of trigger pulses 47a, impressed upon input terminal 47 will act to cause binary flip-flop 40 to experience a transition upon the occurrence of each trigger pulse appearing at its input terminal 47.

The binary flip-flop 40 is so designed as to have its right-hand stage 42 initially in the cut-off state, in the absence of any external signals. This places output terminal 46 of stage 42, at the binary zero level, as shown by waveform 46a. This binary zero level is cross-coupled to the control terminal (not shown) of stage 41, driving amplifier stage 41 into the conductive state, thus placing output terminal 45 at the binary one voltage level as shown by waveform 45a. The impression of a positive trigger pulse 47a at time $t_1$ impresses a positive, or binary one level voltage at the control terminals of the left- and right-hand stages 41 and 42 simultaneously. Since the right-hand stage 46 is already in the cut-off state, the trigger pulse impressed at time $t_1$ has no effect on right-hand stage 42. However, the trigger pulse drives left-hand stage 41 into the cut-off state causing the voltage at output terminal 45 to drop abruptly. This voltage drop is cross-coupled to the right-hand amplifier stage 42, driving right-hand stage 42 towards conduction. A regenerative action takes place until right-hand amplifier stage 42 is driven into conduction and left-hand amplifier stage 41 is driven into cut-off, thus generating a binary one level voltage at output terminal 46, and a binary zero level voltage at output terminal 45, as shown by waveforms 46a and 45a respectively. Upon the occurrence of the next trigger pulse at time $T_2$, the positive trigger voltage impressed upon input terminal 47 has no effect upon right-hand stage 42, which is already in the cut-off state. However, the trigger pulse 47a drives the left-hand amplifier stage 42 into the cut-off state, thus causing a reversal of the left- and right-hand stages 41 and 42 at time $t_2$ shown by waveforms 45a and 46a.

FIGURE 11e portrays the symbol 50 representing a logical AND gate having input terminals 51 and 52, and output terminal 53, which circuit is so designed as to generate an output voltage of binary one level upon the occurrence of binary one signals appearing at both input terminals 51 and 52 as can be seen in waveforms 51a through 53a upon the occurrence of a binary one level at input terminal 51, at time $T_1$ and a binary zero level at input terminal 52, output terminal 53 remains at the binary zero level. Likewise, upon the occurrence of a binary one level signal at input terminal 52 as shown by waveform 52a and a binary zero level at terminal 51 as shown by waveform 51a, output terminal 53 at time $T_2$ remains at the binary zero level, however, at time $T_3$, when binary one level voltages are present at terminals 51 and 52 as shown by waveforms 51a and 52a, output terminal 53 of AND gate 50 generates a binary one level output. It should be understood that a greater number of input terminals may be employed, depending upon the need of the particular circuit.

FIGURE 11f shows the logical symbol 60 for a binary OR gate, having input terminal 61 and 62 and output terminal 63. The operation is such that the presence of a signal of the binary one level at either input terminal 61 and 62 will generate a binary one level output at terminal 63. This can best be seen by the waveforms wherein output terminal 63 at $t_1$ remains at the binary zero level since binary zero inputs are impressed at input terminal 61 and 62. At the time $t_2$ and $t_3$ where the first input terminal 61, and then input terminal 62 has impressed thereupon a binary one level signal, the output terminal 63 generates a binary one level output upon the occurence of a binary one level input at either input terminal 61 or 62, as shown at time $t_2$ and $t_3$. Upon the occurrence of binary one level voltages at time $t_4$, upon input terminal 61 and 62, output terminal 63 likewise generates a binary one level output.

FIGURE 11g portrays the logical symbol for a pulse-AND-gate 70. The pulse-AND-gate 70 is designed so that a binary one level signal must appear at both input terminals 71 and 72, with the further requirement that the binary one level signal impressed upon control input terminal 71 must precede the binary one pulse impressed upon or triggering input terminal 72 by approximately 1 millisecond, thus considering the waveforms 71, 72 and 73, upon the occurrence of a binary one trigger pulse at input terminal 72, at time $t_1$, output terminal 73 remains at the binary zero level. This is likewise true for the trigger pulse which occurs at time $t_2$. At time $t_3$, although a binary one trigger pulse is present at input terminal 72, as shown by waveform 72a, at the same instant that a binary one level pulse is present at the control terminal input 71, no output pulse is generated at output terminal 73, since the leading edge of the control pulse 71a has not preceded the leading edge of the trigger pulse 72a. At time $T_4$ and $T_5$, however, the trigger pulses of waveform 72 occur at a time greater than 1 millisecond later than the leading edge of control pulse 71, causing output pulses to be generated at times $t_4$ and $t_5$, as shown by waveform 73a at output terminal 73.

FIGURE 11h shows the logical symbol 75 for an inverter, which is designed so as to invert the voltage level at its output, which is 180° out of phase with the voltage level at the input terminal 76 as shown by the waveforms 76a and 77a, upon the occurrence of a binary zero level voltage at input terminal 76. Inverter 75 generates a binary one level output at its output terminal 77. At time $T_1$, when the voltage level at input terminal 76 increases to the binary one level, the output of inverter 75 generates a binary zero level voltage, as shown by waveform 77a.

FIGURE 11k sets forth the symbolic diagram for a stage of the shift register shown in FIGURES 1 and 4 of the drawings. The shift register element is comprised of a dual input flip-flop 30 which is inner-connected with a shift register logic network. The operation of transferring and storing binary data into the dual input flip-flop 30 by means of the shift register logic network 90 is as follows:

The output terminal 35 of the dual input flip-flop 30 is designated as the binary one output; that is, upon the occurrence of a positive going trigger pulse upon the set input terminal 37 of flip-flop circuit 30, the voltage at terminal 35 of the flip-flop raises to the binary one level. Conversely, output terminal 36 is designated as the binary zero output terminal so that upon the occurrence of a positive going trigger pulse at set input terminal 37, the voltage at output terminal 36 decreases to the binary zero level concurrently with the increase to binary one of terminal 35. Thus, in order to ascertain whether a binary one or a binary zero is stored in flip-flop 30 of the shift register element 80, the state of either terminal 35 or 36 may be examined. Assuming that the flip-flop (not shown) of the preceding shift register stage is in the binary one state, then input terminal 91 which is connected to the binary one output of the preceding flip-flop stage is at the binary one level, while the input terminal 92 of the shift register logic network 90, which is connected to the binary zero output terminal of the preceding flip-flop stage is at the binary zero voltage level. Under these conditions, and upon the occurrence of a shift pulse, as shown by waveform 94a at shift pulse input terminal 94, the output terminal 95 of shift register logic network 90 generates a positive going pulse at time $t$, as shown by waveform 95a causing the binary one output terminal 35 to generate a binary one level voltage, while the binary zero output terminal 36 generates a binary zero level voltage. Dual input flip-flop 30, as previously described is designed so as to remain in this state for an indefinite period so that at time $t_2$, upon the occurrence of a binary one level signal at input terminal 91, and a binary zero level signal at input terminal 92, in cooperation with a shift pulse 94a occurring at time $t_2$, output terminals 35 and 36 do not change their states since they are already in the conductive and non-conductive states, respectively, as shown by waveforms 36a and 35a respectively.

At time $t_3$, upon the occurrence of a binary one level input at terminal 92 and a binary zero level input at terminal 91, in cooperation with a shift pulse 94a, output terminals 36 and 35 change their states as shown by waveform 36a and 35a respectively at time $t_3$.

Upon the occurrence of a reset pulse 93a, upon reset input terminal 93 of shift register logic network 90, dual input flip-flop 30 resets so that output terminal 35 generates a binary one level output and output terminal 36 generates a binary zero level output voltage at time $t_4$, as shown by waveforms 35a and 36a respectively. The reset operation is shown as occurring at time $t_4$ in the waveform and operates on the same basis regardless of the voltage levels present at the input terminals 91 and 92 of the shift register logic network.

The detailed schematic diagram of the shift register stage 80' is shown in FIGURE 14 and the operation, while identical to that previously described, will be set forth briefly as follows:

At time $t_1$, shown in FIGURE 11k, a minus 3 v. DC set control signal, shown by waveform 91a, acts to unblock the diode CR3 while a minus 11 v. DC reset control signal, shown by waveform 92a, imposes a heavily inverse biasing upon diode CR6. Accordingly, when the shift pulse, shown by waveform 94a, occurs at time $at_1$ so that its positive spike is thereby passed by diode CR3 to the base of transistor Q1 resulting in a negative-going excursion of the collector electrode of transistor Q1, the negative excursion of the Q1 collector is communicated via the capacitor C5 to the base of transistor Q2 causing transistor Q2 to be driven to its "On" state. With the Q2 collector at a minus 3 v. DC level, the base of transistor Q1 is now driven to its "Off" level by means of the voltage divider comprised of resistors R2 and R3. The Q1 and Q2 transistor states are thus made to conform at their output terminals to the instruction conditions existing immediately prior to the occurrence of the shift pulse at time $t_1$ which instruction conditions are represented by the waveforms 91a and 92a of FIGURE 11k.

At time $t_2$ of FIGURE 11k the minus 3 v. DC set control signal still leaves diode CR3 somewhat blocked since the R2–R3 resistive voltage divider imposes approximately a minus 1.5 v. DC voltage level on the base electrode of transistor Q1. Under this condition, since the reset control voltage of minus 11 v. DC (waveform 92a) leaves diode CR6 heavily blocked, the second shift pulse will, at most, be able to impose a positive spike upon the base electrode of transistor Q1. Such a pulse, however, has no effect upon the circuit since the device is already in its "set"-state, and therefore the shift register stage retains its status.

At a time after time $t_2$, but before time $t_3$, the control instructions represented by waveforms 91a and 92a reverse their voltage states. Under these new conditions diode CR3 is blocked by a set control instruction of minus 11 v. DC (waveform 91a) in the presence of the minus 1.5 v. DC condition existing at the base electrode of transistor Q1. Diode CR6 is unblocked by a control instruction of minus 3 v. DC (waveform 92a) in view of a minus 5.5 v. DC voltage existing at the base electrode of transistor Q2.

At time $t_3$ when the shift pulse (waveform 94a) generates a positive spike, this voltage spike acts on the base electrode of transistor Q2 to drive it towards its "off"-level, causing a negative-going voltage excursion at the collector electrode of transistor Q2. This voltage state is fed via capacitor C1 to the base electrode of transistor Q1 causing transistor Q1 to move to the "on"-state. By means of the R2–R3 and R12–R13 voltage dividers, the new relationships between transistors Q1 and Q2 are stabilized and the shift register stage 80' as a whole, now assumes a state corresponding to its new input instructions.

Transistors Q3 and Q4 whose base electrodes are connected respectively to the collector electrodes of transistors Q2 and Q1 are arranged in emitter follower configurations and as such put out levels directly corresponding to the voltage levels respectively, existing at the collector electrodes of transistors Q2 and Q1.

*Characters counting circuit*

The receiving portion and characters' counting facility 100, shown in FIGURE 2 is comprised of a start button 101, having first and second contact assemblies 102 and 103 respectively, for connecting either a B+ potential or a minus 12 volt DC level to the trigger input terminal 106 of one-shot multivibrator 110. The start button 101 is biased by means not shown so as to remain in the position shown in FIGURE 2 in the absence of any external force being applied thereto. In this position approximately minus 12 volts DC is impressed upon the trigger input terminal 106 of one-shot 110, so that one-shot remains in its stable state. Upon depression of start button 101, contact pair 103 impresses B+ upon output lead 104 which voltage level is transmitted to the remote location which acknowledges this voltage level as a transmission request signal and operates in accordance therewith to transmit the encoded data stored at the remote location.

Simultaneously therewith contact pair 102 of start button 101 impresses the B minus potential upon the trigger input terminal 106 of one-shot 110, causing multivibrator 110 to make the transition from the stable state to the unstable state. Reference should be had to the waveform of FIGURE 12a which sets forth the operation which is as follows:

The trigger pulse 1200 which is impressed upon the trigger input 106 generates the waveform 1201, at the output terminal 107 of one-shot 110. The pulse 1207 produced as a result of the trigger pulse 1200 is a negative going pulse which achieves the binary zero level. The leading edge of pulse 1207 occurs at time $t_0$ simultaneously with the leading edge 1208 of the trigger input 1200. The circuit elements (not shown) of the one-shot 110 are chosen to generate the pulse 1207 so that it has a pulse width of 1.4 milliseconds. Thus at time $t_1$, which is 1.4 milliseconds after time $t_0$, the trailing edge 1209 of output pulse 1207 rises to the binary one level, as shown by waveform 1201, one-shot 110 returns to its stable state causing the trailing edge 1209 of output pulse 1207 to rise to the binary one level as shown by waveform 1201. The trailing edge 1209 of output pulse 1207 is impressed upon input trigger terminal 108 of one-shot 110a, since at time $t_1$, this signal 1201 is at the binary one level, this binary one level voltage which is impressed upon the trigger input terminal 108 of one-shot 110a causes one-shot 110a to be driven to its unstable condition, generating waveform 1203 at output terminal 109.

At time $t_2$, one-shot 110a returns to its stable state, as shown by waveform 1203 at which time the positive-going rise to the binary one level voltage triggers one-shot multivibrator 110b, driving multivibrator 110b into its unstable state. In this condition output terminal 112 generates pulse 1204, and output terminal 113 generates pulse 1205. The positive going pulse 1210 of waveform 1205 generated at output terminal 113 passes through emitter follower 120a, whose output terminal 114 couples this positive going pulse 1210a to the code and sync separation circuit, to initiate operation thereof, in a manner to be more fully described.

One-shot 110b remains in its unstable state for a period of 1.4 milliseconds and at time $t_3$ returns to its normally stable state as shown by waveform 1204, impressing a binary one level voltage upon the input terminal 115 of dual input flip-flop circiut 130. This generates at time $t_3$ a binary one level output at terminal 116 of flip-flop circuit 130. The binary one level output, shown at waveform 1206 is transferred through emitter follower 117, the output 118 of which is coupled to the input terminal 119 of a logical AND gate 150.

It should be noted in FIGURE 12a that a time delay of length $t_3$ minus $t_0$ occurs between the time that the start button 101 is depressed and the time that a binary one level voltage is impressed upon the input terminal 119 of logical AND gate 150. This delay period is provided for the purpose of transmitting a transmit request signal to the remote location, the receipt of this signal by the remote location, and the initiation of transmission by the remote location to the central location data receiver means. The data received from the remote location is impressed upon the input terminal 125 of a filter network 124 which is designed to produce a wave envelope 126a of the incoming pulses 125a impressed upon filter circuit 124.

The wave envelopes for each incoming pulse can be more clearly seen as wave form 1211 in FIGURE 12a, where the letter "S" designates a sync pulse, and the letter "C" designates a code pulse. The dotted pulse 1213 designates the position where a code pulse of the binary 1 level would normally appear, so that this code pulse position is interpreted as a binary zero. The output terminal 126 of filter circuit 124 generates the waveform 1211. Each sync and code pulses impressed upon input terminal 126 of one-shot multivibrator 110c generates sharply defined sync and code pulses as shown by waveform 1212 at the output terminal 127 of one-shot 110c. All of the sync and code pulses shown in waveform 1212 are of uniform width and height. In order to facilitate handling of these pulses throughout the remainder of the operation, each sync and code pulse of the output waveform 1212 passes through emitter follower circuit 120c to the input terminal 123 of AND gate 150. Since the first pulse 1214 of the waveform 1212 occurs at a time $t_{3a}$, after the generation of waveform 1206, there is coincidence at the input terminals of logical AND gate 150, causing the output terminal 121 of AND gate 150 to generate a waveform 1213 identical to the waveform 1212. The output waveform 1213 generated at terminal 122 is impressed upon one input terminal of the code and sync separation circuit shown in FIGURE 3 for a purpose to be more fully described.

Referring again to the one-shot multivibrator 110 and to FIGURE 12a.

At time $t_0$, output terminal 131 of one-shot 110 generates a positive-going pulse 1216, which is transferred through emitter follower 120 and conductor 132, to the reset input terminals 133, 134 and 135 of binary flip-flop circuits 140, 140a and 140b respectively, causing these binary flip-flop circuits to be reset so that their output terminals 138, 142 and 146 respectively are at a binary one voltage level. Binary flip-flops 140 through 140b constitute a character counting function, which is operated as will be more fully described to keep a cumulative count of the total number of characters received and processed by the data receiver. At the time $t_0$, shown in FIGURE 12a the flip-flop circuits 140 through 140b, having been reset contain a character count of 0. As each complete character is processed by the shift register circuit of the data receiver, a binary 1 pulse is impressed upon the first flip-flop stage 140 of the characters counting circuit at input terminal 136. The flip-flop stages 140 through 140d which are connected so as to operate as an accumulator or counting circuit, increase the binary count stored therein for the purpose of generating four outputs, 141, 144, 151 and 149 respectively, for the purposes of aiding the error-monitoring circuitry in the determination of the type of characters being received by the data receiver, as will be more fully described. It should be noted that the characters counting arrangement which consists of three binary flip-flop stages 140 through 140b is capable of forming a total count of eight, at which time it will then reset and start the count over again. Since the actual counting operation of the characters counting function lends no novelty to the invention, a detailed description has been omitted but characters counting circuits of the type employed herein are more fully described in the book "Arithmetic Operations in Digital Computers," by R. K. Richards, copyright 1955 by Van Nostrand Company, a detailed description being set forth on pages 193 through 204, and is hereby incorporated herein by reference thereto.

*Code and sync separation circuit*

The code and sync separation circuit 200, shown in FIGURE 3 is comprised of a first and second input terminals 201 and 202 for receiving the output waveform 1205, shown in FIGURE 12a of the drawings, which is coupled to input terminal 201, from output terminal 114 of the receiving and counting circuits 100, in FIGURE 2. The output waveform 1215 is impressed upon input terminal 202, which is electrically connected to output 122 from interlock circuit 100 in FIGURE 2.

Figure 12B:
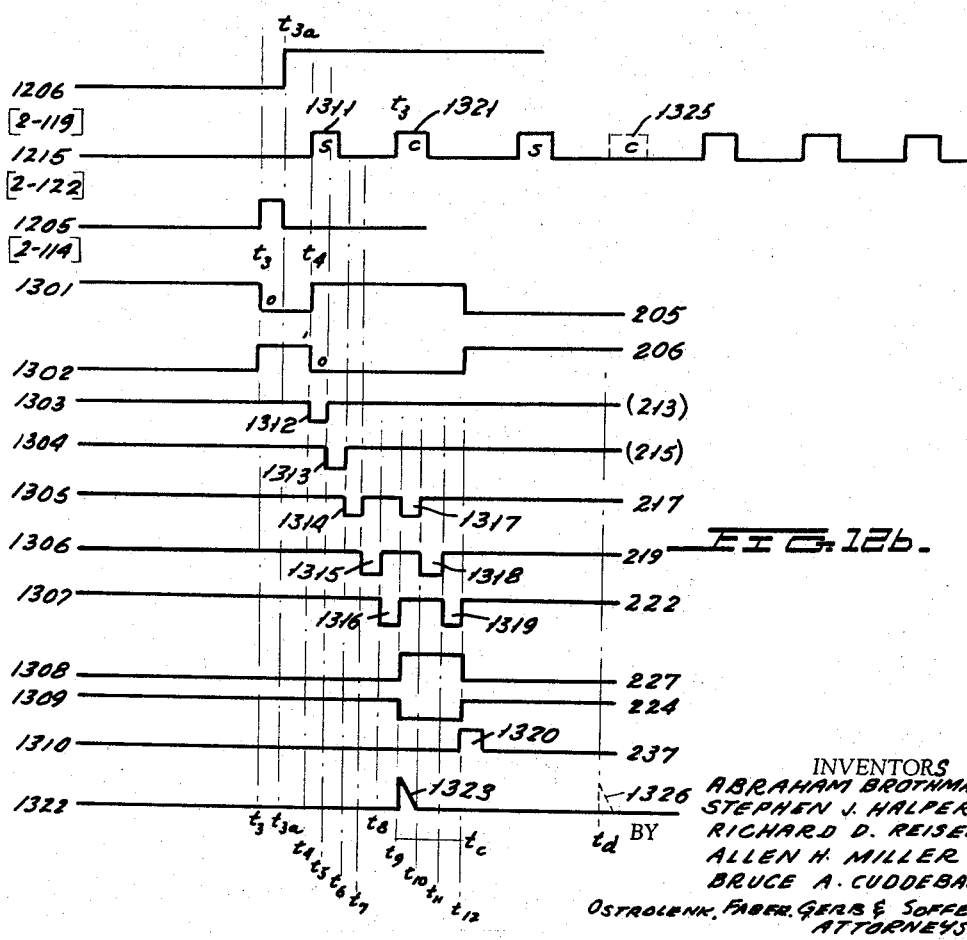
Figure 12D:
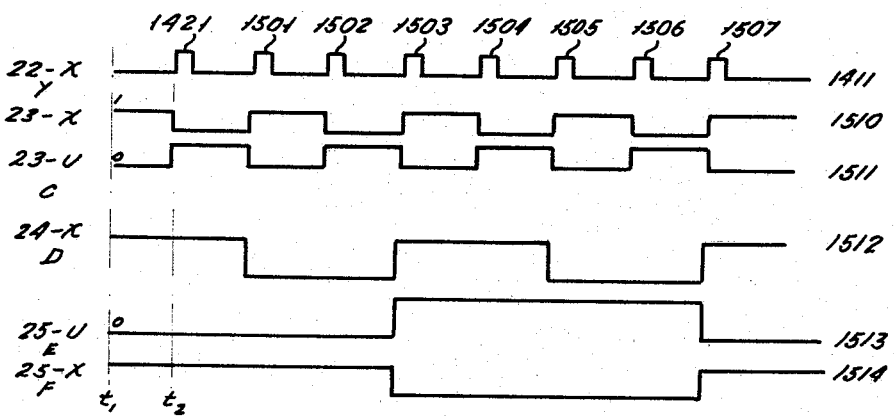
Figure 12E:
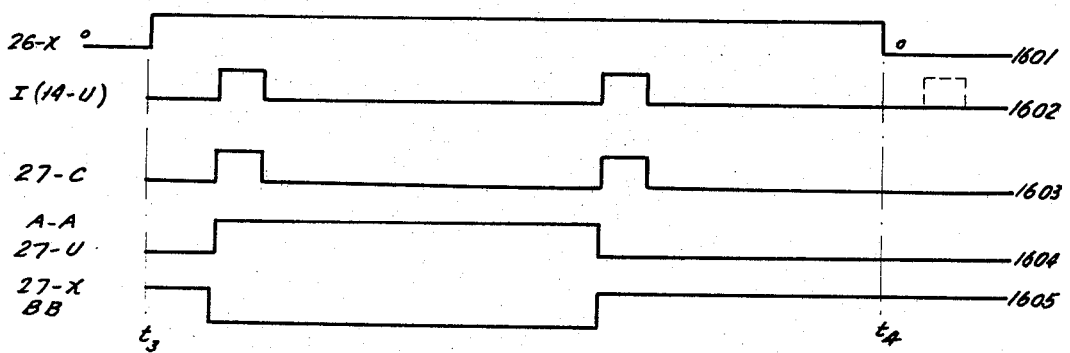
Figure 12F:
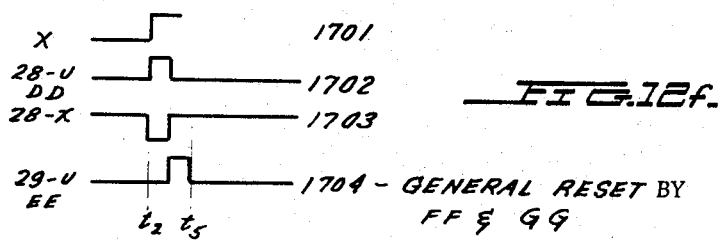

With reference to the waveform shown in FIGURE 12b, the operation of the code and sync separation circuit 200, is as follows:

Waveforms 1206, 1215, and 1205, which appear in FIGURE 12a of the drawings are reproduced in FIGURE 12b for a better understanding of the operation of code and sync separation circuit 200.

At time $t_3$ a binary one level signal, as shown by waveform 1205 is generated at output terminal 114 of interlock circuit 100, shown in FIGURE 2. This resets dual input flip-flop 240, placing output terminal 205 of flip-flop 240 at the binary zero level at time $t_3$, as shown by waveform 1301 in FIGURE 12b.

At time $t_{3a}$, the binary one level input 1206 is impressed upon input terminal 119 of AND gate 150, shown in FIGURE 2, in order to have binary one coincidence at the input terminal of logical AND gate 150, thereby permitting the generation of the pulse train shown by waveform 1215, which appears at the output terminal 122 of AND gate 150, shown in FIGURE 2. The first pulse 1311 of the pulse train shown by waveform 1215 is impressed upon input terminal 204 of dual input flip-flop 240, causing the output terminal 205 of flip-flop 240 to move to the binary one state at time $t_4$, and causing the output terminal 206 of flip-flop 240 to move to the binary zero state at time $t_4$ as shown by waveform 1302. The binary one output level at terminal 205 is coupled through the emitter follower 222a and conductor 208 to the input terminal 209 of one-shot multivibrator 210. The presence of the binary one level upon input terminal 209 of one-shot multivibrator 210 causes output terminal 213 of one-shot 210 to generate the negative-going pulse 1312, at time $t_4$ as shown by waveform 1303 in FIGURE 12b.

At time $t_5$, one-shot 210, returns to its normally stable state, impressing a binary one level input upon input terminal 214 of one-shot 210a. This binary one level at time $t_4$, driving one-shot 210a into its unstable state causing negative-going pulse 1313 of waveform 1304 to be formed at time $t_5$.

One-shot 210a at time $t_6$ returns to its stable state, as shown by waveform 1304 which binary one level is impressed upon the input terminal 216 of one-shot 210b through emitter follower 200d, thus at time $t_6$, negative-going pulse 1314, as shown in waveform 1305, is generated at the output terminal 217 of one-shot 210b in the same manner as described previously with respect to one-shots 210 and 210a. At time $t_7$, when one-shot 210b returns to its stable state, the binary one level voltage at its output terminal 217 is impressed upon the input terminal 218 of one-shot 210c, generating the negative-going pulse 1315 of waveform 1306, at output terminal 219. At time $t_8$, when one-shot 210c returns to its stable state, the binary one level voltage at output terminal 219 is impressed upon input terminal 221 of one-shot 210d, generating negative-going pulse 1316 of waveform 1307 at time $t_8$. At time $t_9$ when one-shot 210d is reset to its stable state, the positive or binary one level voltage at its output terminal 222 is impressed upon the input terminal 223 of binary flip-flop 240a. It should be noted here that flip-flop 240a at time $t_4$ was reset by the output pulse generated at time $t_4$ which is shown by waveform 1301 as a binary one level pulse, being transferred through conductors 208 and 211 upon the reset input terminal 231 of binary flip-flop 240a, driving output terminal 224 of flip-flop 240a to the binary zero level.

At time $t_9$, when one-shot 210d returns to its stable state, as shown by waveform 1307, a binary one voltage level condition is impressed upon the common input 223 of flip-flop 240a causing the flip-flop output terminals 224, 227 to reverse their stable states, thus driving output terminal 224 to the binary 0 level and output terminal 227 to the binary one level, as shown by the waveforms 1309 and 1308 respectively. The binary one level output appearing at terminal 227 of flip-flop 240a is fed back by conductor 228 to the trigger input terminal 229 of one-shot 210b, generating the negative-going pulse 1317 of waveform 1305 at the output terminal 217 of one-shot 210b. In like manner, one-shot multivibrators 210c and 210d generate negative-going pulses 1318 and 1319 of waveforms 1306 and 1307 respectively at times $t_{10}$ and $t_{11}$ respectively, in the same manner as was previously described. At time $t_{12}$, one-shot 210d returns to its stable state as shown by waveform 1307 impressing a binary one level voltage upon input terminal 223 of flip-flop 240a causing the output terminals 224 and 227 to reverse their stable states, thereby generating binary one and binary zero level outputs as shown by waveforms 1309 and 1308 respectively.

Since output terminal 227 generates a binary zero level output, no feed-back signal is transmitted through conductor 228 to trigger input terminal 229 of one-shot 210b, thus terminating the operation of the multivibrators 210b through 210d.

The output terminal 224 of flip-flop 240a, however, has a binary one voltage level at its output as shown by waveform 1309, of FIGURE 12b which is transferred through emitter follower 220e and conductor 226 to the reset input terminal 207 of dual input flip-flop circuit 240, causing the output terminals 205 and 206 thereof to reverse their stable states to binary zero and binary one levels respectively, as shown by waveforms 1301 and 1302, respectively at time $t_{12}$.

At time $t_{12}$, the voltage level at output terminal 205 is at the binary zero level so that the timing chain consisting of one-shots 210 and 210d is not energized. However, output terminal 206 at time $t_{12}$ returns to its binary one output level which is impressed upon the input terminal 235 of one-shot 210e via emitter follower 220b generating at time $t_{12}$, the positive-going pulse 1320 of waveform 1310 at the output terminal 236 of one-shot 210e. This pulse 1320 appearing at output terminal 236 is transferred through emitter follower 220c and output lead 237 to the shift pulse input of the shift register of FIGURE 4 for a purpose to be more fully described.

Turning back to time $t_4$, when the voltage level at output terminal 205 of dual input flip-flop 240 is driven to the binary one state by sync pulse 1311 of waveform 1215, which is impressed upon the input terminal 202b, this binary one level is transferred by means of conductors 208 and 211 to control input terminal 212 of pulse-AND-gate circuit 270. Simultaneously therewith the pulse train of waveform 1215 is impressed upon pulse input terminal 232 of pulse-AND-gate circuit 270, but no output is generated at output terminal 233 since the pulse-AND-gate 270 is designed to generate an output pulse only when the pulses impressed upon the pulse input terminal 232 appear at the input terminal 232 at least 1.4 milliseconds after the impression of the binary one level voltage as shown by waveform 1301, upon control input terminal 212. Thus, at the time $t_4$, pulse-AND-gate 270 generates no output pulse.

However, at time $t_c$, pulse train 1215 impresses a square pulse 1321 upon pulse input terminal 232 whose trailing edge occurs at a time $t_c$, minus $t_4$, after the impression of the waveform 1301 upon control terminal 212 at time $t_4$. The delay period $t_c$, minus $t_4$, is adjusted to be greater than 1.4 milliseconds in length, so that at time $t_c$, a sharply defined voltage spike 1323 is generated at output terminal 233, as shown by waveform 322. Thus it can be seen that after a time period of length $t_c$ minus $t_4$, the first code pulse is generated at output terminal 233 of code separation circuit 200, and a synchronizing pulse 1320 is generated at output terminal 237 at a time period $t_{12}$ minus $t_4$, after the occurrence of the first synchronizing pulse 1311 of pulse train 1215. The operation of code and sync separation circuit 200 is identical to the above description with respect to succeeding sync and code pulses in the pulse train 1215, with the exception that at the time $t_d$ when there is an absence of a code pulse (as shown by numeral 1325) in pulse train 1215, output terminal 233 does not generate a positive-going voltage spike, as shown by numeral 1326 of waveform 1322.

*Shift register*

FIGURE 4 shows the shift register 300 employed in the data receiver of this invention which is comprised of code pulse and shift pulse input terminals 302 and 303 respectively, which are electrically connected to the outputs 233 and 237 of code and sync separations circuit 200, shown in FIGURE 3.

The operation of the shift register circuitry 300 of FIGURE 4 is as follows:

The input terminal 321 which is connected through common bus 322 and branch conductors 322b through 322f to the associated reset input terminals 323a through 323e respectively, of each shift register logic network 90a through 90e, receives the reset signal of FIGURE 9, to be more fully described. This positive-going pulse generates a positive output pulse at terminals 316b through 316e of shift register logic networks 390a through 390e which is identical to the waveform impressed at the reset input terminals 323a through 323e respectively, which waveforms are shown as 1412 and 1413 in FIGURE 12c. The positive-going pulse 1414 of waveform 1413 is impressed upon the input terminals 317a through 317e of dual input flip-flops 330a through 330e causing the output terminals $321_a$ through $321_e$ of dual input flip-flops 330b through 330f to change to the binary zero level. These output levels should be in the reverse order, thus a binary one level is transferred from output terminals 321 through 321e through conductors 329 through 329e and emitter followers 320e through 320k to the output leads 331 through 331e respectively.

In a like manner, output terminals 322a through 322e are coupled through conductors 344a through 344e and emitter followers 320l through 320r respectively to output terminals 333a through 333e respectively, which generate a binary zero level voltage.

Input terminal 301, which is connected to a general reset circuit shown in FIGURE 9c likewise receives a binary one level pulse which is impressed upon reset terminal 304 of dual input flip-flop 330 to change the voltage level at the output terminal 308 to binary zero which is coupled through emitter follower 220 and conductor 334f, and emitter follower 320a to output terminal 313 which generates a binary level voltage at time $t_3$, as can be seen in FIGURE 12c wherein waveform 1403 represents the output voltage at terminal 313.

The binary one input voltage which is impressed upon input terminal 321 is simultaneously transferred through branch conductor 322a and emitter follower 320b, to the input terminal 318, of dual input flip-flop 330a thus generating a binary zero level voltage at the output terminal 321 of flip-flop 330a which is transferred through emitter follower 320c, conductor 329 and emitter follower 320e to output terminal 331. This acts as the start bit for the shift register operation as will be more fully described.

At time $t_4$, the first code pulse 1414 of the code pulse waveform 1401, shown in FIGURE 12c is impressed upon input terminal 302 of dual input flip-flop 330, causing output terminal 308 of flip-flop 330 to change to the binary one level at time $t_9$ as shown by waveform 1403, wherein time $t_9$ is the same as the time $t_9$ of FIGURE 12b.

At time $t_a$, the first sync pulse 1415 of waveform 1402, is passed from the output terminal 237 of code and sync separation circuit 200, shown in FIGURE 3, to the input terminal 303 of shift register circuitry 300. Binary one level pulse 1415 is first impressed upon reset input terminal 305 of dual input flip-flop 330, causing the voltage level at output terminals 309 and 313 to change to the binary zero level at time $t_a$ as shown by waveform 1402.

Simultaneously therewith, sync pulse 1415 is impressed upon the shift input terminal 314 of shift register logic network 390. The output voltage levels of output terminals 307 and 308, being binary one and binary zero respectively, are impressed upon the input terminals 311 and 312 of logic network 390, which, coupled with the shift pulse impressed upon input terminal 314, acts to urge output terminal 321 of flip-flop 330a to the binary zero state. However, since the start bit pulse which was impressed upon input terminal 351 has driven the output terminal 321 of flip-flop 330a to the binary zero level, flip-flop 330a retains its output terminal 321 at the binary zero level at time $t_a$, as shown by waveform 1404 in FIGURE 12c, and output terminals 322 and 333 of binary flip-flop 330a remain at the binary one level at time $t_a$, as shown by waveform 1404a.

The overall operation of the shift register embodiment of FIGURE 4 is as follows:

The general reset pulse 1412 shown in FIGURE 12c is impressed upon the input terminal 351 of the shift register 300 which common bus 351 is connected to the reset input terminals 323a through 323e of the shift register logic networks 390a through 390e respectively. This reset pulse causes the dual input flip-flops 330b through 330f to experience a transition so that their output terminals 321a through 321e are in the binary one level. General reset pulse 1412 is transferred through bus 351 and emitter follower 320d to the input control terminal 318 of dual flip-flop 330a causing this flip-flop circuit to have its output terminal 321 in the binary zero state, which operation is performed to load a start bit into this register position, for a purpose to be more fully described.

General reset pulse 414, shown by waveform 413 in FIGURE 12c, is impressed upon the input control terminal 304 of binary flip-flop 330 at time $t_3$, placing output terminal 308 of flip-flop 330 in the binary zero state.

At time $t_9$ the first binary bit 1323 of waveform 1322 shown in FIGURES 12b and 12c of the drawings is impressed upon input terminal 1302 which impresses the binary one bit 1323 upon input control terminal 306 causing output terminals 307 and 308 of flip-flop 330 to shift to the binary zero and binary one levels respectively. The remaining stages of the shift register do not change at this time.

At time $t_{12}$ the output sync pulse 1320 shown in FIGURE 12b of the drawings is impressed upon bus 303 which is in turn linked to the reset input terminal 305 of flip-flop 330 and to the shift input terminals 314 through 314f of shift register logic networks 390 through 390f respectively.

Just prior to the resetting of flip-flop 330, the output level of terminal 308 is at the binary 1 level which is coupled through emitter follower 320 and conductor 334f to the input terminal 312 of shift register logic network 390. As previously described, the presence of a binary 1 signal at the input terminal 312 of shift register logic network 390 coupled with a binary 1 signal at the shift pulse input terminal 340 of network 390 produces a binary 1 level at output terminal 315 of shift register logic network 390 which is coupled to the input terminal 317 of flip-flop 330a. This binary 1 level desires to drive output terminals 321 and 322 of flip-flop 330a to the binary 0 and binary 1 levels respectively. However, since output terminals 321 and 322 are already at the binary 0 and binary 1 levels respectively, no change occurs in flip-flop 330a. The binary 1 level impressed upon input terminal 305 of flip-flop 330 resets flip-flop 330 so that the output terminals 307 and 308 are at the binary 1 and binary 0 levels respectively.

The binary 1 output level at output level 322 of flip-flop 330a is impressed through emitter follower 320d upon input terminal 312a of shift register logic network 390a which, coupled with the binary 1 shift pulse impressed upon the shift pulse input terminal 314a of logic network 390a, produces a binary 1 level at the output terminal 315a of logic network 390a, which is impressed upon input terminal 317a of flip-flop 330b. This causes output terminal 322a of flip-flop 330b to shift to the binary 1 level at time $t_{12}$ as shown by waveform 1405 in FIGURE 12c.

Immediately before the transition of output terminal 322a from the binary 0 to the binary 1 level, output terminal 321a of flip-flop 330b is at the binary 1 level, which is impressed upon input terminal 311 of shift register logic network 390b, and coupled with the shift pulse impressed through bus 303 upon shift pulse input terminal 314a a binary 1 level is produced at logic network output terminal 316b which is impressed upon input control terminal 319b of flip-flop 330c causing output terminals 321b and 322b to shift to the binary 0 and binary 1 voltage levels respectively. However, since the output terminals 321b and 322b were previously in these respective states, as will be more fully described, then no change in their output levels is produced at this time, so that the binary 0 output level of output terminal 322b is retained at time $t_{12}$ as shown by waveform 1406. In the same manner as described with respect to flip-flop 330c, the output terminals 322c through 322e of flip-flop 330d through 330f respectively are at the binary 0 voltage level at time $t_{12}$ as shown by waveforms 1407, 1408 and 1409 respectively.

The output terminal 322f of flip-flop 330g is at the binary 1 level at a time just prior to time $t_{12}$, as shown by waveform 1410, for a reason to be more fully described, and upon impression of the binary 1 level through bus 303 to the shift pulse input 314f of shift register logic network 390f, coupled with the binary 1 level of the output terminal 321e of flip-flop 330f, generates a binary 1 voltage level at terminal 316f of logic network 390f, which is impressed upon the input control terminal 319f of flip-flop 330g causing output terminal 322f of flip-flop 330g to shift to the binary 0 state at time $t_{12}$, as shown by wave form 1410.

At time $t_{13}$ the second binary bit 1326 of the first coded character wave form 1322 is coupled to the input control terminal 306 of flip-flop 330. This is a binary 0 level (i.e. the absence of a binary 1 level). Output terminals 307 and 308 of flip-flop 330 remain in the binary 1 and binary 0 voltage levels respectively. Also, since no shift or reset pulses are impressed upon the shift register 300, no change whatsoever takes place in the shift register circuitry at this time.

At time $t_{14}$ shift pulse 1416 is impressed upon bus 303 coupling this binary 1 level pulse to reset terminal 305 of flip-flop 330 and shift pulse terminals 314 through 314f of shift register logic networks 390 through 390f respectively in the same manner as previously described.

The presence of a binary 1 level at reset input terminal 305 of flip-flop 330 urges output terminal 308 of flip-flop 330 towards the binary 0 level. However, since output terminal 308 is already in the binary 0 level, no change takes place in flip-flop 330. The binary 1 level at the shift pulse input 314 of shift register logic network 390, concurrently with the presence of a binary 1 level at the input terminal 311 of logic network 390, generates a binary 1 level at output terminal 316 of logic network 390, which is coupled to input terminal 319 of shift register 330a. The binary 1 level at input control terminal 319 of flip-flop 330a urges the output terminal 322 towards the binary 0 voltage level at time $t_{14}$ as shown by wave form 1404a and simultaneously therewith urges the output level at output terminal 321a towards the binary 1 state, as shown by wave form 1404 at time $t_{14}$.

Immediately prior to the transition of output terminals 321 and 322 of flip-flop 330a, the binary 1 level existing immediately prior to the transition at output terminal 322 is coupled to logic network 390a through input terminal 312a and, together with the presence of a binary 1 level at shift pulse input 314a, generates a binary 1 level at output terminal 315a of logic network 390a, which is impressed upon input terminal 317a of flip-flop 330b tending to drive output terminals 321a and 322a of flip-flop 330b to the binary 0 and binary 1 levels respectively. However, since flip-flop 330b has its output terminals already in these respective states, no change occurs in flip-flop 330b.

The binary 1 level at input terminals 312b and 314b of shift register logic network 390b generates a binary 1 level at output terminal 315b which is coupled to input control terminal 317b of flip-flop 330c acting to drive output terminals 321b and 322b to the binary 0 and binary 1 voltage levels respectively. Output terminal 322b having been in a binary 0 state changes to the binary 1 level at time $t_{14}$ as shown by wave form 1406. Immediately prior to the transition which takes place in flip-flop 330c, the binary 1 level at output terminal 321b of flip-flop 330c, which is impressed upon input terminal 311c together with the binary 1 level impressed upon shift pulse terminal 314c of shift register logic network 390c, acts to generate the binary 1 level at output terminal 316c, which is impressed upon control input terminal 319c of flip-flop 330d urging output terminals 321c and 322c to the binary 1 and binary 0 levels respectively. Since output terminal 322c is at the binary 0 level at time $t_{14}$ as shown by wave form 1407, no transition occurs in flip-flop 330d. In the same manner as described with respect to flip-flop 330d, no transition takes place at the output terminals 322d and 322e of flip-flops 330e and 330f respectively at time $t_{14}$ as shown by wave forms 1408 and 1409 respectively of FIGURE 12c. Same is true of flip-flop 330g whose output terminal 322f is at the binary 0 voltage level at time $t_{14}$ as shown by wave form 1410.

At time $t_{15}$ no binary 1 level impulse (which is shown by an absence of an impulse as per dash lines 1327 of wave form 1322) is impressed upon flip-flop 330a, so that no change occurs either in this flip-flop or in any of the other flip-flops 330a through 330g of shift register 300. It should be understood that the absence of a binary 1 pulse at time $t_{14}$ is the equivalent of loading a binary 0 digit into flip-flop 330.

At time $t_{16}$ the shift pulse 417 of wave form 1310 is impressed upon bus 303. No change takes place at the output terminal 308 of flip-flop 330, since output 308 is at the binary 0 level as shown by wave form 1403 at time $t_{16}$. At this time shift register logic network 390 has impressed upon it simultaneously a binary 1 level at input terminal 311 and a binary 1 level at shift pulse input terminal 314, generating a binary 1 level at output terminal 316 which is coupled to input control terminal 319 of flip-flop 330a. Since this binary 1 level urges output terminal 322a to the binary 0 state, no change takes place at time $t_{16}$ since output terminal 322 is already at the binary 0 level as shown by wave form 1404a.

The binary 1 level existing at output terminal 321 of flip-flop 330a is coupled to the input terminal 311 of logic network 390a simultaneously with a shift pulse at shift pulse input 314a, which generates a binary 1 level at output terminal 316a of logic network 390a, which is coupled to input control terminal 319a of flip-flop 330b causing output terminal 322a to move to the binary 0 state. The output terminal 322a, having been at the binary 1 state immediately prior to time $t_{16}$, shifts to the binary 0 state at this time as shown by wave form 1405.

Immediately prior to the transition of output terminal 322a, output terminal 321a is at the binary 1 level which, coupled with a shift pulse at input terminal 314b of shift register logic network 390b, generates a binary 1 level at output terminal 316b of logic network 390b, which is coupled to input control terminal 319b of flip-flop 330c, which urges output terminal 322b of flip-flop 330c towards the binary 1 state. Since output terminal 322b was at the binary 1 state immediately prior to time $t_{16}$, no change occurs in flop-flop 330c.

Shift register 390c, having a binary 1 depressed upon its input terminal 312c and its input terminal 314c simultaneously therewith, generates a binary 1 level at its output terminal 315c, which is coupled to the input control terminal 317c of flip-flop 330d, urging output terminals 321c and 322c to the binary 0 and binary 1 levels respectively. The output terminal 322c which was at the binary 0 level immediately prior to time $t_{16}$, as shown in wave form 1407, moves to the binary 1 state at this time.

Immediately prior to the transition of output terminal 322c to the binary 1 level, output terminal 321c is at the binary 1 level, which is impressed upon the input terminal 311d of shift register logic network 390d, which coupled with the presence of a binary 1 level at the shift pulse input 314d generates the binary 1 level at output terminal 316d, which is coupled to input control terminal 319d of flip-flop 330e, urging output terminals 321d and 322d to the binary 1 and binary 0 levels respectively. However, since these output terminals were already at these respective voltage levels immediately prior to time $t_{16}$, no change occurs in flip-flop 330e. Likewise, no changes occur at the output terminal 322e and 322f of flip-flops 330f and 330g respectively at time $t_{16}$, as can be clearly seen in wave forms 1409 and 1410 respectively.

At time $t_{17}$ a binary 1 bit 1328 of the first character coded wave form 1322 is impressed upon input control terminal 306 of flip-flop 330, causing output terminals 307 and 308 to shift to the binary 0 and binary 1 levels respectively at time $t_{17}$, as shown by wave forms 1403a and 1403 respectively. Since no shift for reset pulses are impressed upon the shift registers 300 at this time, no other changes occur in the shift register circuitry.

At time $t_{18}$ shift pulse 1418 is impressed upon bus 303. This binary 1 level pulse, which is coupled to reset input terminal 305 of flip-flop 330, drives output terminals 307 and 308 to the binary 1 and binary 0 levels respectively, causing this immediate transition to occur at time $t_{18}$, as shown by the wave forms 1403a and 1403 respectively of FIGURE 12c.

Immediately prior to the completion of this transition, the binary 1 level existing at output terminal 308 of flip-flop 330 is coupled to the input terminal 312 of shift register logic network 390 which, coupled with the presence of a binary 1 level at the shift pulse input terminal 314, generates a binary 1 level at its output terminal 315, which is impressed upon the input control terminal 317 of flip-flop 330a, causing output terminals 321 and 322 to shift to the binary 0 and binary 1 levels respectively. This shift takes place at time $t_{18}$ as shown by wave forms 1404 and 1404a respectively of FIGURE 12c.

Immediately prior to the completion of this transition in flip-flop 330a, the binary 1 level at output terminal 321 is impressed upon the input terminal 311a of shift register logic network 390a which, coupled with the presence of a binary 1 level at the shift pulse input terminal 314a, generates a binary 1 level at output terminal 316a, which is connected to input control terminal 319a in order to drive output terminal 322a to the binary 0 level. Since this condition already exists at output terminal 322a, no transition occurs at time $t_{18}$ as shown by wave form 1405. The binary 1 level of output terminal 321a is impressed upon input terminal 311b of logic network 390b and, together with the binary 1 voltage level at shift pulse input 314b, generates a binary 1 level at output terminal 316b which, coupled to input control terminal 319b of flip-flop 330c, urges output terminal 322b to the binary 0 state at time $t_{18}$. This transition occurs, as can be seen by wave form 1406, since output terminal 322b was at the binary 1 level immediately prior to time $t_{18}$.

Just prior to the completion of this transition in flip-flop 330c, a binary 1 level existed at output terminal 322b, which is impressed upon the input terminal 312c of logic network 390c and, together with the binary 1 and shift pulse input 314c, generates a binary 1 level at output terminal 315c, which is coupled to input control terminal 317c. This binary 1 level voltage urges output terminals 321c and 322c to the binary 0 and binary 1 voltage terminals respectively. Output terminal 322c, having been at the binary 1 level at a time immediately prior to time $t_{18}$, as shown by wave form 1407, experiences no transition, so that flip-flop 330d does not change at time $t_{18}$.

The binary 1 level at output terminal 322c, which is impressed upon the input terminal 312d of shift register logic network 390d, acts in cooperation with a binary 1 level at shift pulse input terminal 314d to generate a binary 1 level at output terminal 315d which, being coupled to input control terminal 317d of flip-flop 330e, drives output terminals 321d and 322d to the binary 0 and binary 1 levels respectively. The output terminal 322d, having been at the binary 0 level immediately prior to time $t_{18}$, makes the transition to the binary 1 level at this time as shown by wave form 1408.

At time $t_{19}$ the binary bit 329, which is a binary 0 voltage level, is impressed upon input control terminal 306 of flip-flop 330, but due to its binary 0 state causes no change in the state of flip-flop 330.

At time $t_{20}$ the sync pulse 1419 of wave form 1310, shown in FIGURE 12c, is impressed upon the input control terminal 304 of binary flip-flop 330 in order to drive output terminal 308 to the binary 0 voltage level. However, since output terminal 308 is already at the binary 0 voltage level immediately prior to the impression of sync pulse 1419, no change takes place in the state of binary flip-flop 330. The binary 1 voltage level at output terminal 307, coupled with the binary 1 voltage level impressed upon input bus 303, are in turn impressed upon input terminals 311 and 314 of shift register logic network 390 respectively and cooperate to generate a binary 1 voltage level signal at terminal 316 which, being coupled to input control terminal 319 of flip-flop 330a, generates a binary 0 level at output terminal 322 at time $t_{20}$ as shown by wave form 1404a.

Immediately prior to the transition of output terminal 322 to the binary 0 level, the binary 1 level at this terminal is coupled to the input terminal 312a of logic network 390a, and cooperating with the shift pulse input impressed upon shift pulse terminal 314a generates a binary 1 level output at terminal 315a which, being coupled to input control terminal 317a, generates a binary 1 level output at the output terminal 322a of flip-flop 330b, which transition occurs at time $t_{20}$ as shown by wave form 1405. Immediately prior to time $t_{20}$ output terminal 321a of binary flip-flop 330b was at the binary 1 level, which voltage level is coupled to input terminal 311b of shift register logic network 390b, which coupled with the binary 1 shift pulse at shift pulse input terminal 314b generates a binary 1 level at output terminal 316b which is impressed upon input control terminal 319b of binary flip-flop 330c. The binary 1 level voltage at input control terminal 319b urges the output terminal 322b towards the binary 0 level. However since output terminal 322b was at the binary 0 level immediately prior to time $t_{20}$, no change whatsoever takes place in binary flip-flop 330c, as shown by wave form 1406.

The binary 1 level present at output terminal 321d is impressed upon input terminal 311c of shift register logic network 390c, and upon the impression of shift pulse 1419 at time $t_{20}$ upon shift pulse terminal 314c, logic network 390c generates a binary 1 level output at its output terminal 316c, which is impressed upon input control terminal 319c of binary flip-flop 330d. This binary 1 level drives output terminal 322c to the binary 0 level at time $t_{20}$ as shown by wave form 1407 in FIGURE 12c. Immediately prior to the transition undergone by flip-flop 330d, output terminal 322c was at the binary 1 level which voltage level was impressed upon input terminal 312d of logic network 390d. This binary 1 level cooperates with the shift pulse input at input terminal 314d to generate a binary 1 level output at terminal 315d, which is impressed upon input control terminal 317d of binary flip-flop 330e, driving output terminal 321d to the binary 0 level and output terminal 322d to the binary 1 level. As can clearly be seen by wave form 1408, output terminal 322d is already at the binary 1 level, thus flip-flop 330e undergoes no change. The binary 1 level at output terminal 322d is coupled to the input terminal 312e of logic network 390e and, together with the shift pulse 1419 impressed upon shift pulse input terminal 314e, generates a binary 1 level output at output terminal 315e, which is in turn impressed upon the input control terminal 317e of flip-flop 330f. This binary 1 voltage drives output terminal 322e to the binary 1 level at time $t_{20}$ as shown by wave form 1409.

Immediately prior to the transition of output terminal 322a at time $t_{20}$, this terminal was at the binary 0 level (see wave form 1409), and output terminal 321e being at the binary 1 level at this time impresses this voltage level upon input terminal 311f of shift register logic network 390f and, coupled with the shift pulse input at terminal 314f, generates a binary 1 level voltage at terminal 316f, which is impressed upon input control terminal 319f of flip-flop 330g. This input voltage urges output terminal 322f to the binary 0 level. However, since this output terminal is already at the binary 0 level as shown by wave form 1410 at time $t_{20}$, flip-flop 330g undergoes no change.

At time $t_{21}$ the sixth and final binary bit 1330 of the first coded character wave form 1322 is impressed upon input terminal 302 of flip-flop 330. Since it is a binary 0 level input, as shown by the dashed voltage spike 1330, flip-flop 330 undergoes no change.

The ensuing sync pulse 1420 is then impressed upon input terminal 303 of shift register circuitry 300 at time $t_{22}$ so as to reset flip-flop 330. No reset action is necessary since the binary bit 1330 was at the 0 level, so flip-flop 330 undergoes no change at time $t_{22}$.

The binary 1 level at output terminal 307 of flip-flop 330 is impressed upon input terminal 311 of shift register logic network 390, and upon the occurrence of shift pulse 1420, which is impressed upon shift pulse input terminal 314, the logic network generates a binary 1 level at output terminal 316, which is impressed upon the input control terminal 319 of flip-flop 330a, urging output terminal 322 towards the binary 0 level. No change takes place at this time since output terminal 322 was at the binary 0 level immediately prior to time $t_{22}$ as shown by wave form 1404a. The binary 1 level at output terminal 321 of flip-flop 330a is impressed upon terminal 311a of logic network 390a and, coupled with the shift pulse 1420, generates an output voltage level of binary 1 at terminal 316a, which is coupled to input control terminal 319a of flip-flop 330b, driving output terminal 322a to the binary 0 level at time $t_{22}$ as shown by wave form 1405. The binary 1 level present at output terminal 322a immediately prior to time $t_{22}$ is impressed upon input terminal 312b of logic network 390b and, coupled with the shift pulse input 1420 at terminal 314b, generates a binary 1 level output at terminal 315b which, being coupled to input control terminal 317b of flip-flop 330c, generates a binary 1 level at output terminal 322b as shown by wave form 1406 of FIGURE 12c.

Output terminal 321b of flip-flop 330c, having been at the binary 1 level immediately prior to time $t_{22}$, is impressed upon input terminal 311c of logic network 390c and, coupled with the shift pulse input at terminal 314c, generates a binary 1 level output at terminal 316c, urging output terminal 322c of flip-flop 330d to the binary 0 level at time $t_{22}$ as shown by wave form 1407. Since this terminal is already at the binary 0 level, no change takes place in flip-flop 330d. The binary 1 level at terminal 321c of flip-flop 330d cooperates with the shift pulse input 1420 in shift register logic network 390d to generate a binary 0 level voltage at terminal 322d at time $t_{22}$ as shown by wave form 1408, in the same manner as previously described.

The binary 1 level at output terminal 322d, which existed immediately prior to time $t_{22}$, cooperates with shift pulse 1420 of shift register logic network 390e to drive output terminal 322e of binary flip-flop 330f to the binary 1 state as shown by waveform 1409. However, since terminal 322d is already at the binary 1 state, flip-flop 330f undergoes no change at this time. The binary 1 level existing at output terminal 322e cooperates with the shift pulse 1420 in shift register logic network 390f to drive output terminal 322f of flip-flop 330g to the binary 1 state at time $t_{22}$, as shown by waveform 1410 of FIGURE 12c.

The binary 1 level at output terminal 322f of flip-flop 330g is coupled through emitter follower 320f and conductor 398 to the input control terminal 399 of one-shot multi-vibrator 310. In a manner as described previously, one-shot 310 generates a square pulse 1421 at time $t_{22}$, as shown by waveform 1411 in FIGURE 12c, which pulse is impressed upon the input terminal 136 of the characters counting circuit shown in FIGURE 2 in order to keep a running count of the characters shifted into the shift register circuit 300, for a purpose to be more fully described.

At time $t_{22}$ it can be seen that output terminals 322f through 322 are at the binary 1, 1, 0, 0, 1, 0, and 0 voltage levels respectively, which binary coded representation represents the start bit and the six binary bits of the character, which have been shifted into the register circuitry 300. Ensuing coded characters are shifted through the register circuitry 300 in the same manner as described above, with the one-shot multi-vibrator 310 developing a pulse upon termination of the shifting of each coded character into the register circuitry 300 which adds one to the characters counting circuit of FIGURE 2, for a purpose to be more fully described. The state of each binary flip-flop 330a through 330g which contains the coded character, is employed by the binary to decimal to binary logic circuitry of FIGURE 5, which is coupled, in a manner to be more fully described, to the flip-flop output terminals 331 through 331f and 333 through 333f at the top and bottom of the shift register circuitry 300 respectively.

Binary to decimal converter

The binary codes employed in the data receiver of the instant application are shown in FIGURE 13 of the drawings, and it can be seen from the normal reading character table 1801 that the code for the decimal No. 2 is 100100, which is the code presently in the shift register circuitry 300. The 6 input AND gates 501 through 501g shown in FIGURE 5 have their inputs selectively connected to the output terminals 331 through 331e and 333 through 333e in such a manner that their input states each represent a different binary coded decimal digit; for example, assuming that the binary coded representation for the decimal digit 1, which is shown in table 1801 of FIGURE 13, is shifted into the shift register circuitry 300, in order that this decimal digit be correctly represented therein the output terminals 333e and 333c should be at the binary 1 voltage level, while the output terminals 333c and 333b, 333a and 333 should be at the binary 0 voltage level so as to represent the binary representation of 101000. Since AND gates such as the AND gates 501 through 501j are employed for the binary to decimal conversion, the opposite states of the binary flip-flops 330a through 333f are employed so as to obtain the proper outputs at the AND gates 501 through 501j which represent the decimal numbers 1 through 0 respectively.

Thus, with the output terminals 333e and 333c at the binary 1 voltage level and the output terminals 333d, 333b, 333a and 333 at the binary 0 voltage level simultaneously therewith, the output terminals 331e and 331c are at the binary 0 voltage level while the output terminals 331d, 331b, 331a and 331 are at the binary 1 voltage level. Therefore, in order to obtain a signal at the output terminal of six input AND gate 501 which represents the presence of a decimal 1, it is necessary that a binary 1 voltage level input be present simultaneously at each one of the six input terminals of AND gate 501.

The five lefthandmost input terminals of AND gate 501 are connected to output terminals 333e, 331d, 333c, 331b and 331a respectively from the shift register circuitry 300 shown in FIGURE 5 of the drawings. The righthandmost input terminal of AND gate 501 is connected to the output terminal 914 of parity check unit 900 shown in FIGURE 9 of the drawings. The output terminal 914 should be at the binary 1 level at the completion of shifting a coded character into the shift register circuit 300, which is performed in a manner to be more fully described. Thus it can be seen that if the binary check approves the transmission of a correct character, a binary 1 level voltage will be present at the righthandmost input terminal of logical AND gate 501 simultaneously with the binary 1 level voltages at the remaining input terminals.

Thus upon the occurrence of six binary 1 level voltage inputs impressed upon the six input terminals of logical AND gate 501, a binary 1 level voltage appears at the output terminal 509 of AND gate 501 which is transferred through emitter follower circuit 502, the output terminal 510 of which is coupled to the central input terminal 511 of logical OR gate 507. The logical OR gate 507, as previously described, generates a binary level output at its output terminal 512 upon the impression of a binary 1 level voltage at one of its input terminals 511, 513 or 514. The binary 1 level output is passed through emitter follower 508 through output terminal 515. The arrangement and operation of the logical AND gates 501a through 501j and the logical OR gates 507a through 507j are identical in every respect to AND gate 501 and OR gate 507 described immediately above, with the only exception being the output terminals of the shift register circuitry which are connected to the input terminals of the logical AND gates 501a through 501j which connections are determined by the binary coding of the decimal character wherein each binary coding is different from every other binary coding.

As a further example, consider logical AND gate 501a which, in order to produce a signal at its output terminal 509a indicating the presence of a valid binary coded decimal 2 (a binary code for which is 10010), has its five lefthandmost input terminals connected to output terminals 333e, 331d, 331c, 333b and 331a respectively, and has its righthandmost input terminal connected to the parity check unit output terminal mach 914 shown in FIGURE 9 of the drawings. The connections to the input terminals of logical AND gates 501b through 501j are performed in a like manner, in accordance with the coding arrangement shown in table 1801 of FIGURE 13.

Referring now to table 1802 of FIGURE 13 it can be seen that the decimal numbers 1 through 0 are herein represented by a three out of five plus ambiguity bit code. This code which is described in great detail in copending U.S. application M–718, Ser. No. 125,247, is a code which is transmitted for representing an ambiguous reading; that is, for representing a reading which lies approximately at the transition point between two decimal numbers, such as, for example, between the decimal numbers 5 and 6, where it is difficult to ascertain just which reading should be selected. Thus, this novel coding arrangement provides a 3 out of 5 codes for every possible smear reading of which there are ten such possible readings, so that each smear code is different from each other smear code, as can clearly be seen in table 1802. The righthandmost bit designated as the ambiguity bit is employed to denote the presence of such an ambiguity reading. Another important feature of the ambiguity or smear code representation is that it contains a binary 1 in every bit position that the binary code representation of the neighboring coded decimal characters contain; for example, the binary coded representation for the non-ambiguous decimal No. 5 is 01001 and the binary representation for the non-ambiguous decimal No. 6 is 11000. The smear code shown in table 1802 for a smear or ambiguous reading between decimal 5 and decimal 6 is 11001, which contains a binary 1 in every bit position that the non-ambiguous decimal 5 contains and also contains a binary 1 in every position that the decimal 6 contains. Upon inspection it can be seen that this is true of the remaining nine smear code representations.

The logical AND gates 503 through 503j are employed for the purpose of deciphering the ambiguity or smear codes shown in table 1802 of FIGURE 13, which may be shifted into shift register circuitry 300. Only the first logical AND gate 503 and its interconnections will be described, since the remaining AND gates 503a through 503j are identical in every respect, with the exception of the connections between their input terminals and the shift register circuitry 300.

The smear or ambiguity code between the decimal numbers 1 and 2 is 10110. Assuming therefore that this smear code between decimal 1 and decimal 2 is presently contained in the shift register circuitry, then the logical AND gate 503, in order to indicate at its output terminal by a binary 1 level voltage the presence of a smear between decimal 1 and 2, the five lefthandmost input terminals of AND gate 503 must be connected to output terminals 333e, 331d, 333c, 333b and 331a respectively. The righthandmost input terminal of logical AND gate 503 is connected to the output terminal 1117, which is indicative of the presence of the three out of five or ambiguity code.

Assuming therefore that a binary level 1 voltage appears simultaneously at the six input terminals of logical AND gate 503, a binary level 1 voltage is developed at the output terminal 516 of AND gate 503, thereby indicating the presence of a smear reading or code between the decimal numbers 1 and 2. This binary 1 level voltage passes through emitter follower 504 which impresses this binary level 1 voltage upon the input terminals 517 and 518 of logical AND gates 505 and 520. Considering first, logical AND gate 505, in order that it generate an output voltage it is necessary that binary 1 level voltages appear simultaneously at its two input terminals 517 and 519, in the same manner as previously described with respect to the other logical AND gates of the system. Input terminal 519 is connected to the output terminal 543 of the low value logical circuitry 550 shown in FIGURE 5 of the drawings. This logical circuit arrangement 550 operates in a manner to be more fully described so as to generate a binary level 1 voltage at its output terminal 543 which after receipt of the appropriate inputs generates a binary level 1 output indicative of the fact that the lower decimal digit of the two neighboring digits included in the smear code should be selected as the correct decimal digit. Thus assuming that a binary 1 level voltage is present at input termial 519 of AND gate 505, together with a binary level 1 voltage at input terminal 517, AND gate 505 develops an output which is transferred through emitter follower 506 and input terminal 514 of OR gate 507 which, as described previously, will generate an output voltage at its output terminal 512. This output voltage is transferred through emitter follower 508 to output terminal 515, which indicates the presence of a binary coded decimal 1 in shift register circuitry 300.

The high-value logical circuitry 551 shown in FIGURE 5 generates at its output terminal 546, in a manner to be more fully described, a binary level 1 voltage which indicates that the higher decimal digit value of a smear reading should be selected as the correct reading to be transferred through the binary to decimal conversion circuit 500 of FIGURE 5.

Thus assuming that a binary level 1 voltage is developed at output terminal 546 of high-value circuitry 551, this is impressed upon input terminals 521 of logical AND gate 520 and, since it appears simultaneously with the binary level 1 voltage at input terminal 518 AND gate 520 develops an output voltage which is transferred through emitter follower 506a and input terminal 513a of logical OR gate 507a. Logical OR gate 507a develops a binary 1 level voltage at its output terminal 512a which is transferred through emitter follower 508a to output terminal 515a, which binary 1 level voltage at terminal 515a indicates the presence of a coded decimal 2 in shift register circuitry 300 shown in FIGURE 4. The remaining logical AND gates 503a through 503j, which are connected to shift register circuitry 300 so as to indicate the presence of the remaining smear codes, are connected in a like manner to the low-value logical AND gates 505a through 520j respectively, and these AND gates 505a through 505j and 520a through 520j are connected in a like manner to logical OR gates 507a through 507j in order to produce in a like manner the presence of the remaining decimal characters, in such a manner that the output terminals 515 through 515j represent the presence of decimal numbers 1 through 0 respectively in the shift register circuitry 300 of FIGURE 3.

Decimal to binary convertor

The presence of a binary level 1 voltage at any of the output terminals 515 through 515j represents the presence of a specific coded decimal character in shift register circuit 300, and in addition thereto the fact that this character has passed the parity check test performed upon it by parity check circuit 900 shown in FIGURE 9a of the drawings. At this time a decimal to binary conversion operation is performed by conversion circuitry 600 shown in FIGURE 6 of the drawings. The binary 1248 code is shown in tables 1803 and 1804 of FIGURE 13 for the decimal numbers 1 through 0 wherein the table 1804 represents data characters which differ from each other by a binary 1 bit in the ambiguity or bit position for reasons to be more fully described. Ignoring for a moment the bit in the "A" or address position, four binary bit positions are employed to represent any decimal digit from 1 through 0; for example, decimal digit 1 is represented by 1000; decimal digit 5 is represented by 1010; and so forth. Logical OR gates 601 through 604 are employed for the purpose of converting from the decimal digit outputs 515 through 515j to the binary 1248 code arrangement appearing at output terminals 609 through 609c of the conversion circuit 600; for example, in order to represent the decimal digit 1 the coded output terminals 609 through 609c must be 1000. This is generated by connecting output terminal 515 to input terminal 601-1 of logical OR gate 601, so that upon the presence of a binary 1 level voltage at output terminal 515 (representing the presence of a coded decimal 1 in shift register circuit 300) this binary 1 level voltage which is impressed upon input terminal 601-1 causes the output terminal 608 of logical OR gate 601 to develop a binary 1 level voltage which is transferred through emitter follower 607 to output terminal 609. Since the output terminal 515 is not connected to any of the other logical OR gates 602, 603 or 604, the output terminals 609a, 609b and 609c will be at the binary 0 level, thus producing a binary code 1000 representative of the decimal digit 1.

In order to generate the proper binary 1248 code for the decimal number 7, output terminal 515f is connected to input terminal 601-4 of OR gate 601 to input terminal 602-4 of OR gate 602 to input terminal 603-4 of OR gate 603, and no connection to OR gate 604. This produces a 1248 binary code of 1110 as can clearly be seen in table 1803 of FIGURE 13 is the 1248 coded representation for the decimal digit 7. The remaining outputs 515a through 515e and 515g through 515j are connected to logical OR gates 601 through 604 in a similar manner, so as to properly produce the 1248 binary code representing the associated decimal digit.

The logical OR gate 605 is employed for the production of a character validation signal which operates as follows: The input terminals 605-1 through 605-4 of OR gate 605 are connected to the output terminals 609 through 609c of OR gates 601 through 604 respectively, so that upon the presence of a binary 1 level voltage at any one of the output terminals 609 through 609c OR gate 605 will produce an output at its output terminal 605-5 to indicate the presence of a binary 1 in at least one of the four positions of the binary 1248 code. This output is transferred via emitter follower circuit 611 to output terminal 612, which is employed by the errorlogic circuit 950 of FIGURE 9 which in a manner to be more fully described performs a highly sophisticated check upon the accuracy of the coded character presently in the shift register 300 and generates at its output terminal 985 a binary 1 level output indicative of the correctness of the coded character. Output terminal 985 of errorlogic circuit 950 shown in FIGURE 9 is connected to bus 612 which simultaneously feeds input terminals 619–623 of two input AND gates 614–618 respectively, via emitter followers 613–613d respectively. The second input terminals 624 through 625 of AND gates 614 through 617 respectively are connected to the output terminals 609 through 609c of decimal to binary conversion circuit 600 for the purpose of transferring their binary coded character from the binary 1248 circuitry 600 to the intermediate memory circuit 800 shown in FIGURE 8 of the drawings. The transfer gate circuit operates in the following manner:

The errorlogic circuit 950, shown in FIGURE 9 of the drawings, the operation of which will be more fully described, generates a binary 1 level output at its terminal 985 indicative of a correct coded character in the shift register 300, which signal is impressed simultaneously upon inputs 619 through 623 of AND gates 614 through 618 respectively. The bit positions 609 through 609c of the decimal to binary conversion circuit 600, which generate binary 1 level signals, are impressed upon input terminals 624 through 627 respectively of AND gates 614 through 617 to generate binary 1 level voltages at their output terminals 614–1 through 617–1 respectively, which are representative of the binary 1248 code and which are transferred to the inputs of the intermediate memory circuit 800 shown in FIGURE 8, to be more fully described. The AND gate 618 is employed for the purpose of transferring a binary 1 bit representative of the address bit from the decimal binary converter to the intermediate memory circuit. The input terminal 628 of AND gate 618 is connected to the output terminal 1180 of error-monitoring circuit 1150, which represents the presence of an address character, as will be more fully described. This binary bit is transferred in a like manner to the intermediate memory circuit 800 of FIGURE 8.

Intermediate memory

The intermediate memory circuit 800 shown in FIGURE 8 of the drawings is employed for the purpose of acting as a buffer memory between the conversion circuitry 600 and the paper-punch machine shown in FIGURE 1 of the drawings. The intermediate memory circuit is comprised of the dual input flip-flops 802 through 802d, having their input control terminals 803 through 803d respectively, connected through emitter followers 801 through 801d respectively, to the output terminals 614–1 through 618–1 respectively of the character transfer gate circuit shown in FIGURE 6 of the drawings.

Flip-flops 802 through 802d operate so that upon the presence of binary 1 level voltages at their input control terminals 803 through 803d, binary 1 level voltages are generated at their output terminals 805 through 805d respectively, which voltages are transferred through emitter followers 807 through 807d respectively to the punch magnets 808 through 808d respectively of the punch tape machine. The flip-flops 802 through 802d, once having been set, remain in their set states indefinitely until the occurrence of a reset pulse upon their reset input control terminals 804 through 804d respectively, which are all connected in parallel to bus 806 which derives its clear or reset pulse from output terminal 1270 of interlock timing circuit 1200 shown in FIGURE 10, which will be more fully described.

The flip-flops 802-802d, once having been set by the binary information impressed upon input terminal 612-1 through 618-1, impress the voltage levels at their output terminals 805-805d upon the emitter follower circuits 807-807d respectively. This binary information is then transferred through the emitter followers to the solenoid punch actuator means 808-808d respectively, which place the appropriate punches in a paper tape document (not shown) which is employed for the purpose of permanently storing the received data.

The flip-flop 802e is employed for the purpose of energizing the punch magnet coil means 808e upon the occurrence of an error in the coded character which has been transmitted. Thus, upon the occurrence of such an error, a binary one level signal is impressed upon the input terminal 803e of flip-flop 802e causing a binary one level signal to be transferred through emitter follower 807e to punch magnet 808e. Thus, the coded character which is perforated by punch magnets 808-808d is accompanied with an error perforation by means of punch magnet 808e upon the occurrence of a transmission or a reception signal.

The data receiver interlock control circuitry, which will be more fully described, provides the function of resetting flip-flops 802-802e by impressing a signal upon bus 806, which is impressed upon the reset input terminals 804-804e of flip-flops 802-802e respectively.

*Error monitoring circuit*

FIGURE 7 is a schematic of the ambiguity code monitoring circuit 700 which is comprised of a loading portion 700a and a memory portion 700b. The ambiguity code monitoring circuit 700 is adapted to recognize the presence of a decimal 7, 8, 9 or 0 which condition is employed for the purpose of recognizing an ambiguity condition in the next coded character received by the data receiver means. Thus, as will be more fully described, if the next subsequent coded character received by the data receiver does not contain an ambiguity bit, and if the previous coded character received represented decimal 7, 8, 9 or 0, the ambiguity monitoring circuit 700 provides an error indication.

The loading portion 700a of the ambiguity code monitoring circuit 700 is comprised of dual input flip-flop circuits 703-703c. Flip-flop circuit 703 has a four input OR gate 701 and an emitter follower 702 connected to its input terminal 704. OR gate 701 is comprised of input terminals 701-1 through 701-4 for receiving binary signals indicative of the presence of a decimal 7, 8, 9 or 0, which signals are generated at the output terminals 515f, 515g, 515h and 515j, respectively, of the binary two decimal converter circuit 500 of FIGURE 5, upon the occurrence of either a decimal 7, 8, 9 or 0. A binary one condition is passed from OR gate 701 and emitter follower 702 to flip-flop input terminals 704, causing a binary one condition to appear at output terminal 707 of flip-flop 703. The output terminals 707 and 706 of flip-flop 703 are connected through emitter followers 702d and 702a respectively to the input terminals 794 and 791 respectively of ambiguity requirement memory circuit 730b in the memory portion 700b of the ambiguity monitoring circuit 700. The ambiguity requirement memory circuit 730b is identical in structure to the shift register element 80 shown in FIGURE 11k of the drawings and is comprised of a shift register logic network 790 having input terminals 791 and 794 shift and reset terminals 795 and 792 and output terminals 793 and 796 which control the state of flip-flop 703d in control of the binary information impressed upon the shift register logic network input terminals. The flip-flop output terminals 722 and 723 transfer their binary levels through emitter follower 702l and 702m respectively to the error monitoring circuits shown in FIGURE 9 of the drawings, which circuits will be more fully described.

The operation of the ambiguity requirement logic loading circuit 730a and ambiguity requirement memory circuit 730b is as follows:

When a code character received by the shift register means of FIGURE 4 is decoded by the binary to decimal circuit 500, of FIGURE 5, the decimal value of the coded character appears at one of the terminals 515-515j of the coding circuit 500. If the decimal value of this decoded character is either 7, 8, 9 or 0, a binary one-level appears at either terminal 515f, 515g, 515h or 515j respectively. This binary one-level condition is impressed upon one of the input terminals 701-1 through 701-4 respectively of OR gate 701, shown in FIGURE 7. OR gate 701 generates a binary one-level condition at its output terminal 701-5 which is transferred through emitter follower 702 to input terminal 704 of flip-flop 703. A binary one-level voltage at the input terminal 704 causes output terminal 707 of flip-flop 703 to assume a binary one, voltage level. A binary one-level is transferred through emitter follower 702b and conductor 709 to input terminal 794 of logic network 790. This binary one-voltage level together with the binary one-level impressed upon the shift pulse input 795 generates a binary one-voltage level at output terminal 796 of logic network 790, which is impressed upon the input terminal 720 of binary flip-flop 703d. This binary one-voltage level causes output terminal 723 of flip-flop 703d to rise to the binary one-level, while output terminal 722 is shifted to the binary zero voltage level. These voltage levels are transferred through emitter followers 702l and 702 m and conductors 724 and 725 respectively to the error monitoring circuits 1150 shown in FIGURE 9 of the drawings, and to be more fully described. The shift pulse impressed upon input terminal 795 is derived from the tape punch and memory erase interlock circuits 1200, shown in FIGURE 10 of the drawings, which circuitry is to be more fully described. At this time, suffice it to say that the appropriate signal is impressed upon input terminal 712 of emitter follower 702k which transfers the pulse to bus 727.

The three out of five requirement logic coding unit and the three out of five requirement memory 748 and 740b respectively have the same circuitry as the ambiguity requirement logic input unit and memory unit 738 and 730b respectively, except that the OR gate 701a has only three input terminals and 701a-1 through 701a-3 which are connected to the decimal 8, 9 and zero terminals 515g, 515h and 515j respectively of the decoding circuit 500. The operation of the three out of five requirement logic coding circuit and memory circuit is the same as that for the ambiguity requirement logic loading and memory circuits 730a and 730b, except that only output terminal 723a or flip-flop 703e is utilized by the error monitoring circuit 1100, shown in FIGURE 9 of the drawings. Thus, as will be more fully described, the occurrence of a decimal 8, 9 or 0, requires the next coded character received to be of the three out of five code. Error monitoring circuit 1100 of FIGURE 9 compares the three out of five requirement derived from the output terminal 723a of memory circuit 740b with the actual condition of the next coded character received, in order to check the accuracy of this coded character.

The last decimal 9 loading unit 750a and its associated memory storage means 750b are employed for the purpose of determining the value of the next coded character received which should be chosen. That is, upon the occurrence of a decimal 9 condition, the next coded character received must contain an ambiguity bit identifying that received character as being capable of assuming either one of two decimal values. Thus, the last character received, having been a decimal 9, this information is employed in order to choose the lower of the two possible ambiguity values which the received character may assume. The operation of the loading circuit 750a and memory unit 750b associated therewith is identical to the operation of the three out of five logic circuit or ambiguity requirement circuit 740 and 730 respectively, the only difference being that binary flip-flop 703b receives a binary one voltage level at its input terminal 704b only upon the occurrence of a decimal 9 condition and no other. Also, only the output terminal 723b of flip-flop 703f is utilized in determining which of the two values is selected from the next received ambiguity character.

The last zero input unit and associated memory storage means 760a and 760b respectively is employed for the purpose of enabling the selection of the upper of two values which the next received ambiguity bit may assume. For example, assuming that the last received character was a decimal zero, the next character received will contain a binary one in the ambiguity bit position, enabling the data receiver to choose either the higher or lower of the two possible values which the coded character may assume. If, however, the last received character was a decimal zero, then the upper of the two possible values, which the ambiguity character may assume, is thereby chosen under control of the last zero memory unit 760b.

Both the loading units 730a–760a and the memory units 730b–760b are reset by a general reset pulse from the clocking source and general reset circuitry 1000 in FIGURE 9 of the drawings. The reset pulse is transferred through bus 726 to the memory unit 730b–760b and simultaneously therewith through OR gate 711 and emitter follower 702j to the reset bus 710, which is impressed upon input terminal 712 of monitoring circuit 700 is transferred through emitter follower 702k to memory input bus 727 in order to shift data from the associated loading input circuit 730a–760a to their associated memory units 730b–760b respectively. Simultaneously therewith the output of emitter follower 702k is impressed upon OR gate 711 and emitter follower 702j in order to reset loading units 730a–760a in readiness for the next coded character to be received.

Parity check circuit

A receiving and parity check unit 900 is shown in FIGURE 9a of the drawings and is employed for performing a parity check on the incoming coded characters. The parity check circuitry 900 is comprised of a flip-flop 930 having its output terminal 904 impressed upon one input terminal 907 of a two input AND gate 905, the output of which is connected through lead 906 to emitter follower 920 and through lead 909 to the input terminal of binary flip-flop 941, which is of the same type as the flip-flop 40 shown in FIGURE 11d of the drawings. The output terminals 912 and 913 of flip-flop 941 are connected through emitter followers 920a and 920b respectively to output terminals 914 and 915. The binary condition present at output terminal 914 is employed in the error logic circuit 950 of FIGURE 9b, to be more fully described, while the binary information present at the output terminal 915 is employed in the error monitoring circuit 1100 in FIGURE 9e of the drawings. The operation of the parity check circuitry 900 is as follows:

As the coded characters are being loaded into the shift register 300 of FIG. 4, but prior to the time that the entire coded character is shifted into the register, output terminal 333e of shift register 300 is at the binary zero voltage level. A general reset pulse, which is impressed upon terminal 902, therefore, controls the state of flip-flop 930 placing output terminal 904 at the binary one level. This voltage state impresses a binary one level upon the input terminal 907 of two input AND gate 905. The other input terminal 908 is connected to output terminal 313 of shift register circuitry 300 of FIGURE 4, which terminal is at the binary one level each time a binary one bit is introduced into the loading flip-flop 330 of shift register circuitry 300. This causes two input AND gate 905 to generate a binary one level signal which is transferred through its output terminal 906 and emitter follower 920 to the input terminal 942 of flip-flop 941.

Assuming that this is the first binary one-level signal impressed upon input terminal 942, flip-flop 941 immediately prior to the receipt of this binary one-level voltage has its output terminals 912 and 913 at the binary one and binary zero voltage levels respectively. Upon the impression of the binary one level voltage at terminal 942 the voltage levels of output terminals 912 and 913 reverse themselves to binary zero and binary one levels respectively. Thus, upon the occurrence of an even binary one count output terminal 915 is at the binary zero level while output terminal 914 is at the binary one level and upon the occurrence of an odd binary one count output terminal 915 is at the binary one level and output terminal 914 is at the binary zero level. These binary states will be employed for error-monitoring purposes, as will be more fully described.

Error logic circuit

FIGURE 9b shows the error logic circuit 950 which is adapted to provide one of the input signals for the error marking circuit 1050 shown in FIGURE 9d of the drawings, which circuit energizes the error position of the intermediate memory circuit to place a perforation in the error bit position of the paper tape memory prepared by the data receiver. The error logic circuit is comprised of four-input AND gate 951 and three-input AND gate 952, which gates are connected by emitter followers 920c and 920d respectively to the input terminals 953–1 and 953–2 of OR gate circuit 953. The output of 953 is connected through emitter follower 920e to one input terminal 1014–1 of error marking circuit 1050. The operation of error logic circuit 950 is as follows:

Upon the simultaneous occurrence of binary one levels at the input terminals 951–1 through 951–4 of and gate 951, the output thereof 951–5 carries a binary one voltage which is transferred through emitter follower 920c to one-input terminal 953–2 of OR gate 953. The output terminal 953–3 thereby generates a binary one level signal which is passed through emitter follower 920e to output terminal 985. This voltage level is employed by the error-marking circuit 1050 shown in FIGURE 9d of the drawings. The signals impressed upon the input terminals 951–1 through 951–4 are as follows:

Terminal 951–1 receives a binary one level voltage upon the occurrence of any one of the following conditions:

(1) A coded character received during the meter reading word portion of the receiving cycle, which has a binary one bit in its address bit position, which is a decimal 7, 8, 9 or zero, as indicated by the ambiguity requirement memory circuit 730b; or (2) A coded character received during the address portion of the receiving cycle on the data receiver, which has a binary one level signal in its address bit positon; or (3) A coded character received during the meter reading word portion of the receiving cycle which is not a decimal 7, 8, 9 or zero and which has no binary one condition in its address bit position; or (4) The first coded character of the meter reading word which is marked with an ambiguity bit in the ambiguity bit position.

The input terminal 951–2 of or gate 951 generates a binary voltage level when a decoded character has been validated by the character validation circuit of FIGURE 6. Input terminal 951–3 receives a binary one voltage level signal upon the occurrence of an odd parity count and input terminal 951–4 receives a binary one voltage level when the start bit has been shifted into the right-hand most position of the shift register circuit 300 of FIGURE 4. Thus, under these conditions, the and gate 951 generates a binary one level signal at its output terminal 951–5 when the coded character has three binary bits in its six bit position, has been validated as a character, has an odd parity bit count and has been completely shifted into shift register circuit 300.

The and gate 952 generates an output signal of binary one level at its output terminal 952–4 upon the occurrence of:

(1) A character validation signal at its input terminal 952–1;
(2) A 3 out of 5 plus ambiguity code signal; and
(3) An end of character signal.

The output of AND gate 952 is impressed upon terminal 953–1 of OR gate 953 which generates an output at terminal 953–3 responsive thereto. This signal is transferred through emitter follower 920 to one input terminal of the error marking circuit of FIGURE 9d which is employed for the purpose of generating an error marking signal to the intermediate memory error bit (shown in FIGURE 8) as will be more fully described.

*Error monitoring and error interlock circuit*

The error monitoring and error interlock circuit, shown in FIGURE 9c is comprised of cascaded monostable multivibrators 1030 and 1030a which provide first and second timing signals at terminals 1008 and 1008a as will be more fully described. The output of multivibrator 1030a feeds one input terminal of OR gate 1012.

The OR gate 1012 is connected to receive the output from the monostable multivibrator 1030a and the start signal from the initial input circuit shown in FIGURE 2 of the drawings, for the purpose of providing reset signals. The operation of the error monitoring and error interlock circuit is as follows:

When the start bit is transferred from the left-hand most end of the shift register, shown in FIGURE 4, to the righthand most end, a binary one signal is made available at output terminal 333f thereof, which is impressed upon the input 1001 of one-shot multivibrator 1030. This causes the output terminal 1003 to raise to the binary one level, which binary signal is transferred through emitter follower 1020a and output 1008, for the purpose of timing the error monitoring circuitry 1050, shown in FIGURE 9d of the drawings, in a manner to be more fully described. Monostable multivibrator 1030 automatically resets itself causing output terminal 1002 to rise to the binary one level at a predetermined time period after the introduction of a binary one signal upon the input terminal 1001. This binary one level is impressed upon the input 1004 of monostable multivibrator 1030a. The output thereof 1005 is impressed upon emitter followers 1020b and 1020c via leads 1006 and 1007. The output 1008 of emitter follower 1020c is employed at a timing signal in the tape punch and memory erasing interlock circuitry of FIGURE 10 which operates in a manner to be more fully described.

The output signal from emitter follower 1020b is transferred through lead 1009 to the input terminal 1012–1 of OR gate 1012. It can be seen that due to the inherent operation of OR gate 1012 either the signal impressed upon the OR gate from lead 1009, or the start signal lead 114 of FIGURE 2, will be passed by OR gate 1012 and subsequently emitter follower 1020d to output conductor 1013 and simultaneously therewith, through emitter follower 1021 to output conductor 1013a. These output conductors transfer the signal generated by OR gate 1012 upon the terminals 351 and 301 of the shift register 300, shown in FIGURE 4, so as to reset shift register 300 and simultaneously therewith upon the memory circuit 700, shown in FIGURE 7 of the drawings, to reset each memory stage of this circuit in readiness for error monitoring of the next received coded character.

*Error marking circuit*

FIGURE 9d shows the error marking circuit 1050, which is comprised of OR gate 1014, having a first input terminal 1014–1 connected to the output terminal 331f of the start bit stage of shift register 300, shown in FIGURE 4, having a second output terminal 1014–2 connected to the output terminal 985 of error logic circuit 950, shown in FIGURE 9b. The output terminal of OR gate 1014 is connected to conductor 1014–3, emitter follower 1020f, conductor 1015, inverter circuit 1075, conductor 1016 to the input terminal 1017–1 of AND gate 1017. The second input terminal 1017–2 receives a signal from the output terminal 1008 of error clocking source 1000 shown in FIGURE 9c. The output terminal 1017–3 is connected through emitter follower 1020g whose output terminal 1018 is connected to the input terminal 803e of intermediate memory circuit 800, shown in FIGURE 8 of the drawings. The operation of error marking circuit 1050 is as follows:

In the presence of either an error condition, or the absence of a start bit in the start bit position of shift register 300 (see FIGURE 4), no binary one signals are impressed upon OR gate 1014 causing a binary zero level at output terminal 1014–3. This signal is transferred through emitter follower 1020f and inverted by inverter 1075 so as to impress a binary one signal upon input terminal 1017–1. When a binary one signal from the error clocking source 1000 of FIGURE 9c is impressed upon input terminal 1017–2, the presence of simultaneous binary ones upon AND gate 1017 generates a binary one level output, which is transferred through emitter follower 1020g and conductor 1018 to the input terminal 803e of intermediate memory circuit 800, see FIGURE 8. This causes a binary one level condition to exist in the intermediate memory in the error bit position so that upon occurrence of the printing operation the coded character will be accompanied by an error designation.

*Ambiguity indicating circuit*

FIGURE 9e shows the circuit 1100 employed for identifying the presence of an ambiguity signal, or a three out of five coded character signal, which has just been shifted into the shift register 300 of FIGURE 4.

Prior to the description of the recognition circuit 1100 of FIGURE 9e, and in order to better clarify the significance of this circuitry, a brief description of the coding arrangement adaptable to the data receiver of this invention will be described. Referring now to FIGURE 13, five tables 1800–1804 are set forth, wherein each table sets forth the binary codes which are employed in the instant invention and tables 1800–1802 shows the codes which may be received by the data receiver while tables 1803 and 1804 show the codes generated by the data receiver upon receipt and processing of each coded character.

Let it be assumed that the data receiver of this application is employed for the purpose of receiving coded data from a plurality of remote locations. In such arrangements, it is advantageous for each remote location to identify itself to the data receiver by transmitting a plurality of coded characters identifying the particular remote location which is transmitting to the data receiver at any given instant. The code employed is shown in table 1800, in which the decimal characters 1–0 are set forth in the left-hand most column 1805 and the binary coded representation for each decimal character is set forth in the six adjacent columns 1806. It can clearly be seen that each decimal character is represented by a unique binary code consisting of six binary bits, which code may be considered alternatively, either a "three out of six" binary code, or a "two out of five" binary code, plus ambiguity bit wherein noting that the right-hand most column 1807 is always in the binary one state. This arrangement immediately identifies the "two out of five," plus binary bit code as a coded address character.

Immediately after identifying itself by means of transmitting a unique identifying number, the remote location then transmits coded characters representative of the intelligence or information which the central location (i.e. the Data Receiver) has requested. Table 1801 sets forth in the six column 1807 a unique binary code for each decimal digit shown in the column 1805, wherein this code may be considered to be a "two out of five" code, wherein the ambiguity bit, shown in column 1809 is always in the binary zero state. It can easily be seen that each such coded character of table 1801 distinguishes from the coded characters of the table 1800.

Table 1802 sets forth the coded representation for what are known as the transitional reading characters or ambiguity characters which are transmitted as part of the information requested by the data receiver. It can be seen clearly from table 1802 that each coded representation differs from the coded representations of table 1801 in that the ambiguity bit for each coded decimal character is always binary one. The code further distinguishes from the code of table 1800 in that the code of table 1802 is a "three-out-of-five" code, whereas the table 1800 for address character is comprised of a "two-out-of five," plus ambiguity bit code. Thus, each code of the tables 1800–1802 is easily distinguishable from the other. The operation of such code and the distinct advantages thereof are not important for the purpose of understanding the instant invention and a detailed description thereof is therefore omitted. A detailed description, however, may be found in U.S. application M–718, No. 125,247 entitled "Code Stack" filed July 19, 1961 by A. Brothman et al. and assigned to the assignee of the instant invention, and said detailed description is hereby incorporated herein by reference thereto. Returning now to the circuitry 1100 of FIGURE 9e it should be understood that this circuitry 1100 is employed for the purpose of identifying the presence of the "three out of five," plus ambiguity bit characters, which are set forth in table 1802 of FIGURE 13. The circuit 1100 is comprised of a three input OR gate 1101, whose output is transferred through leads 1101–4 and emitter follower 1120 to one input 1103–2 of OR gate 1103. Terminal 1103–1 of OR gate 1103 is connected to the output terminal 725a of monitoring memory circuit 700 shown in FIGURE 7, which signal indicates the necessity of a "three out of five" ambiguity bit, plus coded character, for a purpose to be more fully described. The output signal is transferred through lead 1103–3 and emitter follower 1120b to one input 1105–1 of AND gate 1105. Input terminal 1105–2 is connected to output terminal 915 of parity check circuit 900 shown in FIGURE 9a, which is at the binary one level whenever a "three out of five" coded character is received by the shift register 300 of FIGURE 4, as was previously described. The input terminal 1105–3 is connected to the output terminal 333 of the address or ambiguity bit stage of shift register 300, shown in FIGURE 4, which is at the binary one level in the presence of an ambiguity bit. The output terminal 1105–4 transfers its signal through emitter follower 1120c and conductor 1117 to one input terminal 952–2 of error logic circuit 950, shown in FIGURE 9b. The circuit 1100 of FIGURE 9e operates as follows:

The input terminals 1101–1 through 1101–3 are connected to the output terminals 141, 144 and 149 respectively of the characters counting circuit shown in FIGURE 2 of the drawing. The operation is such that when the characters counting function circuit contains a count of 5–8, output terminals 141, 144 and 149 are at the binary one level, these signals impressed upon the input terminals of AND gate 1101 in simultaneous fashion causing a binary one output to be developed by OR gate 1101. This signal is passed through emitter follower 1120, OR gate 1103 and emitter follower 1120b to the input terminal of AND gate 1105. The output signal generated by AND gate 1101 is also employed via terminal 1110 as one input in the character identification circuit 1150 of FIGURE 9f and also as an input to the high-low value identifying circuit 550, shown in FIGURE 5 of the drawings. The output signal impressed upon the input terminal 1105–1 of AND gate 1105, in order to cause this AND gate to generate a binary one output signal, must appear simultaneously with a binary one from terminal 915 of parity check circuit 900, shown in FIGURE 9a, and a binary one of the address or ambiguity bit stage from output terminal 333 of shift register 300 shown in FIGURE 4 of the drawings. This output signal is passed through emitter follower 1120c and output terminal 1117 to the input terminal 952–2 of the error logic circuit 950, shown in FIGURE 9b. A second means of generating a binary one level signal at output terminal 1117 is by means of input terminal 1103–1 of OR gate 1103, which receives a signal from the output terminal 725a of memory monitoring circuit 700, shown in FIGURE 7 of the drawings, which as will be more fully described, generates a binary one level at output terminal 725a when the last received character is coded to require the presence of a "three out of five" plus ambiguity bit coded character as the next character received by the shift register 300 of FIGURE 4. This binary one signal is passed in the same manner as previously described with respect to output signal from AND gate 1101 through OR gate 1103 and emitter follower 1120b to the input terminal 1105–1 of AND gate 1105. Thus, in this particular application, a second level of error monitoring is performed by comparing the information conveyed by the last received character together with the information contained in the presently received character in order to determine the accuracy of the presently received character.

*Characters identification circuit*

FIGURE 9f shows the characters identifying circuitry 1150, which is employed to recognize the presence of;

(1) A "two out of five" plus ambiguity bit coded character; or (2) An address coded character; or (3) A character transmitted during the intelligence portion of the transmitter having no such ambiguity bit; or (4) A coded character transmitted during the intelligence portion of transmission in "two out of five" plus ambiguity bit code.

The presence of any of these valid characters is impressed upon one input of the error logic circuit 950 of FIGURE 9b, which is employed to permit passage of the coded character from the character transfer gate circuit 600, shown in FIGURE 6, into the intermediate memory circuit 800, shown in FIGURE 8, in a manner to be more fully described.

The operation of the characters identifying circuit 1150 of FIGURE 9f is as follows:

The AND gate 1130 of circuit 1150 has three input terminals 1130–1 through 1130–3 which are connected respectively to the output terminal 149 of the characters counting circuit shown in FIGURE 2; the output terminal 724 of ambiguity requirement memory circuit 730b, shown in FIGURE 7 of the drawings; and the output 331 of the ambiguity bit stage of shift register 300, shown in FIGURE 4. All three of these terminals are binary one simultaneously under the following respective conditions:

(1) Terminal 1130–1 is at the binary one level during the period when intelligence data (i.e. non-identifying character coded data) is recognized by the characters counting circuit, shown in FIGURE 2;

(2) Terminal 1130–2 is at the binary one level when the last received character sets memory circuit 730b to recognize the requirement that the next received coded character have an ambiguity bit; and (3) Input terminal 1130–3 is at the binary one level when an ambiguity bit is stored in the ambiguity bit position of the shift register, shown in FIGURE 4. Upon simultaneous occurrence thereof AND gate 1130 generates a binary one level signal transferred through conductor 1130–4, emitter follower 1120d, to the input terminal 1133–1 of OR gate 1133. This binary one level is passed through OR gate 1133 and conductor 1133–5, emitter follower 1120h and output conductor 1134, to the input terminal 951–1 of AND gate 951, shown in error logic circuit 950 of FIGURE 9b whose function it is to recognize the presence of a valid coded character, as was previously described. Thus, it can be seen that AND gate 1130 is employed for recognizing a coded character having no ambiguity bit and having a "two out of five" code.

The AND gate 1131 has its input terminals 1131–1 and 1131–2 connected respectively to the output terminal 151 of the character counting circuit shown in FIGURE 2 and to terminal 333 of the ambiguity bit position of shift register 300, shown in FIGURE 4. When the output terminal 151 of the character counting circuit is at the binary one level, this recognizes the transmission of coded address characters, which binary one level is impressed upon the AND gate 1131. The output terminal 333 of the address bit position is at the binary one level in the presence of an ambiguity bit, stored in that position. The simultaneous presence of these signals are passed through the lead 1131–3, emitter follower 1120e and conductor 1133–2 through OR gate 1133 and emitter follower 1120h, to output conductor 1134, for use in the same manner as described with respect to the signal developed by AND gate 1130.

AND gate 1132 operates to recognize coded characters transmitted during the intelligence portion of the transmission period and has its input terminals 1132–1 through 1132–3 connected respectively to the output terminal 725 of the ambiguity circuit 730b of FIGURE 7 and the output terminal 333 of the ambiguity bit position of shift register 300 shown in FIGURE 4. Input terminal 1132–1 is at the binary one level when the characters counting function is in the portion of the count, which recognizes the presence of the intelligence portion of the transmission cycle. Input terminal 1132–2 is at the binary one level when the last received character sets the ambiguity requirement memory circuit 730b so that its output terminal 725 is at binary one, requiring the next received character to have a binary one in its ambiguity bit position. Input terminal 1132–3 is at the binary one level when the ambiguity bit position of the shift register 300 is at the binary one level.

Upon the simultaneous presence of these binary one signals AND gate 1132 generates a binary one signal which is passed through conductor 1132–4 and emitter follower 1120f and input 1133–3 of OR gate 1133 which passes this signal to conductor 1134 to be impressed upon error logic circuit as previously described.

The AND gate 1129 of FIGURE 9f has two input terminals 1129–1, 1120–2 which are connected respectively to the output conductor 1110 of recognition circuit 1100 shown in FIGURE 9e and to the output conductor 333 of the ambiguity bit position of shift register 300, shown in FIGURE 4. Input terminal 1129–1 is at the binary one level when the first coded character of the intelligence portion of transmission is being transmitted and input terminal 1129–2 is at the binary one level when a binary one is stored in the ambiguity bit position of the shift register. This causes AND gate 1129 to generate a binary one level signal, transferred by conductor 1129–3, emitter follower 1120g and input 1133–4 of OR gate 1133, which passes the binary one level to the output terminal 1134, for use in the manner as previously described. Thus, it can be seen that characters recognition circuit 1150, together with the character recognition circuit 1100 of FIGURES 9f and 9e respectively, identify the presence of the possible coded characters which may be received by the data receiver of this invention. In the absence of the receipt of such valid characters, no signal is generated by these circuits, which causes error logic circuit 950 of FIGURE 9b to prevent transference of the received character to the intermediate memory circuit of FIGURE 8 and ultimately to the paper or magnetic tape output, or storage thereon.

*Interlock circuit*

FIGURE 10 sets forth the interlocking and synchronizing circuitry employed for properly controlling the operation of the permanent recording means such as the tape punch or magnetic tape and for controlling the reset of the intermediate memory circuit shown in FIGURE 8 of the drawings.

The operation of the circuitry of FIGURE 10, which will be considered together with the waveform shown in FIGURE 10a, is as follows:

OR gate 1201 of circuit 1200 shown in FIGURE 10 is adapted to receive signals from the output terminal 985 of error logic circuit 950 and from the output terminal 1018 of error marking circuit 1050, shown in FIGURE 9d. The output signal from logic circuit 950 is binary one when a valid character has been received and the output of error marking circuit 1050 is binary one when a valid character has been received, but it proves to be inaccurate due to the occurrence of a compensating error, for example. Thus, either one of these two signals are sufficient to initiate the operation of the interlock and timing circuit 1200. Either one of these signals which are impressed upon the terminals 1201–1 and 1201–2 respectively are passed by OR gate 1201 through conductor 1201–3, emitter follower 1220 and conductor 1202, to the input control terminal 1211 of monostable multivibrator 1230. The output pulse of OR gate 1201 is shown by waveform 1201–3 of FIGURE 10a as having a front porch which occurs at the time $T_0$. This binary one level signal causes monostable multivibrator 1230 to switch to its unstable state causing the waveform shown by numeral 1203 in FIGURE 10a to be generated at the output terminal 1203. At time $T_1$ multivibrator 1230 automatically resets itself causing the back porch of this signal to be passed through emitter follower 1220a and conductor 1204 to trigger monostable multivibrator 1230a in the same manner as described with respect to multivibrator 1230. This generates a waveform 1206 shown in FIGURE 10a at output terminal 1206. The same operation occurs with respect to monostable multivibrators 1230b and 1230c until at time $t_3$ the outputs shown by waveforms 1208 and 1209 in FIGURE 10a are generated at the output terminals 1208 and 1209 respectively. The waveform 1208 generated at terminal 1208 is impressed upon input terminal 1232 of monostable multivibrator 1230d for a purpose to be more fully described.

At time $T_4$ monostable multivibrator 1230c automatically resets itself causing the back porch of waveform 1208 to pass through emitter follower 1220b so as to be impressed upon the input terminal 1210 of dual flip-flop circuit 1240 via emitter follower 1220b. The bistable or dual element flip-flop 1240, together with bistable flip-flops 1240a and 1240b and the interconnections therebetween form a counter circuit of three stages for the purpose of synchronizing the operation of the data receiver circuit with a memory storage means such as the paper tape means 1400 of FIGURE 1b. FIGURE 10b shows the table 1260 setting forth the eight possible states of the count-of-eight counter comprised of binary flip-flops 1240–1240b wherein the count-of-eight counter when reset as represented by the letter R, has its output terminals 1214, 1218 and 1222 respectively, all at the binary one level.

This counting circuit is employed by the control logic gates 1225 and 1228 in the following manner:

AND gate 1225 has input terminals 1225–1 through 1225–3 which receive respectively the output signals from the terminals 1214, 1218 and 1222. With the output terminals of the count of eight counter all at the binary one level, AND gate 1225 generates a signal, which is passed through lead 1226 and emitter follower 1220h to output terminal 1227. This signal is employed by the tape memory clutch control circuit of FIGURE 1200 to be more fully described. It should be noted that when AND gate 1225 generates an output signal, this is representative of a count of zero (or eight as the case may be).

AND gate 1228 has input terminals 1228–1 through 1228–3 which are connected respectively to the output terminals 1214, 1218 and 1249 of the count of eight counter. When these input terminals are all at the binary one level, AND gate 1228 generates a binary one signal which is passed through conductor 1229, emitter follower 1220j and output conductor 1231 to a second input terminal of the memory tape clutch actuation circuit, to be more fully described. It should be noted that output terminal 1249 of count of eight counter is connected to the output 1223 of binary flip-flop 1240b, which is in the reverse state of output terminal 1221 of this binary flip-flop, so that AND gate 1228 generates a binary one level signal after the accumulation of a count of three, which is actually four characters removed from the count of eight count. These signals, as will be more fully described are employed for the purpose of causing a separation on the tape memory of a first predetermined distance between address coded characters and information coded characters and causes separation of a predetermined second distance greater than said first distance for the purpose of providing adequate separation between adjacent characters to be printed so that they may be easily identified on the memory tape means by means of this separation.

The gate control circuit of FIGURE 1200 is comprised of the monostable multivibrator 1230d, which is connected to output terminal 1208 so as to receive the waveform 1208 shown in FIGURE 10a. The overall operation of the gate control circuit is as follows:

At a time $T_A$ the input terminal 1251 of interlock circuitry 1200, which is connected to the output terminal 114 of the reset circuit of FIGURE 2, receives the binary one pulse as shown by waveform 114 in FIGURE 10a. This pulse is employed as a reset pulse via bus 1224, which resets binary flip-flops 1240–1240b of the count-of-eight counter and simultaneously therewith resets dual input flip-flops 1240c and 1240d. This reset operation upon flip-flop 1240c causes the output terminal 1237 thereof to go to the binary zero level at time $T_A$ as shown by waveform 1237 in FIGURE 10a. This binary zero level is impressed through emitter follower 1220n upon the input terminal 1235–2 of AND gate 1235, thereby preventing AND gate 1235 from generating any binary one output signal regardless of the input signal at its terminal 1235–1. At a time $T_B$, after time $T_A$, a binary one level signal is impressed upon input terminal 1238 of flip-flop 1240c via the output terminal 1008 of error clocking circuit 1000 shown in FIGURE 9c. This binary one level represented by waveform 1008 shown in FIGURE 10a occurs at a time slightly after shift register 300 of FIGURE 4 generates a signal identifying the fact that a full coded character has been completely shifted into shift register 300. This causes output terminal 1237 to go to the binary one level at time $T_B$ as shown in FIGURE 10a. This binary one level is impressed upon the input terminal 1235–2 of AND gate 1235 at time $t_4$ as shown by waveform 1236 in FIGURE 10a.

The presence of a valid character or an invalid character signal upon the input terminals 1201–1 or 1201–2, respectively, of OR gate 1201 causes a signal to be passed through emitter follower 1220 to the input terminal 1211 of multivibrator 1230 which is in the multivibrator chain comprising multivibrators 1230–1230c. This timing chain operates in the manner previously described with respect to the monostable multivibrator of FIGURE 11a until ultimately at time $T_4$ the back porch of the pulse emitted from multivibrator 1230c, as shown by waveform 1208 in FIGURE 10a, is impressed upon the input terminal 1232 of multivibrator 1230d. Multivibrator 1230d generates a signal as shown by waveform 1233 of FIGURE 10a, which coupled with the binary one level from the output terminal 1237 of flip-flop circuit 1240c causes AND gate 1235 to generate a binary one level signal which is impressed through output 1236, emitter follower 1220m and conductor 1253 upon the input terminal 1205 of multivibrator 1230a. As can clearly be seen, this arrangement establishes a feed-back path causing the multivibrator chain, comprised of multivibrators 1230a–1230c, coupled with the multivibrator 1230d and AND gate circuit 1235 to continuously circulate a signal around this loop. This closed loop is employed for the purpose of accumulating a count in the count-of-eight counter whose input terminal 1210 is connected to the output terminal 1209 of multivibrator 1230c of the closed loop multivibrator chain. The closed loop, coupled with the count-of-eight counter circuit is employed for the purpose of synchronizing the operating speed of the data receiver circuit, together with the operating speed of the paper tape punch device so that the operations will interlock in a smooth manner. This is necessary since the data receiver is an all-electronic high speed operating circuit whereas the paper tape punch device is an electromechanical device and has an operating speed which is substantially less than the operating speed of the data receiver.

When either the valid characters or error marking signal are impressed upon the input terminals 1201–1 and 1201–2 of interlock circuit 1200, this signal is simultaneously impressed upon the input terminals of the character transfer gate circuit 650 causing the binary coded character to be impressed upon the intermediate memory circuit 800 of FIGURE 8. This causes actuation of a specific combination of punch magnet members of the punch magnet group 808–808e which are employed to represent the coded character in the punch arrangement. Since the physical operation of the punch members under control of the punch magnets 808–808e takes a substantially longer period of time than the operation of an electronic circuit, the closed group comprised of multivibrators 1230a–1230d and the count-of-eight counter circuit provides an adequate delay period which is sufficient in length to permit the punch magnets to complete the punching operation. In the present arrangement this consists of accumulating a count-of-three in the count-of-eight counter. At the completion of the count-of-three, binary one level signals are impressed upon the input terminals 1228–1—1228–3 of AND gate 1228, causing the binary one level signal to be developed at its output terminal 1229 which is impressed upon the input terminal 1243 of flip-flop 1240d via emitter follower 1220j and output lead 1231. This causes a binary one level signal to develop at the output terminal 1244 of flip-flop 1240d which signal is first passed through emitter follower 1220q to the tape punch clutch mechanism 1280, which is employed to actuate the paper tape device so that the paper tape is advanced to the next position thereon in readiness for the next punching operation. Simultaneously therewith the output level at terminal 1244 is passed through emitter follower 1220p to lead 1247. This lead is connected to the memory monitoring circuit 700 and is employed to clear the loading half of each memory device in the memory monitoring circuit and to shift this information into the memory portion of the monitoring circuit from the loading portion of each circuit. This places the loading units of each memory monitoring circuit in readiness for the next coded character to be received. Output terminal 1244 is further connected through emitter follower 1220p and lead 1246 to input terminal 1248–1 of OR gate 1248 which passes this binary one level signal at its output terminal 1248–3 and through emitter follower 1220t to the input terminal 806 of intermediate memory circuit 800, shown in FIGURE 8, via the output lead 1270. This signal is employed to automatically reset the intermediate memory circuit in readiness for the next coded character to be received.

The continuous loop of multivibrators 1230a–1230d causes count-of-eight counter to continue accumulating a count until a count-of-eight condition is achieved. At this instant of time AND gate 1225 has binary one level signals impressed upon its input terminals 1225–1—1225–3 causing a binary one level to be generated at its output terminal 1226 which level is passed through emitter follower 1220h and lead 1227 to the reset input terminal 1245 of dual input flip-flop circuit 1240d. This causes reset of flip-flop circuit 1240d such that a binary one level is generated at the output terminal 1239 of the flip-flop circuit. This positive going pulse is impressed upon the reset input terminal 1241 of flip-flop circuit 1240c. This state generates a binary zero level at the output terminal 1237 of flip-flop 1240c causing a binary zero level signal to be impressed upon the input terminal 1235–2 of AND gate 1235. This state prevents AND gate 1235 from passing a binary one level, thus, terminating the circulation of a signal through the closed loop and the count-of-eight counter circuit. It should be understood that the actual delay provided may be modified in order to accommodate any other storage means other than the paper tape means described herein. Such other storage means may be faster or slower, paper tape devices, magnetic tape storage means, magnetic drum storage means, magnetic core storage means, or any other suitable storage devices. The time delay provided may be modified by increasing or diminishing the number of multivibrators 1230a–1230d employed or by increasing or diminishing the size of the count-of-eight counter, or simply by modifying the connections between the count-of-eight counter and the AND gates 1225 and 1228.

The clutch actuation circuit of FIGURE 12 operates in the following manner:

At time $T_A$ the reset pulse, as shown by waveform 114 in FIGURE 10b, causes output terminal 1244 to move to the binary zero state at time $T_A$ as shown by waveform 1244 of FIGURE 10b. After a three count has been accumulated by the count of eight circuit this state is recognized by AND gate 1228 causing output terminal 1231 to impress a binary one level on the input control terminal 1243 of flip-flop 1240d, a predetermined time after a character has been received and processed by the data receiver. This binary one level as shown by waveform 1231 of FIGURE 10b causes output terminal 1244 at the time $T_C$ to rise to the binary one level impressing its output through two parallel branches. The first parallel branch consists of emitter follower 1220q and actuating means 1280, which through its output terminal 1271 energizes the memory tape clutch means (not shown) to advance the tape one complete step.

The second parallel branch consists of emitter follower 1220p which transfers a binary one level signal through conductor 1246 and 1247, which terminal is connected to the input terminal 712 of memory monitoring circuit 700 shown in FIGURE 7 in order to perform the reset of the loading portion 730a–730c of the memory circuit, in a manner to be more fully described. Output terminal 1246 is also connected to one input terminal 1248–1 of OR gate 1248, which passes this signal through emitter follower 1220t and output conductor 1270 to the reset bus 806 of intermediate memory circuit 800, shown in FIGURE 8, in order to reset this memory circuit in readiness for the next character to be processed in a manner to be more fully described.

In order that the intermediate memory be reset after the processing of an entire message and before the processing of the next message by the data receiver, OR gate 1248 is provided with a second input terminal 1248–2 which receives a signal via input conductor 1274 and emitter follower 1220s. Input conductor 1274 is connected to the output terminal 114 of input circuit 100 of FIGURE 2 which binary one signal is passed through OR gate 1248 and emitter follower 1220t providing reset for the intermediate memory circuit 800 of FIGURE 8 immediately before the processing of the first coded character of the new message now being received by the data receiver.

*High-low selection circuit*

The high-low value determining circuit 550 shown in FIGURE 5 of the drawings functions in the following manner:

Referring initially to tables 1802 and 1801 shown in FIGURE 13, it should be noted upon analysis of these tables that the "three out of five" coded characters in table 1802 are a binary summation of the adjacent "two out of five" coded characters of table 1801. For example, the decimal number 3 is identifiable as 10101 in table 1802. It should be noted that in table 1801 decimal number 3 is comprised of the code 10001 and the decimal number 4 is comprised of the code 00101. It can be seen that the summation of these two coded characters by an OR operation will generate the coded character 10101 representing the decimal number 3 as shown in table 1802. Thus it should be noted that the coded character in table 1802 for the decimal number 3 is actually a "smear" or actually a combination of the decimal numbers 3 and 4. Thus, upon receipt of the coded character 3, as shown in table 1802, the data receiver, upon receipt of such a smear or transitional reading, requires means for identifying whether the higher or lower of these two decimal numbers (decimal 3 or decimal 4) should be accepted. This function is performed by the circuit 550 of FIGURE 5a.

Circuitry 550 operates in the following manner:

AND gate 530 is provided with input terminals 536 and 537, which are connected respectively to output terminal 149 of the characters counting circuit of FIGURE 2; and is connected to the output terminal 725b of the lower value requirement circuit 750b of the memory monitoring circuit 700, shown in FIGURE 7. When the input terminal 536 is at the binary one level, this means that a data, or intelligence coded character is being received. When the input terminal 537 is at the binary one level, this means that a lower value requirement has been recognized upon processing the last received coded character. The simultaneous presence of these binary one level signals is passed by AND gate 530 through conductor 538, emitter follower 532, and input terminal 539 of OR gate 534, which passes this signal through conductor 542, emitter follower 535 and output lead 543 to the input terminals 519 through 519j of AND gates 505–505j causing the lower of the two values to be selected in the code converter circuit 500 of FIGURE 5. Or gate 534 is provided with second and third input terminals 540 and 541 which are connected respectively to the output terminal 1110 of character identifying circuit 1100 shown in FIGURE 9e; and the output terminal 151 of the characters counting circuit of FIGURE 2. Input terminal 541 is at the binary one when the coded address characters of the transmission cycle are being received and input terminal 540 is at binary one when the first character of the intelligence portion of the transmission cycle is being received. Either of these signals are passed by OR gate 534 and emitter follower 535, to be impressed by conductor 543 upon the AND gates 519–519j in order to select the lower of the two decimal values.

In order to select the higher of the two values, when a transitional or "three out of five" coded character is received, AND gate 531 is provided which has input terminals 544 and 547 connected respectively to output terminal 149 of the characters counting circuit of FIGURE 2 and output terminal 725c of the upper value requirement memory stage 760b, shown in FIGURE 7 of the drawings, plus upon the simultaneous presence of an intelligence coded character during the intelligence transmission portion of the cycle (as recognized by the character counting circuit of FIGURE 2), an upper value requirement as stored in the upper value requirement memory stage 760b AND gate 531 generates a binary one which is passed by emitter follower 533 and conductor 546 to the input terminals 521–521j of AND gates 520–520j in order to permit code converting circuit 500 of FIGURE 5 to select the higher of the two values which the transitional coded character represents.

The operation of the high-low value identifying circuit 550, in combination with the code conversion circuit 500 of FIGURE 5 is as follows:

The reception of a "three out of five" coded character by shift register 300 of FIGURE 4 causes AND gate 503b to generate a binary one level signal at its output terminal 516b which is passed through emitter follower 504b simultaneously to the input terminals 517b and 518b of AND gates 505b and 520b respectively. The output of AND gate 505b is connected through emitter follower 506d to one input terminal 514b of OR gate 507b. When AND gate 505b generates a binary one level signal, this is passed through emitter follower 506d and ORGATE 507b and emitter follower 508b to output terminal 515b which binary one level represents the presence of a decimal 3.

In a like manner, AND gate 520b is connected through emitter follower 506e to input terminal 513c of OR gate 507c and when AND gate 520b generates a binary one level signal, this is passed via ORGATE 507c and emitter follower 508c to output terminal 515c, a binary one level at terminal 515c indicates the presence of a decimal 4 in the shift register 300 of FIGURE 4. Thus, it can be seen that AND gate 503b may have its binary one output diverted so as to indicate either the presence of a decimal 3 or a decimal 4. In order to determine which path the output voltage level of AND gate 503b will take, the high-low value identifying circuit 550 is employed in such a way that its output terminals 543 and 546 are connected respectively to the input terminals 519b and 521b of AND gates 505b and 520b respectively. When a low value is to be chosen, output terminal 543 of the identifying circuit 550 generates a binary one level signal at input terminal 519b, of AND gate 505 causing the code converting circuit 500 to identify the presence of a decimal 3. In a like manner, if the high value is chosen, output terminal 546 of identifying circuit 550 presses a binary one level signal upon the input terminal 521b of AND gate 520b causing the code converting circuit of FIGURE 5 to recognize the presence of a decimal 4. Thus it can be seen that the code converting circuit of FIGURE 5, in addition to converting the "two out of five" coded characters directly into their decimal equivalence, also has the capability of converting the "three out of five" or transitional coded characters into either a high or low value, depending strictly upon the requirement impressed upon the coded character presently being processed by the last received character, thus aiding in the correct selection thereof.

*System operation*

Having described the operation of each sub-assembly of the over-all data receiver system and referring particularly to FIGURE 1 of the drawings, a procedural description of the operation of the data receiver will now be given:

It should be noted that FIGURE 1 shows the data receiver in diagramatic form wherein each block of the diagram identifies the circuit which it represents, both by name and number.

Operation of the data receiver is begun by depressing the start button 101 which signals the transmitter (not shown) at the remote location to begin its transmission cycle. This signal is impressed upon the reset action circuit 110 for providing first a delay function and then generating an output signal at its terminal 114 to reset the code separation circuit 200 and to reset the tape punch and memory erasing interlock circuits 1200 in readiness for receipt of the next coded character to be processed. Output terminal 115 of delay and reset circuit 110 is employed to condition the receiving gate 150 so as to pass pulses of the incoming pulse train therethrough. The output terminal of receiver gate 122 impresses this pulse train upon the input terminal 202 of code sync separater 200. The code sync separater circuit 200 takes the pulse train impressed upon its input terminal 202 and separates the sync pulses from the code pulses contained in this received pulse train and transmits these sync and code pulses via the conductors 237 and 233 respectively, to the input terminals 303 and 302 respectively, of shift register circuit 300.

Shift register circuit 300 through its output terminal 313 transfers each binary one bit as it is received to the input terminal 908 of parity bit circuit 900. Terminal 333e, of shift register 300 causes the parity check circuit of 900 to terminate its count since the binary one level at the output terminal 333e of shift register 300 designates the completion of the shifting operation of a coded character into the shift register. Upon completion of the shifting operation, the output terminal 399a of shift register 300 impresses a binary one level signal upon the input terminal 136 of the characters counting circuit 175 shown in FIGURE 2, in order that characters counting circuit 175 keeps an accurate count of the characters as they are processed by shift register 300. After the entire coded character bit positions have been shifted into register 300, this coded character generates binary one or binary level signals at the output terminals 320f–320k and 333a–333e upon the input terminals of the AND gates 501–501j of the coded character converter circuit 500, the paradox check circuit output terminal 914 impresses its binary one level output indicative of the presence of a "two out of five" coded character upon the sixth input terminal of each of the AND gates 501–501j of coded character converter circuit 500 which acts to indicate the completion of the shifting cycle of the coded character into register 300 and further, acts to check on the accuracy of this coded character. The coded character converter circuit 500 converts the "two out of five" coded character signals into a single binary one level signal at one of its ten output terminals 515–515j, which are impressed upon the decimal to binary conversion circuit via the input leads of OR gate 601–604. The decimal to binary conversion circuit 600 converts the output of code conversion circuit 500 into a binary coded decimal coding arrangement which is impressed upon the input terminals 609–609c of the character transfer gate circuit 650. The character transfer gate circuit 650 includes the character validation OR gate 605 which recognizes the presence of a valid binary coded decimal character as part of the data receiver error monitoring scheme. The output of the character validation circuit has its output terminal 612 connected to the input terminals 951–2 and 952–1 of the error logic circuit 950.

The character transfer gate circuit 650 has its output terminal 614–1 to 618–1 connected to the input terminals 809–809d of intermediate memory circuit 800 in order to transfer the binary coded decimal character from the transfer gate into the intermediate memory circuit 800. Before this transfer may take place, however, error logic circuit 950 performs a plurality of validity checks in addition to the character validation check of the OR gate circuit 605, which checks are performed in the following manner:

The input terminals 951–4 and 952–3 of error logic circuit 950 are connected to output terminal 333g of shift register circuit 300 which output terminal is a portion of the start bit storage position of the shift register 300 and which output terminal is at binary one indicative of the termination of shifting all the bits of a coded character into the shift register 300. Thus it can be seen that so far error logic circuit 950 prevents transfer of a coded character into the intermediate memory until completion of the shifting operation and also in the absence of a valid binary coded decimal character. Input terminal 951-3 of logic circuit 950 is connected to output terminal 915 of parity check circuit 900, which is employed to generate an even parity count upon the presence of a "two out of five" coded character which has been shifted into shift register 300. Thus the third test which error logic circuit 950 performs is the recognition of a "two out of five" coded character. Input terminal 951-1 of logic circuit 950 is connected to output terminal 1134 of code identifying circuit 1150 which identifies the possible "two out of five" codes which may exist and which are valid codes that may be received by data receiver of this invention. Thus, as described immediately above, error logic circuit 950 identifies, through a first logic circuit, the presence of a "two out of five" coded character which has been completely shifted into shift register 300 which also compares with the even parity check and which has converted into a valid binary coded decimal character.

The second logic circuit of error logic circuitry 950 has its input terminal 952-2 connected to the output terminal 1117 of character identifying circuit 1100 which is adapted to identify the presence of "three out of five" coded characters. This circuit has the additional capability of identifying three out of five coded characters which convert into valid binary coded decimal characters and which have been completely shifted into shift register 300. Thus the output terminal of this circuitry 985 is connected to the input terminal bus 612 of character transfer gate circuit 650 to enable the transfer of a binary coded decimal information from the decimal binary conversion circuit 600 through the transfer gate circuitry 650 to the input terminals 809-809d of intermediate memory circuit 800. The transfer of this binary coded decimal character is performed by the punch magnets 808-808e of the intermediate memory circuit which actuate paper punch facilities (not shown) represented by the printing means 1400, shown in FIGURE 1.

The characters identifying circuit 1100 has its input terminals 1101-1 through 1101-3 connected to the output terminals 141, 144 and 149 of the character counter 175 in order to identify that portion of the transmission cycle in which data coded characters are being transmitted. Input terminal 1103-1 of circuit 1100 is connected to the output terminal 725a of three out of five requirement memory circuit 740 which due to the receipt of the last received coded character requires the presence of a three out of five coded characters of the character presently being received.

Input terminal 1105-2 connected to output terminal 915 of parity check circuit 900 which is at binary one in the presence of a "three out of five" coded character in the shift register circuit 300. Input terminal 1105-3 is connected to output terminal 333 of shift register circuit 300 which is at binary one to indicate the presence of an ambiguity bit in the ambiguity bit position of shift register circuit 300. Thus, character identifying circuit 1100 identifies the presence of a "three out of five" coded character by means of identifying either the presence of a "three out of five" requirement or the presence of the first coded character of the data intelligence transmission and the presence of a "three out of five" code character and shift register 300 and the presence of an ambiguity bit in the ambiguity bit position of shift register 300. The output 1117 thereof is impressed upon error logic circuit 950 to identify the presence of a valid "three out of five" coded character.

The valid identifying character circuit 1150 identifies the presence of "two out of five" coded characters wherein input terminal 1130-1 is connected to output terminal 149 of character counting circuit 175, input 1130-2 is connected to the output terminal 724 of ambiguity requirement circuit 730 and input terminal 1130-3 is connected to the output terminal 331 of shift register circuit 300. This portion of circuitry 1150 recognized a presence of a coded character containing an ambiguity bit, an ambiguity bit requirement, included in the transmission of the the last coded character processed by the data receiver and the transmission of this coded character during the intelligence portion of the transmission cycle. This generates an output at the terminal 1134 which is employed by error logic circuit 950 as was previously described.

Input terminal 1131-1 of logic circuit 1150 is connected to output terminal 151 of character counter 175, while input terminal 1131-2 is connected to output terminal 333 of shift register circuit 300 wherein this portion of logical circuitry 1150 is employed to identify the presence of a coded character having an ambiguity bit in its ambiguity bit position, which coded character is transmitted during the address identifying portion of the transmission cycle. This generates a valid character signal at the output terminal 1134.

In addition thereto, a signal is generated at output terminal 1180, which signal is impressed upon input terminal 628 of character transfer gate 650, which is employed for the purpose of transferring, along with binary coded decimal characters of the address portion in the transmission cycle, a binary one bit which is transferred to the input terminal 809d of intermediate memory circuit to identify binary coded decimal characters together with an ambiguity bit to identify an address coded character.

Input terminal 1132-1 is connected to character counter output terminal 149, input terminal 1132-2, is connected to output terminal 725 of ambiguity requirement circuit 730 and input terminal 1132-3 is connected to output terminal 333 of shift register circuit 300. This portion of the character identification circuit 1150 identifies a coded character which has been received in shift register circuit 300 and which has an ambiguity bit in its ambiguity bit position, has been received during the data transmission portion of the transmission cycle and has an ambiguity requirement imposed upon it by the last received coded character processed by the data receiver. This valid character output pulse is impressed upon error logic circuit 950 in the same manner as described previously. The remaining portion of valid character recognition circuit 1150 has its input terminal 1129-1 connected to the output terminal 1110 of three out of five plus ambiguity character identifying circuit 1100 which signal identifies the presence of the first coded character of the intelligence transmission portion of the over-all transmission cycle. Input terminal 1129-2 is connected to output terminal 333 of shift register circuitry 300 indicative of the presence of an ambiguity bit in the ambiguity bit position of the coded character being received. This character validation recognition recognizes the presence of a coded character being received which has a binary one in its ambiguity position and which is the first coded character of the intelligence portion of the transmission cycle. The output generated by this portion of the circuitry 1150 is employed by error logic circuitry 950 in the same manner as was previously described.

The error monitoring memory circuit 700 contains four independent memory units 730-760. The operation of memory unit 730 is as follows:

Input terminals 701-2 are connected to output terminals 515f–515j of coded character converter 500 so that ambiguity requirement circuit 730 receives a binary one whenever a decimal 7, 8, 9 or zero is being processed by code converter 500. The receipt of this signal causes a binary one level at output terminal 725 and a binary zero level output at output terminal 724. This is utilized by characters identification circuit 1150 to identify the presence, that of "two out of five" plus ambiguity bit characters and two out of five plus no ambiguity bit characters respectively. Thus, when a decimal character presently being received is either decimal 7, 8, 9 or zero, this place the requirement that the next received coded character must have an ambiguity bit in its ambiguity bit position, which is identifiable by output terminal 725 being at the binary one level.

Memory crcuit 740 is employed for identifying the requirement of a three out of five code, which is to be present at the next processed coded character. This circuit operates as follows:

Input terminals 515g, 515h and 515j respectively of code converter 500 so that a binary one level input is impressed upon circuit 750 when a decimal 8, 9 or zero is being processed by code converter 500. This causes the memory portion 740b (see FIGURE 7) to generate a binary one level output at its output terminal 725a, which signal is impressed upon valid character identification circuit 1100 which is used to identify the presence of a three out of five plus ambiguity bit coded character.

Memory circuit 750 operates in the following manner:

Input terminal 704b is connected to output terminal 515h of code converter circuitry 500 and rises to the binary one level when a decimal 9 is being processed by code converter circuitry 500. This causes the output terminal of the memory portion 750b to generate a binary one level signal at its output 725b. This signal is employed upon the input terminal 537 of high-low decimal selector circuit 550 so that the next received coded character which is a transitional character, so that the lower of the two decimal values which the transitional coded character represents, will be selected under control of the lower value requirement memory circuit 750.

The operation of the upper value requirement memory circuit 760 is as follows:

Input terminal 704c is connected to output terminal 515j of code converter circuit 500 so that it receives a binary one signal indicative of the presence of a decimal zero, which is being processed by code converter circuit 500. This causes the output terminal 725c of memory circuit 760 to generate a binary one voltage level which is impressed upon the input terminal 544 of high-low decimal value selector circuit 550. This permits the high-low decimal value selector circuit 550 to select the higher of the two values which the transitional coded character which is next received contains. These signals 546 and 543, which represent the high and low value selection outputs are impressed upon the code converter circuitry 500 in order to enable selection of the proper value of the transitional coded character as was previously described.

The memory section 730b–760b of each memory circuit 730–760 respectively is reset by an output pulse from terminal 1247 simultaneously with the transmission of a pulse for advancing the permanent tape memory in readiness for printing of the next coded character therein. This memory circuit is also reset by the general reset output terminal 1013 of reset circuitry 1000 shown in FIGURE 9c.

The error marking circuit 1050 has its input terminal 1014-2 connected to the output terminal of error logic circuit 950, its input terminal 1014-1 connected to the output terminal 331f of shift register circuitry 300, and its input terminal 1017-2 connected to the output terminal 1008 of the error clocking source 1000. Thus error marking circuit generates an output pulse at its output terminal 1018 when neither a valid character signal is received nor the start bit has been shifted into the start bit position of the shift register circuitry 300 and simultaneously therewith when a binary one pulse is received from output terminal 1008 indicative of the fact that a coded character has been fully shifted into shift register circuitry 300.

This output is impressed upon the input terminal 803e of intermediate memory circuit 800 in order to print an indication in the permanent tape printing means 1400 that the received character presently being printed into the permanent tape printing means contains an error. This signal is also employed by the interlock circuitry 1200 for reinitiating a count in the count of eight counter-shown therein as will be more fully described.

The error clocking source and general reset circuit 1000 (see also FIGURE 9c) operates in the following manner:

The input terminal 1001 is connected to the output terminal 33f of shift register circuit 300 which impresses a binary one level upon input terminal 1001 when the start bit position of the shift register circuit 300 contains the start bit indicative of the completion of transfer of a coded character into shift register 300 after a pre-determined delay. The error clocking source generates an output signal at its terminal 1008 which is synchronized so as to be generated at an instant of time when the input to the error marking circuit is impressed upon the AND gate 1017 of that circuit (see also FIGURE 9d) so as to generate the appropriate output at terminal 1018 thereof. Output terminal 1008a of error clocking circuit 1000 is connected to the input terminal 1238 of the tape punch and memory erasing interlock circuit 1200 in order to initiate the timing circuit portion of the count of eight counter input of circuitry 1200 as will be more fully described.

Input terminal 1010 of circuitry 1000 is connected to the output terminal 114 of the receiver and reset circuit 100 which signal indicates the initiation of reception of data transmitted from a remote location source. Either this signal or the signal from output terminal 1008a is employed to produce the reset signals which appear at the output terminals 1013 and 1013a respectively. Output terminal 1013 is connected to bus 351 of shift register circuitry 300 in order to reset shift register 300 in readiness for the coded character about to be received. Output terminal 1013 is further connected to input terminal 731 of monitoring memory circuit 700 (see also FIGURE 7) so as to reset each memory loading circuit 730a–760a of each memory circuit 730–760 in readiness for the next coded character to be received, and processed by the data receiver of this invention.

The output terminal 1013a of circuitry 1000 is connected to the input terminal 301 of shift register circuitry 300 for the purpose of loading the start bit into the shift register 300 immediately prior to the shifting into the shift register 300 of the next coded character being received. Output terminal 1013a is also connected to the input terminal 902 of parody check generator circuit 900 for the purpose of resetting this circuit in readiness for generation of the next parody count therein.

The tape punch and memory erase interlock circuitry 1200 operates in the following manner:

Input terminal 1251 (note also FIGURE 10) is connected to the output terminal 114 of circuit 100 which is at binary one indicative of the readiness of the receipt of the next coded character by the data receiver. This pulse is impressed upon the count of eight counter reset terminals 1224 in order to clear the counter in readiness for the next count. This reset pulse is further impressed upon the gate control clutch actuation and intermediate memory reset circuit (input terminal 1247) to reset all of these circuits.

The count of eight counter incorporated into the interlock circuitry 1200 is initiated via its input terminals 1201-1 and 1201-2 which are connected to the output terminals 985 of error logic circuit 950 and output terminal 1018 of error marking circuit 1050 respectively. A binary one level voltage of either of these two output terminals indicates that a coded character has been processed by the data receiver (whether correct or incorrect) so that the count of eight counter should be energized in response thereto. This binary one pulse is transferred through a delay circuit portion positioned immediately before the input of the count of eight counter so as to increase the count by one at a predetermined time after impression of a signal from either of the error logic or error marking circuits 950 or 1050 respectively. Immediately after the count of eight counter has its count increased one binary bit by the delay circuitry immediately preceding its input terminal (see element 1210) the delay circuit portion impresses a binary one upon the gate control input terminal 1238. This sets flip-flop 1240c output terminal 1237 to binary one. This binary one is impressed upon AND gate input terminal 1235-2. Upon simultaneous occurrence thereof, a second binary one pulse is fed back to the second stage of the delay with a binary one from terminal 1233 circuitry to generate a second count in the count of eight counter. This circuit is employed for the purpose of increasing the count in the count of eight counter until a count of eight is developed. It should be noted that the pulse width of the pulse generated by one-shot multivibrator 1230d is sufficient to sustain the counting function until the count of eight is achieved.

When the count of eight counter has accumulated a count of three, output terminals 1214, 1218, and 1249 are at binary one level. These levels are impressed upon AND gate 1228 (see FIGURE 10) which ultimately causes output terminal 1271 to generate a binary one level. This output terminal is connected to an input terminal in the printing means 1400 which advances the tape a predetermined distance under control of binary a one level at output terminal 1271. This same signal is also employed for the purpose of resetting both the loading and storage portions of the memory circuits 730–760 respectively. This is carried out by connecting output terminal 1247 to input terminal 712 which under control of the general reset signal 731 resets only the storage portions of memory circuits 730–760 as well as the storage portions. This reset select circuit thus resets the loading portions of the circuit while providing the shift pulses for transferring the information contained in the loading portions into the storage portions 730b–760b respectively whereas the input terminal 731 upon receipt of a binary ONE level signal does not reset a loading portions of the circuit but simply resets the storage portions of the memory circuit 700 in readiness for shifting thereinto the requirements of the coded character now being processed, which have been loaded into the loading portions 730a–760a respectively.

Immediately after this action output terminal 1270 which is connected to input terminal 806 of intermediate memory circuit 800 carries a binary ONE level voltage which is impressed upon intermediate memory circuit 800 so as to reset intermediate memory 800 in readiness for receipt of the next coded character therein.

The AND gate circuit 1225 of interlock circuitry 1200 generates a binary ONE level signal when a count of eight is achieved. This signal is impressed upon the clutch actuation circuit reset input terminal 1245 (see FIGURE 10) so as to prevent stepping of the punch clutch. This output is further employed to reset the gate control circuit so as to prevent a second count to be passed through the delay portion preceding the input of the count of eight counter, until the occurrence of the next input pulse to the error clocking source 1000 indicative of the completion of the shifting operation of a coded character into the shift register circuitry 300. It can therefore be seen that at interlock circuitry 1200 synchronizes the operation of fast operating date receiver with the slow operating tape punch member by means of: resetting the intermediate memory subsequent to the imprinting of the last processed coded characters into the printing means; advancing the memory tape subsequent to the imprinting of each coded character (i.e., the storage therein of the coded character); and providing a "double spacing" operation in order to easily identify in the permanent paper tape memory means the information received from each remote location so that each such grouping of information is distinguishable from the adjacent groups by the presence of a "double spacing" therebetween.

It can therefore be seen that this invention provides a data receiving system which operates in synchronism with a remote location by means of receiving a pulse train consisting of data pulses interspersed by sync pulses wherein the sync pulses are employed to determine the operating speed of the data receiver. Unique means are provided for separating code pulses from sync pulses. In order to perform the preceding functions, a plurality of levels of checking circuits are provided so that each coded character is subjected to a sophisticated reliability format in order to insure its accuracy. In addition to performing a parody check upon each received coded character, a check is performed to ascertain whether such character is valid, both before and after this coded character is converted by the data receiver converting means.

In addition thereto, a unique monitoring memory circuit is employed which imposes a strick test upon the character presently being received from information derived from the last processed coded character which has a coding so unique that it "tells" the data receiver what type of a coded character should be next received. This provides an additional security level never before obtainable.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. For use in receiving electrical signals having alternately interspersed data and synchronizing signal elements wherein a predetermined group of data elements represent an information character in an encoded form, a data receiver comprising first means for receiving said electrical signals; second means for separating said data elements from said synchronizing elements; third means connected to said second means for identifying a group of data elements, said third means comprising shift register means for receiving first signals from said second means representing said synchronizing elements, and for receiving second signals from said second means representing said data elements; said first signals being adapted to shift said data element signals into said shift register fourth means connected to said third means for performing a validity check on said data group; fifth means for storing data groups checked by said fourth means.

2. For use in receiving electrical signals having alternatively interspersed data and synchronizing signal elements wherein a predetermined group of data elements represent an information character in an encoded form, a data receiver comprising first means for receiving said electrical signals; second means for separating said data elements from said synchronizing elements; third means connected to said second means for identifying a group of data elements, said third means comprising shift register means for receiving first signals from said second means representing said synchronizing elements, and for receiving second signals from said second means representing said data elements; said first signals being adapted to shift said data element signals into said shift register fourth means connected to said third means for performing a validity check on said data group; fifth means for storing data groups checked by said fourth means; said fifth means including means for marking a stored data group to identify an invalid encoded character.

3. For use in receiving electrical signals having alternately interspersed data and synchronizing signal elements wherein a predetermined group of data elements represent an information character in an encoded form, a data receiver comprising first means for receiving said electrical signals; second means for separating said data elements from said synchronizing elements; third means connected to said second means for identifying a group of data elements, fourth means connected to said third means for performing a validity check on said data group; fifth means for storing data groups checked by said fourth means; said fourth means including memory means for storing the last received data group; said memory means being adapted to generate signals for determining the identity of the next received data group; sixth means for comparing the signals from said memory means with said next received data group to determine the validity thereof.

4. For use in receiving electrical signals having alternately interspersed data and synchronizing signal elements wherein a predetermined group of data elements represent an information character in an encoded form, a data receiver comprising first means for receiving said electrical signals; second means for separating said data elements from said synchronizing elements; third means connected to said second means for identifying a group of data elements, fourth means connected to said third means for performing a validity check on said data group; fifth means for storing data groups checked by said fourth means; said fourth means including memory means for storing the last received data group; said memory means being adapted to generate signals for determining the identity of the next received data groups; sixth means for comparing the signals from said memory means with said next received data group to determine the validity thereof; said sixth means being adapted to control said fifth means to mark an invalid encoded character when said memory means signals do not compare with said next data group.

5. For use in receiving electrical signals having alternately interspersed data and synchronizing signal elements wherein a predetermined group of data elements represent an information character in an encoded form, a data receiver comprising first means for receiving said electrical signals; second means for separating said data elements from said synchronizing elements; third means connected to said second means for identifying a group of data elements, said third means comprising shift register means for receiving first signals from said second means representing said synchronizing elements, and for receiving second signals from said second means representing said data elements; said first signals being adapted to shift said data element signals into said shift register; fourth means connected to said third means for performing a validity check on said data group; fifth means for storing data groups checked by said fourth means; intermediate memory means for transferring data groups between said third means and said fifth means.

6. For use in receiving electrical signals having alternately interspersed data and synchronizing signal elements wherein a predetermined group of data elements represent an information character in an encoded form, a data receiver comprising first means for receiving said electrical signals; second means for separating said data elements from said synchronzing elements; third means connected to said second means for identifying a group of data elements, said third means comprising shift register means for receiving first signals from said second means representing said synchronizing elements, and for receiving second signals from said second means representing said data elements; said first signals being adapted to shift said data element signals into said shift register; fourth means connected to said third means for performing a validity check on said data group; fifth means for storing data groups checked by said fourth means; intermediate memory means for transferring data groups between said third means and said fifth means; interlock means for clearing said third means for receipt of the next data group.

7. For use in receiving electrical signals having alternately interspersed data and synchronizing signal elements wherein a predetermined group of data elements represent an information character in an encoded form, a data receiver comprising first means for receiving said electrical signals; second means for separating said data elements from said synchronizing elements; third means connected to said second means for identifying a group of data elements, said third means comprising shift register means for receiving first signals from said second means representing said synchronzing elements, and for receiving second signals from said second means representing said data elements; said first signals being adapted to shift said data element signals into said shift register; fourth means connected to said third means for performing a validity check on said data group; fifth means for storing data groups checked by said fourth means; intermediate memory means for transferring data groups between said third means and said fifth means; interlock means for clearing said third means for receipt of the next data group; said intermediate memory means being adapted to store a received data group while said third means is cleared for receipt of the next received data group.

8. For use in receiving first electrical signals having alternately interspersed data and synchronizing signal elements wherein a first predetermined number of data elements represent a first group of encoded characters and a second predetermined number of elements represent a second group of encoded characters; first means for receiving said first electrical signals; second means for separating said data elements from said synchronizing elements; third means connected to said second means for identifying the receipt of a complete data group; error monitoring means for checking the validity of received data groups, said error monitoring means including memory storing means for storing a second signal related to said stored data group, comparison means for receiving a third signal related to said next received data group and comparing said third signal with said second signal to determine the validity of said next received data group.

9. For use in receiving first electrical signals having alternately interspersed data and synchronizing signal elements wherein a first predetermined number of data elements represent a first group of encoded characters and a second predetermined number of elements represent a second group of encoded characters; first means for receiving said first electrical signals; second means for separating said data elements from said synchronizing elements; third means connected to said second means for identifying the receipt of a complete data group; error monitoring means for checking the validity of received data groups, said error monitoring means including memory storing means for storing a second signal related to said stored data group, comparison means for receiving a third signal related to said next received data group and comparing said third signal with said second signal to determine the validity of said next received data group; said first predetermined code being a two out of five binary code, said second predetermined code being a three out of five binary code, said code groups including an ambiguity signal element indicative of a two out of five code group when absent and a three out of five code group when present; said third means including means for storing said ambiguity element; said comparison means including first gating means connected to said memory storing means for said third means for ascertaining the validity of the next received code group.

10. For use in receiving first electrical signals having alternately interspersed data and synchronizing signal elements wherein a first predetermined number of data elements represent a first group of encoded characters and a second predetermined number of elements represent a second group of encoded characters; first means for receiving said first electrical signals; second means for separating said data elements from said synchronizing elements; third means connected to said second means for identifying the receipt of a complete data group; error monitoring means for checking the validity of received data groups, said error monitoring means including memory storing means for storing a second signal related to said stored data group, comparison means for receiving a third signal related to said next received data group and comparing said third signal with said second signal to determine the validity of said next received data group; said first predetermined code being a two out of five binary code, said second predetermined code being a three out of five binary code; said code groups including an ambiguity signal element indicative of a two out of five code group when absent and a three out of five code group when present; said third means including means for storing said ambiguity element; said comparison means including first gating means connected to said memory storing means for said third means for ascertaining the validity of the next received code group; second gating means connected to said memory storing means and said third means for ascertaining the validity of the next received code group.

11. For use in receiving first electrical signals having alternately interspersed data and synchronizing signal elements wherein a first predetermined number of data elements represent a first group of encoded characters and a second predetermined number of elements represent a second group of encoded characters; first means for receiving said first electrical signals; second means for separating said data elements from said synchronizing elements; third means connected to said second means for identifying the receipt of a complete data group; error monitoring means for checking the validity of received data groups, said error monitoring means including memory storing means for storing a second signal related to said stored data group, comparison means for receiving a third signal related to said next received data group and comparing said third signal with said second signal to determine the validity of said next received data group; said first predetermined code being a two out of five binary code, said second predetermined code being a three out of five binary code; said code groups including an ambiguity signal element indicative of a two out of five code group when absent and a three out of five code group when present; said third means including means for storing said ambiguity element; said comparison means including first gating means connected to said memory storing means for said third means for ascertaining the validity of the next received code group; second gating means connected to said memory storing means and said third means for ascertaining the validity of the next received code group; first code conversion means having a plurality of output terminals equal to the number of characters represented by said first predetermined code group, said first code conversion means being connected to said third means for generating a signal at one of said output terminals under control of the code group received by said third means.

12. For use in receiving first electrical signals having alternately interspersed data and synchronizing signal elements wherein a first predetermined number of data elements represent a first group of encoded characters and a second predetermined number of elements represent a second group of encoded characters; first means for receiving said first electrical signals; second means for separating said data elements from said synchronizing elements; third means connected to said second means for identifying the receipt of a complete data group; error monitoring means for checking the validity of received data groups, said error monitoring means including memory storing means for storing a second signal related to said stored data group, comparison means for receiving a third signal related to said next received data group and comparing said third signal with said second signal to determine the validity of said next received data group; said first predetermined code being a two out of five binary code, said second predetermined code being a three out of five binary code; said code groups including an ambiguity signal element indicative of a two out of five code group when absent and a three out of five code group when present; said third means including means for storing said ambiguity element; said comparison means including first gating means connected to said memory storing means for said third means for ascertaining the validity of the next received code group; second gating means connected to said memory storing means and said third means for ascretaining the validity of the next received code group; first code conversion means having a plurality of output terminals equal to the number of characters represented by said first predetermined code group, said first code conversion means being connected to said third means for generating a signal at one of said output terminals under control of the code group received by said third means; second code conversion means connected to said first code conversion means output terminals for generating a binary code adaptable for use in a computer under control of said first code conversion means.

13. For use in receiving first electrical signals having alternately interspersed data and synchronizing signal elements wherein a first predetermined number of data elements represent a first group of encoded characters and a second predetermined number of elements represent a second group of encoded characters; first means for receiving said first electrical signals; second means for separating said data elements from said synchronizing elements; third means connected to said second means for identifying the receipt of a complete data group; error monitoring means for checking the validity of received data groups, said error monitoring means including memory storing means for storing a second signal related to said stored data group, comparison means for receiving a third signal related to said next received data group and comparing said third signal with said second signal to determine the validity of said next received data group; said first predetermined code being a two out of five binary code, said second predetermined code being a three out of five binary code; said code groups including an ambiguity signal element indicative of a two out of five code group when absent and a three out of five code group when present; said third means including means for storing said ambiguity element; said comparison means including first gating means connected to said memory storing means for said third means for ascertaining the validity of the next received code group; second gating means connected to said memory storing means and said third means for ascertaining the validity of the next received code group; first code conversion means having a plurality of output terminals equal to the number of characters represented by said first predetermined code group, said first code conversion means being connected to said third means for generating a signal at one of said output terminals under control of the code group received by said third means; said error monitoring means being connected to at least one of the output terminals of said first code conversion means for generating signals indicative of the presence of a first predetermined code group in said receiver means.

14. For use in a communication system comprised of a data receiving location and a plurality of data transmitting locations in which system each transmitting location transmits characters wherein a first group of said characters identify the transmitting location and a second group of characters represent the data transmitted whereby the transmitted data is in the form of electrical signals comprised of alternately interspersed data elements and synchronizing elements wherein said groups of data elements are encoded to represent said characters, a data receiver for receiving said electrical signals comprising first means for receiving said electrical signals; second means for separating said data elements from said synchronizing elements; third means connected to said second means for identifying each group of data elements said third means comprising shift register means for receiving first signals from said second means representing said synchronizing elements, and for receiving second signals from said second means representing said data elements; said first signals being adapted to shift said data element signals into said shift register; and character counting means under control of said third means for counting the number of encoded characters received by said data receiver; said first means being adapted under control of said character counting means to inhibit receipt of encoded characters when said character counting means reaches a predetermined count.

15. For use in a communications system comprised of a data receiving location and a plurality of data transmitting locations in which system each transmitting location transmits characters wherein a first group of said characters identify the transmitting location and a second group of characters represent the data transmitted whereby the transmitted data is in the form of electrical signals comprised of alternately interspersed data elements and synchronizing elements wherein said groups of data elements are encoded to represent said characters, a data receiver for receiving said electrical signals comprising first means for receiving said electrical signals; second means for separating said data elements from said synchronizing elements; third means connected to said second means for identifying each group of data elements said third means comprising shift register means for receiving first signals from said second means representing said synchronizing elements, and for receiving second signals from said second means representing said data elements; said first signals being adapted to shift said data element signals into said shift register; and character counting means under control of said third means for counting the number of encoded characters received by said data receiver; said first means being adapted under control of said character counting means to inhibit receipt of encoded characters when said character counting means reaches a predetermined count; fourth means connected to said third means for performing a validity check on said data groups; fifth means for storing data groups checked by said fourth means.

16. For use in a communications system comprised of a data receiving location and a plurality of data transmitting locations in which system each transmitting location transmits characters wherein a first group of said characters identify the transmitting location and a second group of characters represent the data transmitted whereby the transmitted data is in the form of electrical signals comprised of alternately interspersed data elements and synchronizing elements wherein said groups of data elements are encoded to represent said characters, a data receiver for receiving said electrical signals comprising first means for receiving said electrical signals; second means for separating said data elements from said synchronizing elements; third means connected to said second means for identifying each group of data elements said third means comprising shift register means for receiving first signals from said second means representing said synchronizing elements, and for receiving second signals from said second means representing said data elements; said first signals being adapted to shift said data element signals into said shift register; and character counting means under control of said third means for counting the number of encoded characters received by said data receiver; said first means being adapted under control of said character counting means to inhibit receipt of encoded characters when said character counting means reaches a predetermined count; fourth means connected to said third means for performing a validity check on said data groups; fifth means for storing data groups checked by said fourth means; said fifth means including means for marking a stored data group to identify an invalid encoded character.

17. For use in a communications system comprised of a data receiving location and a plurality of data transmitting locations in which system each transmitting location transmits characters wherein a first group of said characters identify the transmitting location and a second group of characters represent the data transmitted whereby the transmitted data is in the form of electrical signals comprised of interspersed data elements and synchronizing elements wherein said groups of data elements are encoded to represent said characters, a data receiver for receiving said electrical signals comprising first means for receiving said electrical signals; second means for separating said data elements from said synchronizing elements; third means connected to said second means for identifying each group of data elements and character counting means under control of said third means for counting the number of encoded characters received by said data receiver; said first means being adapted under control of said character counting means to inhibit receipt of encoded characters when said character counting means reaches a predetermined count; fourth means connected to said third means for performing a validity check on said data groups; fifth means for storing data groups checked by said fourth means; said fifth means including means for marking a stored data group to identify an invalid encoded character; said fourth means including memory means for storing the last received data group; said memory means being adapted to generate signals for determining the identity of the next received data group; sixth means for comparing the signals from said memory means with the next received data group to determine the validity of said next received data group for controlling said fifth means to mark an invalid encoded character.

References Cited

UNITED STATES PATENTS

| | | | |
|---|---|---|---|
| 2,279,353 | 4/1942 | Van Duuren | 340—146.1 |
| 2,703,361 | 3/1955 | Van Duuren | 340—146.1 |
| 2,805,278 | 9/1957 | Van Duuren | 340—146.1 |
| 2,988,596 | 6/1961 | Van Dalen | 340—146.1 |
| 3,005,871 | 10/1961 | Rudolph | 340—146.1 |
| 3,064,080 | 11/1962 | Rea et al. | 340—146.1 |
| 3,141,928 | 7/1964 | Davey et al. | 340—146.1 |
| 3,154,638 | 10/1964 | Van Dalen | 340—146.1 |

MALCOLM A. MORRISON, *Primary Examiner.*

ROBERT C. BAILEY, *Examiner.*

M. A. LERNER, M. J. SPIVAK, M. P. ALLEN
*Assistant Examiners.*